(12) United States Patent
Motomura et al.

(10) Patent No.: US 8,570,291 B2
(45) Date of Patent: Oct. 29, 2013

(54) TACTILE PROCESSING DEVICE

(75) Inventors: Hideto Motomura, Kyoto (JP); Tetsu Suzuki, Ehime (JP); Yoshiyuki Okimoto, Nara (JP)

(73) Assignee: Panasonic Corporation, Osaka (JP)

( * ) Notice: Subject to any disclaimer, the term of this patent is extended or adjusted under 35 U.S.C. 154(b) by 298 days.

(21) Appl. No.: 13/062,567

(22) PCT Filed: May 21, 2010

(86) PCT No.: PCT/JP2010/003429
§ 371 (c)(1),
(2), (4) Date: Mar. 7, 2011

(87) PCT Pub. No.: WO2010/134349
PCT Pub. Date: Nov. 25, 2010

(65) Prior Publication Data
US 2011/0157088 A1     Jun. 30, 2011

(30) Foreign Application Priority Data

May 21, 2009  (JP) ................................ 2009-122948
Jun. 5, 2009  (JP) ................................ 2009-136212

(51) Int. Cl.
*G06F 3/01*    (2006.01)
(52) U.S. Cl.
USPC ................ 345/173; 345/156; 414/5; 715/702
(58) Field of Classification Search
USPC .................................................. 345/156, 173
See application file for complete search history.

(56) References Cited

U.S. PATENT DOCUMENTS 4,414,984 A * 11/1983 Zarudiansky ................. 600/587
5,709,219 A *  1/1998 Chen et al. .................... 600/595
(Continued)

FOREIGN PATENT DOCUMENTS

CA    2430193 A1 * 11/2004
JP    06-274094 A     9/1994
(Continued)

OTHER PUBLICATIONS

Yamamoto et al, "Electrostatic tactile display with Thin Film Slider and Its Application to Tactile Telepresentation Systems", IEEE Transactions on Visualization and Computer Graphics, vol. 12, No. 2, Mar./Apr. 2006, pp. 168-177.*

(Continued)

*Primary Examiner* — Dorothy Harris
(74) *Attorney, Agent, or Firm* — Renner, Otto, Boisselle & Sklar, LLP

(57) ABSTRACT

The present invention provides a technique for sensing and reproducing various feels, which a person gets discretely over a period of time, by time sequential sensing.
A tactile processor includes: a movement measuring section for determining a status of contact between a person and an object; a physical measuring section for measuring a physical property value of the object; and a physical-psychological transformation section for generating a tactile feature quantity based on the physical property value that has been measured by the physical measuring section and on the weight of the physical property of an arbitrary object. The weight is variable according a status of contact between the person and the arbitrary object and is calculated based on not only a physical property value representing the status of contact between the person and the arbitrary object but also a tactile feature quantity representing a feel that the person gets when touching the arbitrary object.

12 Claims, 50 Drawing Sheets

(56) References Cited

U.S. PATENT DOCUMENTS

| | | | |
|---|---|---|---|
| 5,959,613 A * | 9/1999 | Rosenberg et al. | 345/161 |
| 6,088,017 A * | 7/2000 | Tremblay et al. | 345/156 |
| 6,271,857 B1 * | 8/2001 | Kang et al. | 345/582 |
| 7,077,015 B2 * | 7/2006 | Hayward et al. | 73/862.041 |
| 2001/0043847 A1 * | 11/2001 | Kramer | 414/5 |
| 2002/0191011 A1 * | 12/2002 | Rasouli | 345/702 |
| 2006/0279537 A1 | 12/2006 | Kim et al. | |

FOREIGN PATENT DOCUMENTS

| | | |
|---|---|---|
| JP | 08-007182 A | 1/1996 |
| JP | 09-090867 A | 4/1997 |
| JP | 11-203019 A | 7/1999 |
| JP | 2001-306200 A | 11/2001 |
| JP | 2001-312633 A | 11/2001 |
| JP | 2003-248540 A | 9/2003 |
| JP | 2003-337645 A | 11/2003 |
| JP | 2006-351012 A | 12/2006 |
| JP | 2007-187555 A | 7/2007 |
| WO | 01/38958 A1 | 5/2001 |

OTHER PUBLICATIONS

Asamura et al, "Selectively Stimulating Skin Receptors for Tactile Display", IEEE Virtual Reality, Nov./Dec. 1998, pp. 32-37.*

Kron et al, "Multi-fingered Tactile Feedback from Virtual and Remote Environments", Proceedings of the 11th Symposium on Haptic Interfaces for Virtual Environment and Teleoperator Systems (HAPTICS'03), 2003, pp. 1-8.*

Yamauchi et al, Real-Time Remote Transmission of Multiple Tactile Properties through Master-Slave Robot System, Proc. of the 2010 IEEE International Conference on Robotics and Automation, Authors' Version, 2010, pp. 1-8.*

International Search Report for corresponding International Application No. PCT/JP2010/003429 mailed Aug. 17, 2010.

Shirado et al., "Modeling of Texture Perception Mechanism for Tactile Display and Sensor", Transactions of the Virtual Reality Society of Japan, TVRSJ vol. 9, No. 3, pp. 235-240, 2004.

Shiokawa et al., "Hybrid Display of Realistic Tactile Sense using Ultrasonic Vibrator and Force Display", Proceedings of the 2008 JSME Conference on Robotics and Mechatronics, Nagao, Japan, Jun. 5-7, 2008.

Kadonami et al., "Development of Finger Pad Type Tactile Sensor for Tele-Presentation Systems", Proceedings of the 2008 JSME Conference on Robotics and Mechatronics, Nagano, Japan, Jun. 5-7, 2008.

Magnenat-Thalmann et al., "From Physics-based Simulation to the Touching of Textiles: The HAPTEX Project", The International Journal of Virtual Reality, 2007, 6(3): 35-44.

Niwa, "Handling and Dynamic Properties—Objective Evaluation and Application of Handling" Journal of the Society of Fiber Science and Technology, Fiber and Engineering vol. 46, No. 6, pp. 245-252, 1990 and concise explanation (concise explanation previously submitted on Mar. 7, 2011; re-submitting document providing the Japanese language document).

Higashiyama et al., "Sense of Touch and Pain", Brain Publishing Co., Ltd., pp. 104-107, 2000 and concise explanation (concise explanation previously submitted on Mar. 7, 2011; re-submitting document providing the Japanese language document).

Takashi Maeno, "Structure and Function of Finger Pad and Tactile Receptors", Journal of the Robotics Society of Japan, JRSJ vol. 18, No. 6 pp. 772-775, 2000 and concise explanation (concise explanation previously submitted on Mar. 7, 2011; resubmitting document providing the Japanese language document).

Higashiyama et al., "Sense of Touch and Pain", Brain Publishing Co., Ltd., pp. 49-50, 2000 and concise explanation (concise explanation previously submitted on Mar. 7, 2011; re-submitting document providing the Japanese language document).

* cited by examiner

FIG.7
(a)
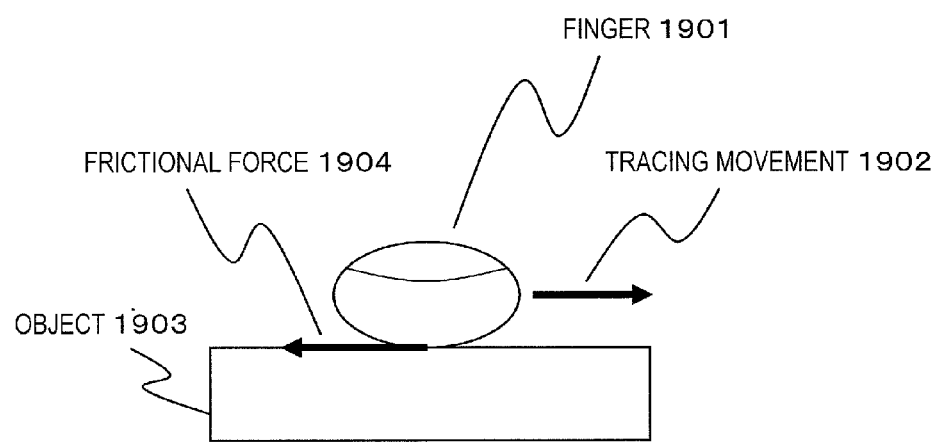
(b)
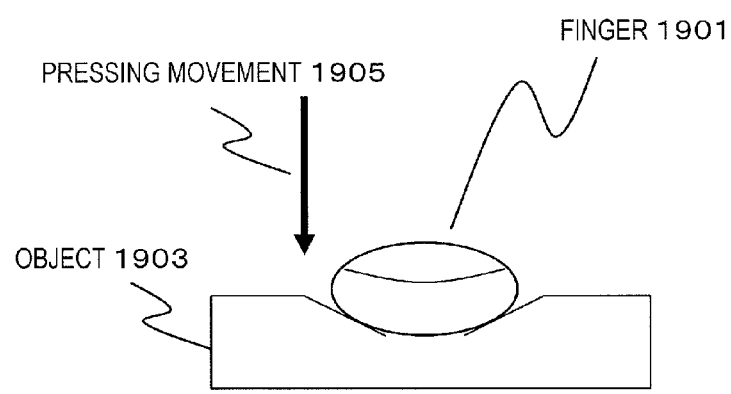

*FIG.11*   CONVENTIONAL ART

CLOTHING FABRIC SEARCH

SEARCH ITEM #1 STIFFNESS   DEGREE: ● YES   ○ MODERATE ○ NO
SEARCH ITEM #2 NON-SPECIFIED   DEGREE: ● YES   ○ MODERATE ○ NO
SEARCH ITEM #3 NON-SPECIFIED   DEGREE: ● YES   ○ MODERATE ○ NO

[SEARCH] [RESET]   HELP

| SEARCH ITEM | If the Degree of Search Item is Yes (High or Strong) | If the Degree of Search Item is No (Low or Weak) |
|---|---|---|
| 1. STIFFNESS | STIFF | NON-STIFF |
| 2. ANTI-DRAPE STIFFNESS | NON-DRAPABLE | DRAPABLE |
| 3. CRISPNESS | CRISP | NON-CRISP |
| 4. FULLNESS AND SOFTNESS | FULL AND SOFT | NEITHER FULL NOR SOFT |
| 5. FLEXIBILITY | FLEXIBLE | NON-FLEXIBLE |
| 6. SCROOPING TACTILE | SCROOPING | NON-SCROOPING |
| 7. CREASE RECOVERY RATE | HARDLY CREASING | EASILY CREASING |
| 8. SLIPPAGE RESISTANCE | HARDLY SLIPPING | EASILY SLIPPING |
| 9. FOLD ABRASION RESISTANCE | FOLD WITH HIGH ABRASION RESISTANCE | FOLD WITH LOW ABRASION RESISTANCE |
| 10. TEARING STRENGTH | HARDLY TEARABLE | EASILY TEARABLE |
| 11. AIR BREATHABILITY | BREATHABLE | NON-BREATHABLE |
| 12. BURSTING STRENGTH | HARDLY BURSTING | EASILY BURSTING |

*FIG.12*

LIST OF MATCHING CLOTHING FABRICS FOUND 130 items found. You can narrow the search by adding keywords. To view detailed data, click on the item number.

KEYWORD  [SEARCH]  HELP

PROPERTY: STIFFNESS - YES                       1-20 OF 130

| ITEM NUMBER | PRODUCT NAME | COLOR/PATTERN | TEXTURE |
|---|---|---|---|
| 9 | LINSHANG | PLAIN STOCK DYED | PLAIN-WOVEN |
| 13 | TWILL LEAVER | LEAVER CHECK | TWILL WOVEN 3/1 (VERTICALLY AND HORIZONTALLY DOUBLE WOVEN) |
| 24 | LINEN | PLAIN | PLAIN-WOVEN |
| 25 | LINEN | JACQUARD | PLAIN-WOVEN |
| 31 | SILK COTTON HOUND'S-TOOTH CHECK | HOUND'S-TOOTH CHECK | PLAIN-WOVEN STITCH |
| 32 | SATIN MULTI-FIBER | PLAIN | 8 HARNESS SATIN (VERTICALLY DOUBLE WOVEN) |
| 34 | CHAMBRAY | CHECK | PLAIN-WOVEN |
| 36 | TAPS | JACQUARD | PLAIN-WOVEN (GOBELIN) |
| 37 | CHAMBRAY | CHECK | PLAIN-WOVEN |
| 39 | SILK MULTI-FIBER | JACQUARD | PLAIN-WOVEN (GOBELIN) |
| 41 | LINSHANG | CHECK | TWILL WOVEN 2/2 |
| 45 | ESTER | JACQUARD ENTWINED | FANCY AND FIGURED TWILL WOVEN (VERTICALLY AND HORIZONTALLY DOUBLE WOVEN) |
| 46 | SMALL HEXAGON | JACQUARD HEXAGON | PLAIN-WOVEN |
| 52 | SATIN | PLAIN | 8 HARNESS SATIN |
| 53 | SATIN | PLAIN | 5 HARNESS SATIN |
| 54 | SATIN | PLAIN | 8 HARNESS SATIN |
| 58 | TAFFETA | PLAIN | PLAIN WOVEN |
| 67 | LINEN | PLAIN | PLAIN WOVEN |
| 69 | SHANTUNG | PLAIN | 5 HARNESS SATIN |
| 71 | VIYELLA | PRINTED | TWILL WOVEN 2/2 |

NEXT    ITEMS PER PAGE  20   [OK]

FIG. 13

DETAILS OF CLOTHING FABRIC

ITEM #53

- TEXTILE DESIGN DATA -

| PRODUCT NAME | SATIN | TEXTURE | 5 HARNESS SATIN |
|---|---|---|---|
| COLOR/PATTERN | PLAIN | LAMÉ | NO |
| TOTAL WEIGHT | 133.2 | WIDTH | 93.7 |
| MOMME | 30 | THICKNESS | 0.24 |

| | WARP | WOOF |
|---|---|---|
| MATERIAL | ACETATE | ACETATE |
| FIBER | FILAMENT YARN | FILAMENT YARN |
| PITCH | 75D | 120D |
| TWIST | NON-TWISTED | NON-TWISTED |
| TWIST LEVEL | 0 | 0 |
| ARRANGEMENT | NO | NO |
| DENSITY | 105.5 | 34.5 |

| | WARP | WOOF |
|---|---|---|
| COVER | 31 | 12.7 |
| CRISP PERCENTAGE OF WOVEN FABRIC | 4 | 1.1 |

- MEASUREMENT DATA -

| STIFFNESS | 9.69654 | ANTI-DRAPE STIFFNESS | 13.2344 | CRISPNESS | 1.18176 | FULLNESS AND SOFTNESS | 5.42964 |
|---|---|---|---|---|---|---|---|
| FLEXIBILITY | -1.44865 | SCROOPING TACTILE | 4.72473 | AIR BREATHABILITY | 15 | BURSTING STRENGTH | 5 |

| | WARP | WOOF | AVERAGE |
|---|---|---|---|
| CREASE RECOVERY RATE | 51 | 56 | 54 |
| SLIPPAGE RESISTANCE | 310.5 | 196.3 | 253.4 |
| FOLD ABRASION RESISTANCE | 104 | 143 | 124 |
| TEARING STRENGTH | 875 | 570 | 723 |

FIG.18
(a)
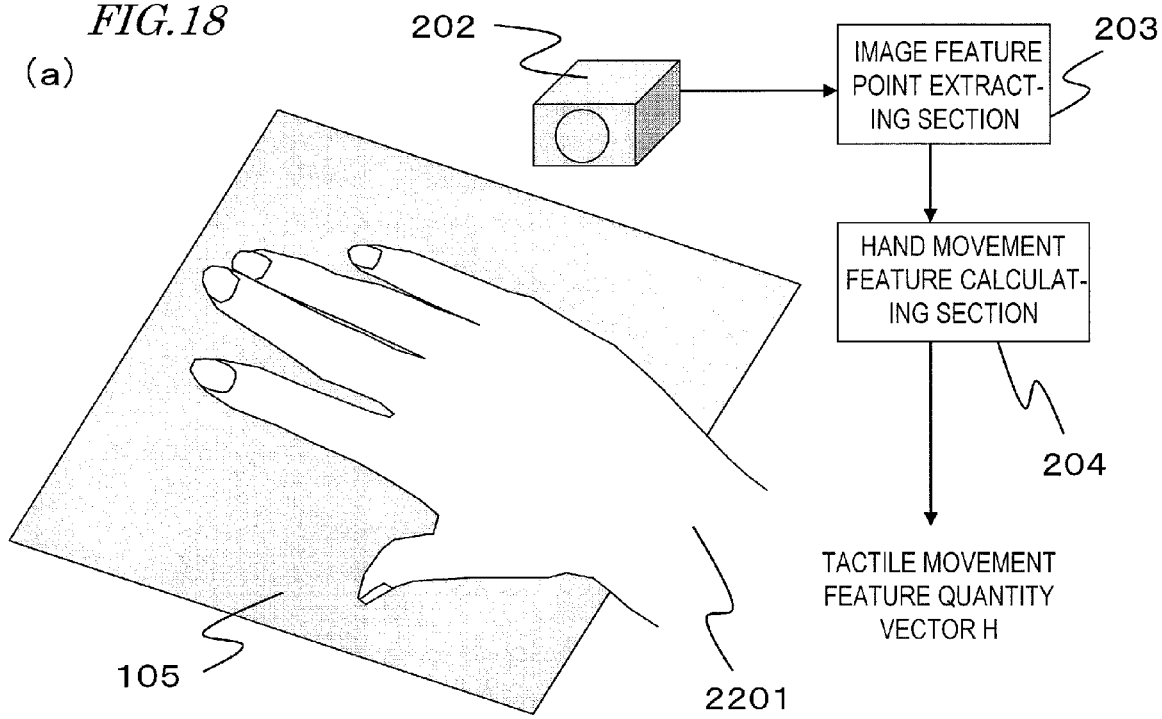
(b)
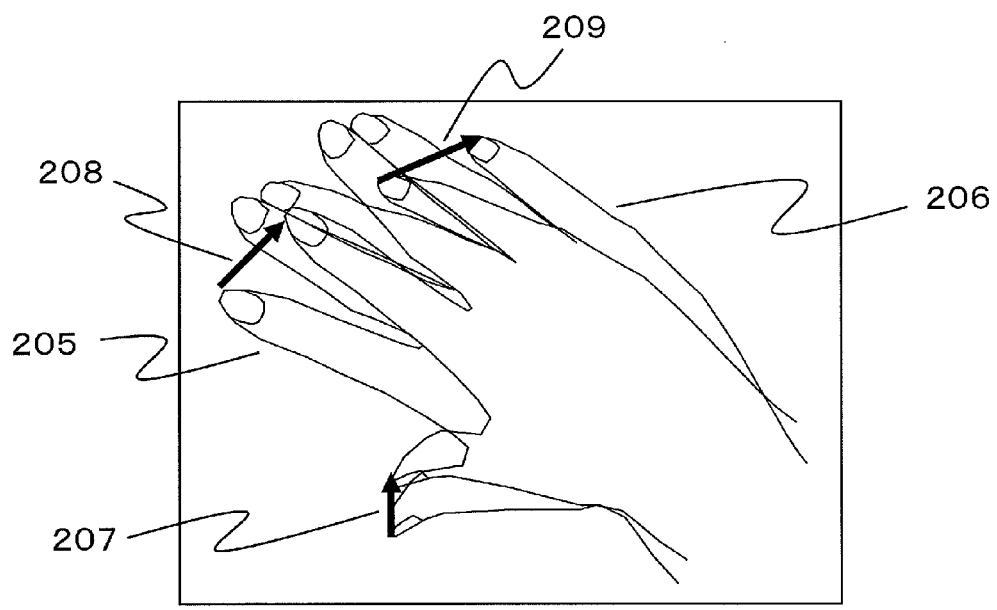

FIG.21

| TACTILE MOVEMENT VARIABLE m | PATTERNS OF TACTILE MOVEMENT | | | | | | |
|---|---|---|---|---|---|---|---|
| | TIME | VELOCITY IN X DIRECTION | VELOCITY IN Y DIRECTION | VELOCITY IN Z DIRECTION | X-AXIS ANGULAR VELOCITY | Y-AXIS ANGULAR VELOCITY | Z-AXIS ANGULAR VELOCITY |
| m1 | t1 | 0 | 4 | 0 | 0 | 0 | 0 |
| | t2 | 0 | 6 | 0 | 0 | 0 | 0 |
| | t3 | 0 | 2 | 0 | 0 | 0 | 0 |
| | : | : | : | : | : | : | : |
| | tn | 0 | −3 | 0 | 0 | 0 | 0 |
| m2 | t1 | | | | | | |
| | t2 | | | | | | |
| | t3 | | | | | | |
| | : | : | : | : | : | : | : |
| | tm | | | | | | |
| : | : | : | : | : | : | : | : |

FIG.22

Table E01

| TACTILE MOVEMENT FEATURE QUANTITY VECTOR m | TACTILE WEIGHT VECTOR C(m) |
|---|---|
| m1 | C(m1) |
| ⋮ | ⋮ |
| mi | C(mi) |
| ⋮ | ⋮ |
| mn | C(mn) |

FIG.23

| MATERIAL | TACTILE MOVEMENT VARIABLE | TACTILE INTENSITY | TACTILE TYPE |
|---|---|---|---|
| 100% COTTON | m1 | 5 | SOFT |
| | m2 | 4 | SMOOTH |
| | ⋮ | ⋮ | ⋮ |
| 100% WOOL | m1 | 6 | SOFT |
| | m2 | 3 | SMOOTH |
| | ⋮ | ⋮ | ⋮ |
| ⋮ | ⋮ | ⋮ | ⋮ |

FIG.30

| TACTILE MOVEMENT VARIABLE | TACTILE TYPE | TACTILE WEIGHT MATRIX |
|---|---|---|
| m1 | y1 | C(m1,y1) |
| | y2 | C(m1,y2) |
| | ⋮ | ⋮ |
| m2 | y1 | C(m2,y1) |
| | y2 | C(m2,y2) |
| | ⋮ | ⋮ |
| ⋮ | ⋮ | ⋮ |

FIG.31

| MATERIAL | TACTILE MOVEMENT VARIABLE | TACTILE TYPE | TACTILE INTENSITY $t_y$ |
|---|---|---|---|
| 100% COTTON | m1 | y1 | 5 |
| | | y2 | 2 |
| | | ⋮ | ⋮ |
| | m2 | y1 | 3 |
| | | y2 | 2 |
| | | ⋮ | ⋮ |
| | ⋮ | ⋮ | ⋮ |
| 100% WOOL | m1 | y1 | 3 |
| | | y2 | 6 |
| | | ⋮ | ⋮ |
| ⋮ | ⋮ | ⋮ | ⋮ |

FIG.34

| TACTILE MOVEMENT VARIABLE | TACTILE TYPE | $P(y|m)$ |
|---|---|---|
| m1 | y1 | 0.8 |
| | y2 | 0.05 |
| | ⋮ | ⋮ |
| m2 | y1 | 0.2 |
| | y2 | 0.5 |
| | ⋮ | ⋮ |
| ⋮ | ⋮ | ⋮ |

| | INPUT | | | | | | OUTPUT |
|---|---|---|---|---|---|---|---|
| | CATEGORY OF TACTILE MOVEMENT FEATURE QUANTITY VECTOR H | TACTILE MOVEMENT TEST PHYSICAL PROPERTY VALUE VECTOR $P_H$ | | | | | TACTILE MOVEMENT ESTIMATED TACTILE FEATURE QUANTITY VECTOR F'H |
| | | ROUGHNESS COEFFICIENT a | MODULUS OF VERTICAL ELASTICITY b | MODULUS OF HORIZONTAL ELASTICITY c | COEFFICIENT OF STATIC FRICTION d | COEFFICIENT OF KINETIC FRICTION e | |
| 1 | 1 | 0.5 | 1.3 | 0.7 | 0.3 | 0.05 | F'H, 1 |
| 2 | 1 | 0.3 | 2.3 | 1.2 | 0.4 | 0.1 | F'H, 2 |
| ⋮ | | | | | | | |
| ⋮ | | | | | | | |
| n−1 | 2 | 0.7 | 0.9 | 1.3 | 0.3 | 0.02 | F'H, n−1 |
| n | 2 | 0.6 | 1.5 | 2.2 | 0.5 | 0.07 | F'H, n |

| | PERSON 104 | |
|---|---|---|
| | HAND MOVEMENT | TACTILE |
| | TACTILE MOVEMENT FEATURE QUANTITY H | TACTILE MOVEMENT ESTIMATED TACTILE FEATURE QUANTITY $F'_H$ |
| 1 | H104, 1 | $F'_H$104, 1 |
| 2 | H104, 2 | $F'_H$104, 2 |
| ⋮ | ⋮ | ⋮ |
| n | H104, n | $F'_H$104, n |

FIG.46
(a)
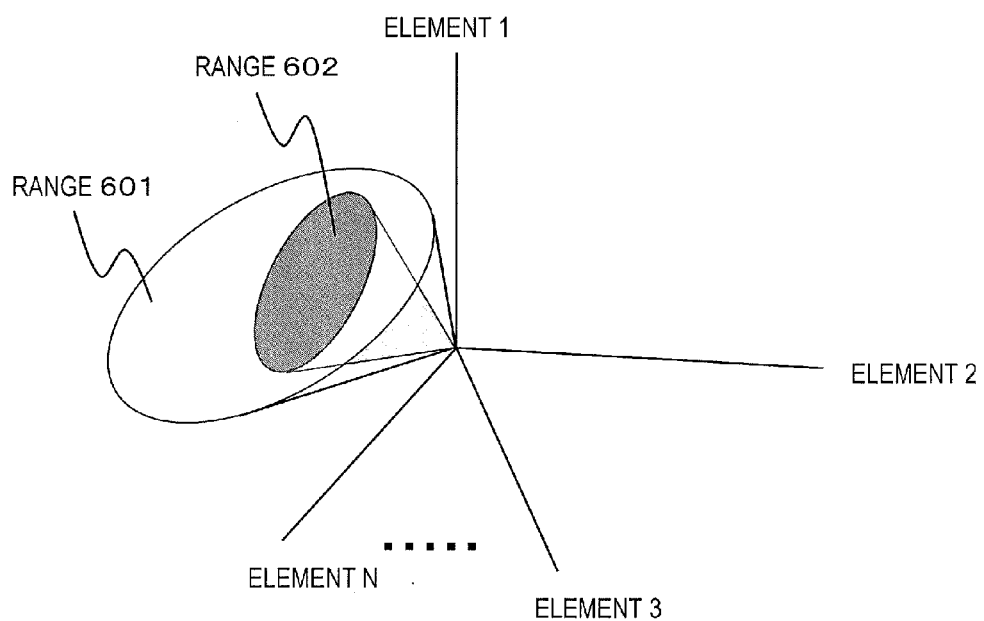
(b)
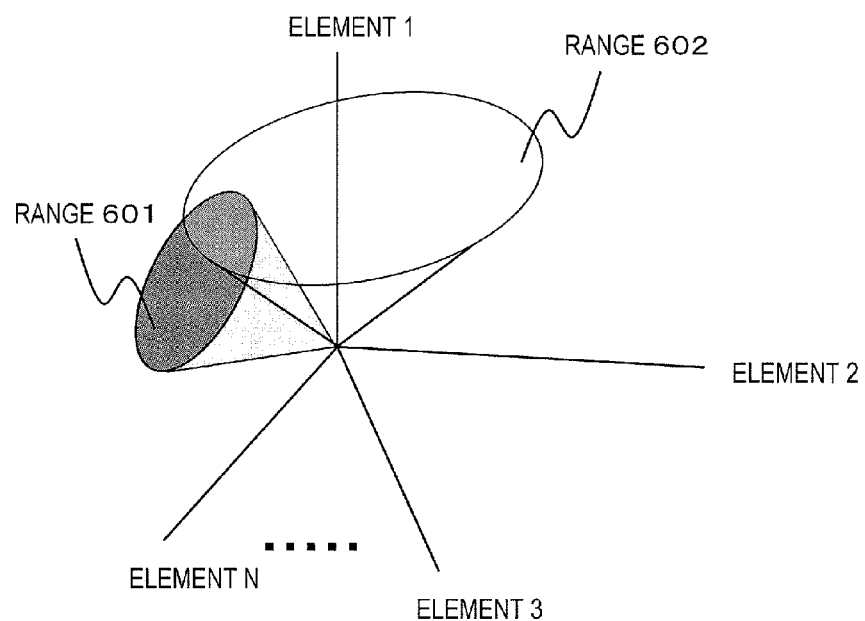

FIG.51
(a)
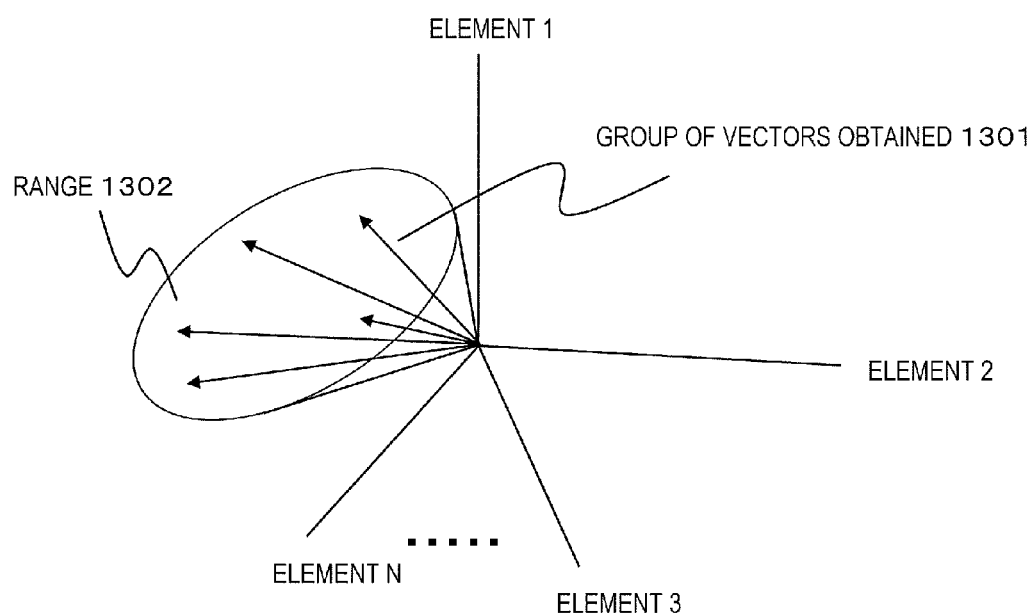
(b)
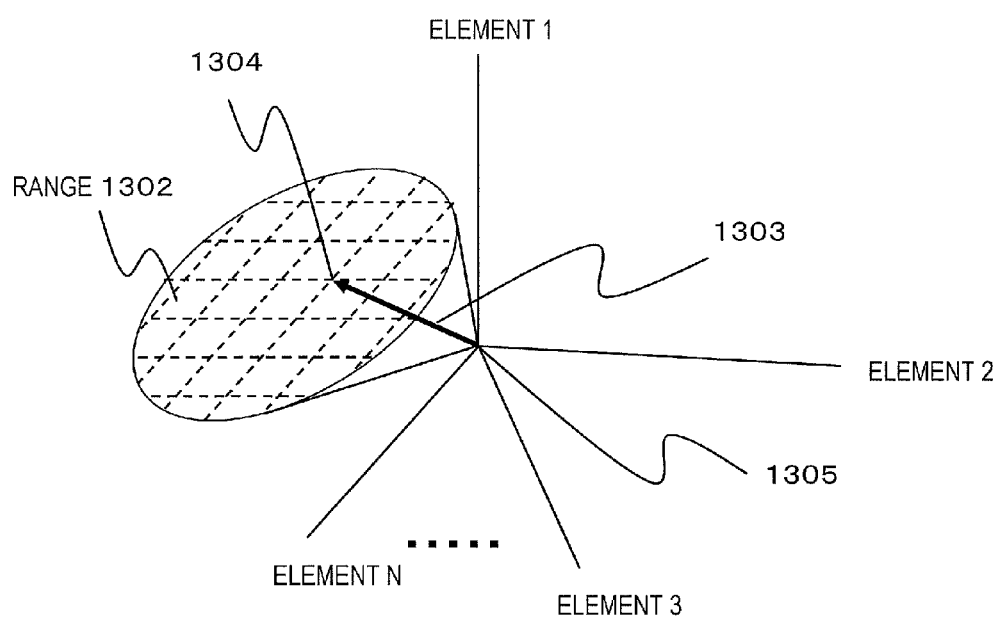

TACTILE PROCESSING DEVICE

TECHNICAL FIELD

The present invention relates to an apparatus, method and program for measuring, by numerical values, a feel that a person would have when he or she touches something and reproducing or searching for such a feel.

BACKGROUND ART

Recently, thanks to amazing performance enhancement of network devices and portable digital or telecommunications devices, telecommunications between two distant locations can be done more and more easily and efficiently year after year. Among other things, visual information conveyance means have developed so rapidly these days that high-definition digital cameras and big-screen display monitors are now available almost everywhere to provide everyone around the globe with highly realistic visual information, no matter where he or she is located. In the meantime, the performance of audio information conveyance means have also been enhanced so astonishingly nowadays that multi-channel reproduction and other techniques now realize wide-range sound field control. Consequently, by making full use of these cutting-edge audiovisual technologies in combination, audiovisual communications with a lot of presence have been spreading more and more extensively these days particularly in the fields of entertainments and business.

And to further increase user's sensation of reality and presence, means for conveying not just such visual or audio information but also any other kind of information that would excite all of the five senses of a human being have been researched and developed extensively lately. That is to say, technologies for conveying or reproducing a feel, a smell or even a taste have been developed actively by a lot of people.

The sense of touch is used by a person who tries to get a feel of something, and he or she may get a "hard/soft feel" or a "smooth/rough feel" by sensing its hardness or surface property. The sense of sight or hearing is a non-contact type sense of a person who has received a light wave or an acoustic wave, whereas the sense of touch is a contact type sense that is not used by a person until he or she actually touches something. That is why if such tactile information conveyance means is combined with the conventional audiovisual information conveyance means, the sensation of reality and presence could be improved by leaps and bounds.

However, to enable a network device or telecommunications device to convey or reproduce the feel that a person has gotten by touching something, the following three major functions need to be realized:
(1) tactile quantification,
(2) tactile sensing, and
(3) tactile display As disclosed in Non-Patent Document No. 1, for example, the tactile quantification can be done by making not only a sensory evaluation to collect data about a person's sensory response but also a factor analysis for representing the feel as numerical values by analyzing the data collected.

The sensory evaluation can be made by presenting a questionnaire sheet 1501 as shown in FIG. 2 to a subject under test who has touched something and having him or her rate his or her feel by numerical values in response to each question, which consists of two adjectives with opposite meanings. Thus, the subject under test needs to tell his or her hard or soft feel by any of the given seven ratings, for example.

According to Non-Patent Document No. 1, the subject under test was made to answer his or her feel of 20 kinds of objects in response to 12 different questions. On the other hand, the factor analysis is a technique for making a multivariate analysis for analyzing respective elements on the supposition that the data observed is a synthetic quantity. Specifically, according to Non-Patent Document No. 1, a result of each sensory evaluation can be summarized into the four factors representing a rough feel, a cold/hot feel, a dry/wet feel, and a hard/soft feel, respectively. That is why the subject's feel can be described quantitatively as a tactile feature quantity vector 1602 in a four-dimensional feature quantity space 1601, of which the four axes are represented by those four factors, as shown in FIG. 3. The tactile feature quantity vector 1602 is a person's quantitative response characteristic that has been obtained through the sensory evaluation experiment and corresponds to a psychological quantity.

As disclosed in Non-Patent Document No. 2, for example, tactile sensing can be done by associating an object's physical property value with the tactile feature quantity vector. The object of Non-Patent Document No. 2 is to make an objective evaluation of a piece of cloth's handling. As represented by the following Equation (1), the handling characteristic Hk of a piece of cloth is represented by making a linear combination of the cloth's dynamics and surface physical property xi:

$$H_k = C_{k0} + \sum_{i=1}^{16} C_{ki} \frac{x_i - \overline{x}_i}{\sigma_i} \quad (1)$$

where xi is one of 16 different kinds of physical measured values including a tensile property value, a bend property value, a shear property value, a compression property value, a surface property value, a thickness property value and a weight property value; Hk is one of 5 different kinds of handling characteristic values consisting of stiffness, smoothness, fullness with softness, crispness and anti-drape stiffness; the over-barred xi represents the average of multiple samples; σi is the standard deviation of the multiple samples; and Ck0 and Cki are constants. The constants Ck0 and Cki are calculated by carrying out a regression analysis on the cloth's dynamics and surface property xi obtained from a number of cloth samples and the handling characteristic Hk. The cloth's dynamics and surface property xi are obtained by putting the object into an instrument and by measuring the target physical property value with the object deformed if necessary (i.e., a tensile, bending, shear or compressive stress applied thereto) by the instrument. As in Non-Patent Document No. 1, the handling characteristic Hk is also determined by making the subject under test feel the object of a sensory evaluation experiment and answer a tactile intensity that he or she has gotten on a texture basis. The processing step of calculating the constants Ck0 and Cki is a so-called "learning processing step" and Equation (1) is perfected by finishing this processing step. After that, the process advances to a "performing processing step" in which the cloth's dynamics and surface property xi of an unknown object are measured and the handling characteristic Hk is estimated by Equation (1). The handling characteristic Hk is also a person's quantitative response characteristic that has been obtained through the sensory evaluation experiment and corresponds to a psychological quantity, too. Consequently, Equation (1) is a physical-psychological transformation equation for use to transform a physical quantity into a psychological quantity and can be used in this example to transform a physical quantity representing the cloth's dynamics and surface property xi into a psychological quantity representing the handling characteristic Hk.

FIG. 4 is a block diagram illustrating the flow of a conventional process including the tactile quantification and sensing processing steps described above. In the learning processing step 1701, the feel of a subject under test 1703 is represented quantitatively using a number of objects 1702 of learning. The subject under test 1703 answers his or her feel of the objects 1702 of learning using sensory evaluation means 1704. Then, his or her answer is subjected to a multivariate analysis, and has its factors analyzed, by factor analyzing means 1705. As a result, a group of those factors is output as a learning material tactile feature quantity vector F. In this case, the tactile feature quantity vector 1602 shown in FIG. 3 and used to describe Non-Patent Document No. 1 corresponds to the learning material tactile feature quantity vector F shown in FIG. 4. Also, in this learning processing step 1701, the physical property values of the multiple objects 1702 of learning are measured by an object physical measuring section 1706. And a result of this measurement is output as a learning material physical property value vector Ps. The cloth's dynamics and surface property xi represented by Equation (1) and used to describe Non-Patent Document No. 2 correspond to the learning material physical property value vector Ps shown in FIG. 4. Physical-psychological transformation calculating means 1707 calculates a function M for transforming the learning material physical property value vector Ps into a learning material tactile feature quantity vector F by the following Equation (2):

$$F = M(P_s) \qquad (2)$$

The means for calculating the constants Ck0 and Cki of Equation (1), which has been used to describe Non-Patent Document No. 2, corresponds to the physical-psychological transformation calculating means 1707. In general, a matrix is used as the function M, and Equation (2) becomes a matrix transformation equation. On the other hand, in the performing processing step 1708, an object under test 1709, which needs to be subjected to a tactile measurement, has its physical property value measured by an object physical measuring section 1706 to obtain a reference material physical property value vector Pt. Using the function M that has been calculated in the learning processing step 1701, a physical-psychological transformation section 1710 transforms the reference material physical property value vector Pt into an estimated tactile feature quantity vector F' by the following Equation (3):

$$F' = M(P_t) \qquad (3)$$

As disclosed in Non-Patent Document No. 3, the tactile display can be done by getting the person's skin deformed by an actuator to make him or her have some feel. According to Non-Patent Document No. 3, an ultrasonic vibrator is used as the actuator and a rough feel and a hard/soft feel are controlled by making use of the squeezing effect produced by the ultrasonic vibrator. As used herein, the "squeeze effect" refers to a phenomenon that pressure is generated in a fluid between two objects that are rapidly approaching each other, and produces a hydrodynamic lubrication effect.

FIG. 5 illustrates the configuration of a tactile display section 1801 and also shows its correlation with a rough feel 1803, a hard/soft feel 1804 and a frictional feel 1805, which are all feels of a person's 1802. The tactile display section 1801 contacts and interacts with the person's finger. In FIG. 5, a part where the tactile display section 1801 and the person 1802 cause interaction is called an "interaction part 1806" which is surrounded with a dashed rectangle.

To present the rough feel 1803 to him or her, the tactile display section 1801 excites the person 1802 with vibrations 1807. In this case, the vibrations 1807 are generated as the sum of the steady-state components 1813 and non-steady-state components 1809 of the amplitude modulation of an ultrasonic vibration section 1808. However, since the non-steady-state components of the amplitude modulation wave would be sensed to be unevenness, of which the height is several ten times as large as the amplitude of the vibrations, the rough feel 1803 is controlled with the non-steady-state components 1809. Also, the higher the velocity of a finger that feels the unevenness of the object, the higher the frequency of vibrations to be transmitted to the finger. Conversely, the lower the velocity of the finger that feels the unevenness of the object, the lower the frequency of vibrations to be transmitted to the finger. That is to say, as the frequency of vibrations to be transmitted to the person's finger is proportional to the velocity of his or her finger, the finger velocity 1810 is measured by a position sensor section 1811 and used to control the non-steady state components 1809.

Also, to display the hard/soft feel 1804 to him or her, the tactile display section 1801 excites the person 1802 with a force distribution 1812, which can be controlled using the steady-state components 1813 of amplitude modulation of the ultrasonic vibration section 1808. However, as described above, the steady-state components 1813 also affect the vibrations 1807. That is why by adjusting the ratio of the amplitude of the steady-state components 1813 to that of the non-steady-state components 1809, influence on the rough feel 1803 can be corrected.

Furthermore, to display the frictional feel 1805 to him or her, the tactile display section 1801 excites the person 1802 with frictional force 1814. Since the squeeze effect produced by the ultrasonic vibrator decreases the coefficient of friction, it is difficult to control the frictional feel independently using only the ultrasonic vibrator. For that reason, the variation in the friction characteristic of the ultrasonic vibrator is corrected by getting a tangent line force 1816 displayed by a force sense displaying section 1815. The tangent line force 1816 is calculated based on the finger velocity 1810 and finger position 1817 that have been detected by the position sensor section 1811 and the person's finger's normal force 1819 that has been detected by a force sensor section 1818. Specifically, first, right after the tactile display section 1801 and the person 1802 have contacted with each other, static frictional force, which has been calculated based on the magnitude of shift from the initial point of contact, is displayed. But if the ratio of the tangent line force displayed to the normal force that has been applied to the tactile display section exceeds the static friction coefficient displayed by the force sense displaying section 1816, kinetic frictional force is displayed to the person 1802.

In this manner, the tactile display section 1801 uses the ultrasonic vibration section 1808 and the force sense displaying section 1815 to excite the person 1802 with the vibrations 1807, the force distribution 1812 and the frictional force 1814, thereby displaying the rough feel 1803, the hard/soft feel 1804 and the frictional feel 1805 to the person 1802. In this case, since the coefficient of friction decreases due to the squeeze effect produced by the ultrasonic vibrator, it is difficult to control the frictional feel by using only the ultrasonic vibrator. For that reason, the frictional feel is corrected with the tangent line force 1816 produced by the force sense displaying section 1815. The tangent line force 1816 is calculated based on the finger velocity 1810, the finger position 1817 and the normal force 1819 that have been obtained by the position sensor section 1811 and the force sensor section 1818.

FIG. 6 is a block diagram illustrating a tactile processor 2100, which is tentatively obtained by the present inventors by virtually combining the tactile quantification and sensing scheme that has already been described with reference to FIG. 4 with the tactile display scheme that has just been described with reference to FIG. 5.

The tactile sensor section 2101 is the same as the one shown in FIG. 4 and the object physical measuring section 1706 calculates a physical property value of the object under test 1709 and outputs the reference material physical property value vector Pt. The physical-psychological transformation section 1710 has already gotten the function M for use to perform a physical-psychological transformation through the learning processing step 1701 shown in FIG. 4 and transforms the reference material physical property value vector Pt into the estimated tactile feature quantity vector F'. The tactile display section 1801 is designed to make the person 1802 touch an actuator section 2102 and have a feel. The actuator section 2102 corresponds to the combination of the ultrasonic vibration section 1808 and force sense displaying section 1815 shown in FIG. 5. An actuator control section 2103 drives the actuator section 2102. The actuator control section 2103 corresponds to the electrical means for vibrating the ultrasonic vibration section 1808 and electrical means for driving the force sense displaying section 1815 which are shown in FIG. 5.

A psychological-physical transformation section 2104 transforms the estimated tactile feature quantity vector F' into an actuator control signal D' so that the feel that has been gotten by the tactile sensor section 2101 can be reproduced by the tactile display section 1801. Such a transformation can be represented by the following Equation (4):

$$D' = Q(F') \tag{4}$$

where the function Q is a psychological-physical transformation function for use to transform the estimated tactile feature quantity vector F', which is a psychological quantity, into the actuator control signal D', which is a physical quantity. This function Q is determined by the input and output characteristics of the tactile display section 1801. That is to say, this function Q is determined by the relation between the actuator control signal D' to be input to the tactile display section 1801 and the person's feel Fo to be output from the tactile display section 1801. Such a relation is represented by the following Equation (5):

$$F_O = V(D') \tag{5}$$

The function V corresponds to the input and output characteristics of the tactile display section 1801. The inverse function of Equation (5) is equivalent to Equation (4). That is why Equation (4) can be rewritten as follows:

$$D' = V^{-1}(F') \tag{6}$$

That is to say, if the estimated tactile feature quantity vector F' is transformed with the input and output characteristics $V^{-1}$ of the tactile display section 1801, the actuator control signal D' to make the person 1802 have a feel on the object under test 1709 can be calculated.

By detecting the feel that a person has when touching something as described above, a tactile feature quantity vector can be obtained and transmitted over a network. As a result, that feel can be reproduced on a tactile display.

CITATION LIST

Patent Literature

Patent Document No. 1: Japanese Patent Application Laid-Open Publication No. 2007-187555
Patent Document No. 2: Japanese Patent Application Laid-Open Publication No. 2003-248540
Patent Document No. 3: Japanese Patent Application Laid-Open Publication No. 11-203019
Patent Document No. 4: Japanese Patent Application Laid-Open Publication No. 8-7182

Non-Patent Literature

Non-Patent Document No. 1: Shirado and Maeno, "Modeling of Texture Perception Mechanism for Tactile Display and Sensor", Transactions of the Virtual Reality Society of Japan, TVRSJ Vol. 9, No. 3, pp. 235-240, 2004
Non-Patent Document No. 2: Niwa, "Handling and Dynamic Properties—Objective Evaluation and Application of Handling", Journal of the Society of Fiber Science and Technology, Japan, Fiber and Engineering, Vol. 46, No. 6, pp. 245-252, 1990
Non-Patent Document No. 3: Shiokawa, Tazo, Konyo and Maeno, "Hybrid Display of Realistic Tactile Sense Using Ultrasonic Vibrator and Force Display", JSME Conference on Robotics and Mechatronics 2008, 1A1-H20, 2008
Non-Patent Document No. 4: Higashiyama, Miyaoka, Taniguchi and Sato, "Sense of Touch and Pain", Brain Publishing Co. Ltd., pp. 104-107, 2000
Non-Patent Document No. 5: Maeno, "Structure and Function of Finger Pad and Tactile Receptors", Journal of the Robotics Society of Japan, Vol. 18, No. 6, pp. 772-775, 2000
Non-Patent Document No. 6: Higashiyama, Miyaoka, Taniguchi and Sato, "Sense of Touch and Pain", Brain Publishing Co. Ltd., pp. 49-50, 2000
Non-Patent Document No. 7: "Instances of Material Search Using KES"
Non-Patent Document No. 8: Kadonami, Konyo and Maeno, "Development of Finger Pad Type Tactile Sensor for Tel-Presentation Systems", ROBOMEC 2008, 1P1-I09, 2008

SUMMARY OF INVENTION

Technical Problem

In the prior art, research and development have been carried on in order to combine all of various feels that a person has gotten from the object and represent the combination as a single tactile feature quantity vector 1602. However, if those various feels were combined into the single tactile feature quantity vector 1602, then it would be impossible to describe a situation where the person gets various feels discretely over a period of time. In other words, the tactile feature quantity vector 1602 always includes a feel that the person is not actually having, and therefore, includes an excessive amount of information and yet decreases the amount of important tactile information.

As disclosed in Non-Patent Document No. 4, for example, a person will usually get various feels by changing the ways of touching (i.e., the statuses of contact between his or her hand and the object). In the tactile display section 1801 shown in FIG. 5, the hard/soft feel 1804 is a feel to be usually gotten by pressing the object, while the rough feel 1803 and the frictional feel 1805 are feels to be normally gotten by tracing the object. Among other things, the frictional feel 1805 is a feel to be caused by a frictional force 1904 that has been produced in a tangential direction with respect to an object 1903 as a result of the tracing movement 1902 done by a finger 1901 as shown in FIG. 7(a). For that reason, no frictional feel 1805 is sensed if a pressing movement 1905 is performed perpendicularly to the tangential line with respect to the object 1903 as shown in FIG. 7(b).

According to such an interpretation, the hard/soft feel 1804 and the frictional feel 1805 can be regarded as feels to be gotten on an individual basis according to the person's hand movement. That is why if the person presses the object to get a hard/soft feel 1804, he or she cannot sense a frictional feel 1805.

As a proof that people get various feels by changing their ways of touching, it is known that the tactile receptor has a frequency sensitivity distribution as disclosed in Non-Patent Document No. 5, for example.

A human fingertip has multiple tactile receptors with mutually different frequency sensitivity distributions. For example, Merkel's cells, Meissner corpuscles, and corpuscles of Pacini have sensitivity distributions such as the ones shown in FIG. 8. In FIG. 8, the ordinate 2001 represents the firing threshold value of the tactile receptor, which is the threshold value of pressing amplitude at which the tactile receptor fires when a person presses the object with his or her fingertip.

In FIG. 8, the abscissa 2002 represents the frequency of the fingertip pressing movement. Among the three tactile receptors, the corpuscles of Pacini 2003 have the highest sensitivity and will fire at a pressing amplitude of 2 μm in response to a vibration of approximately 80 Hz. If the vibration frequency is lowered to 10 Hz, for example, the sensitivity will decrease but the firing threshold value will increase to 100 μm. The corpuscles of Pacini 2003 have a frequency sensitivity distribution, which has peak sensitivity at 100 Hz.

The Merkel's cells 2004 and the Meissner corpuscles 2005 also have their sensitivity varied with the frequency and have frequency sensitivity.

Comparing a person's pressing movement to his or her tracing movement, the pressing movement has a relatively low frequency and the tracing movement has a relatively high frequency, generally speaking. That is to say, it is natural to understand that the frequency at which the skin vibrates by tracing the object with his or her fingertip brought into contact with the unevenness of the object should be higher than the one at which the skin vibrates by pressing his or her fingertip against the object.

Thinking this way, in response to the pressing movement, the Merkel's cells 2004, of which the peak of sensitivity is located in a low frequency range 2006 of approximately 10 Hz or less, will fire mostly. On the other hand, in response to the tracing movement, the corpuscles of Pacini 2003, of which the peak of sensitivity is located in a high frequency range 2007 of approximately 100 Hz, and the Meissner corpuscles 2005, of which the peak of sensitivity is located in a medium frequency range 2008 of approximately 30 Hz, will fire mostly.

That is why we can understand that a person can switch the frequencies represented by the abscissa 2002 in FIG. 8 by changing the modes of movement of touching the object (i.e., by changing his or her "hand movement"), thereby giving a vibration stimulus to those tactile receptors and getting various feels.

If a person's hand movement is seen from the standpoint of vibration frequency selection as described above, we can understand that those feels are gotten discretely over a period of time. For example, it can be said that the hard/soft feel 1804 and the frictional feel 1805 shown in FIG. 5 are not gotten simultaneously but time-sequentially. More specifically, the hard/soft feel 1804 is a feel to be gotten through a pressing movement in which the Merkel's cells 2004, of which the vibration frequency is located in the low frequency range 2006, will fire mostly. In such a pressing movement, the pressing direction defines a normal to the object, and therefore, it is unthinkable that vibrations in the high frequency range 2007, which will be produced mostly as a result of a collision against the surface unevenness, should occur as a result of such a movement. Since no feels to be gotten by the respective tactile receptors are produced unless some vibration stimulus is input to the tactile receptors, only the hard/soft feel 1804 will be gotten mostly by the Merkel's cells 2004.

Conversely, if vibrations in the high frequency range 2007, in which the corpuscles of Pacini 2003 will fire mostly, are produced as a result of the tracing movement, then the Merkel's cells 2004 that contribute to producing the hard/soft feel 1804 have low sensitivity. Consequently, the person will get no hard/soft feel 1804 but the rough feel 1803 or the frictional feel 1805 instead.

As described above, a person gets various feels by changing his or her hand's movement to touch the object, i.e., the modes of "tactile movement". However, if all of those feels that have been gotten from the object were combined together and represented as a single tactile feature quantity vector 1602, then it should be impossible to describe a state in which the person gets those various feels discretely over a period of time. That is why a material search device for searching for a material that will produce a similar feel by using the tactile feature quantity vector 1602 could not make a search with due attention paid to the fact that a person actually gets various feels in one mode of tactile movement to another.

On top of that, the tactile processor 2100 shown in FIG. 6 goes so far so as to always display even a feel that the person is actually not getting. That is to say, since the tactile processor 2100 combines all of various feels gotten from the object under test 1709 into the estimated tactile feature quantity vector F', the tactile display section 1801 will display those feels to the person 1802 at the same time.

For example, if the person 1802 has touched the actuator section 2102 by performing a pressing movement on it, he or she certainly gets a hard/soft feel 1804 of the object under test 1709. However, even though the actuator section 2102 also displays the rough feel 1803 and the frictional feel 1805 at the same time, the person 1802 cannot get the hard/soft feel 1804, the rough feel 1803 and the frictional feel 1805 all at the same time due to his or her hand movement that has been described with reference to FIG. 7 and owing to the vibration frequency selectivity of the tactile receptors that has been described with reference to FIG. 8.

It is therefore an object of the present invention to provide a technique for detecting and reproducing those various feels, which a person gets discretely over a period of time, by time sequential sensing.

Solution to Problem

A tactile processor according to the present invention includes: a movement measuring section for determining a status of contact between a person and an object; a physical measuring section for measuring a physical property value of the object; and a physical-psychological transformation section for generating a tactile feature quantity based on the physical property value that has been measured by the physical measuring section and on the weight of the physical property of an arbitrary object. The weight is variable according to a status of contact between the person and the arbitrary object and is calculated based on not only a physical property value representing the status of contact between the person and the arbitrary object but also a tactile feature quantity representing a feel that the person gets when touching the arbitrary object.

The tactile processor may further include an output section for outputting the tactile feature quantity that has been generated by the physical-psychological transformation section as the quantity of a feel that the person gets when touching the arbitrary object.

The physical measuring section may be able to measure physical property values representing multiple different types of physical properties of the object, and may change the types of physical properties to measure according to the status of contact between the person and the object.

The movement measuring section may obtain a feature quantity representing a hand movement of the person who is feeling the object. The feature quantity representing the hand movement may include at least one of the coordinates of a position on the hand, the coordinates of a point of contact between the hand and the object, the magnitudes of shift in these coordinates, the movement velocity of the hand, and the movement acceleration of the hand.

The physical measuring section may measure, as the physical property value of the object, at least one of the shape of the object and a stress applied to the object.

The tactile feature quantity may include at least one of an uneven feel, a hard/soft feel, a frictional feel and a sticky feel that are defined as factors to be extracted from the sensory response of a subject under test.

The physical-psychological transformation section may collect in advance information about a correlation between a physical property value of the object and a feature quantity representing the feel that the person gets when touching the object. The information may have been collected in advance as either a table that correlates a feature quantity representing the hand movement, a physical property value of the object, and the tactile feature quantity with each other or a function that receives the feature quantity representing the hand movement and a physical property value of an object of learning and outputs the tactile feature quantity.

The tactile processor may further include a tactile display section, which receives the tactile feature quantity from the output section and produces force based on the tactile feature quantity received, thereby making a feeler who touches the display get a feel. The tactile display section may include: a psychological-physical transformation section for transforming the tactile feature quantity, which has been received from a recording section, into a control signal following a predefined transformation rule; a drive section for applying the force to the feeler's hand in accordance with the control signal; and a hand movement measuring section for measuring a feature quantity representing the hand movement of the feeler who touches the tactile display section. The psychological-physical transformation section may receive the tactile feature quantity, which has been stored on the recording section and which is determined by the feature quantity representing the feeler's hand movement.

Another tactile processor according to the present invention includes: a tactile display section for making a feeler who touches the display get a feel by producing force; a physical measuring section for measuring a physical property value of a given object under test in advance; and a physical-psychological transformation section for transforming the physical property value of the object under test measured into a tactile feature quantity by reference to information that has been collected in advance to correlate with each other physical measured values of an object of learning and a feature quantity representing a feel that a person has gotten by touching the object of learning. The tactile display section includes: a psychological-physical transformation section for transforming the tactile feature quantity into a control signal following a predefined transformation rule; a drive section for applying the force to the feeler's hand in accordance with the control signal; and a hand movement measuring section for measuring a feature quantity representing the hand movement of the feeler who touches the tactile display section. The physical measuring section measures the physical property value of the object under test by the measured feature quantity representing the feeler's hand movement.

Still another tactile processor according to the present invention includes: a physical measuring section for measuring a physical property value of an object under test using a physical sensor; a physical sensor movement instructing section for instructing how to move the physical sensor in measuring the physical property value of the object under test; a physical-psychological transformation section for transforming the physical property value measured into a tactile feature quantity by reference to information that has been collected in advance to correlate with each other a physical property value of an object of learning, a feature quantity representing a hand movement of a subject under test who has touched the object of learning, and a feature quantity representing a feel that the subject has gotten by touching the object so that the types and weights of the physical property value to refer to are changed according to the feature quantity representing the hand movement; and an output section for outputting the tactile feature quantity determined as the quantity of a feel that the subject gets when touching the object under test.

The tactile processor may further include a tactile display section, which receives the tactile feature quantity from the output section and produces force based on the tactile feature quantity received, thereby making a feeler who touches the display get a feel. The tactile display section may include: a psychological-physical transformation section for transforming the tactile feature quantity, which has been received from a recording section, into a control signal following a predefined transformation rule; an actuator section for applying the force to the feeler's hand in accordance with the control signal and making the feeler get a feel; and a hand movement measuring section for measuring a feature quantity representing the hand movement of the feeler who has touched the actuator section. The psychological-physical transformation section receives the tactile feature quantity, which has been stored on the recording section and which is determined by the feature quantity representing the feeler's hand movement.

Advantageous Effects of Invention

According to the present invention, tactile sensing and tactile display can get done adaptively to the status of contact between a person's hand and the object, and therefore, only minimum required tactile information, which is indispensable to represent his or her sensation, can be processed non-wastefully. That is why since only a part of the actuator of the tactile display, which contributes to having the person get a particular feel, needs to be driven, the actuator can have its configuration and control simplified.

BRIEF DESCRIPTION OF DRAWINGS

FIGS. 7(a) and 7(b) illustrate a finger's (1901) tracing movement 1902 and pressing movement 1901, respectively.

FIG. 11 illustrates a conventional material search method, which requires the user to specify a target tactile type and its tactile intensity.

FIG. 12 shows an example of a search result obtained and displayed as a result of the questionnaire sheet shown in FIG. 2.

FIG. 13 shows detailed clothing fabric data about Fabric #53, which is included in the learning material tactile feature quantity vector F shown in FIG. 3.

FIGS. 18(a) and 18(b) illustrates how a tactile movement may be measured by using an image sensor.

FIG. 21 shows an exemplary data structure of a tactile movement DB 13.

FIG. 22 shows the concept of a tactile weight DB 18.

FIG. 23 shows an exemplary data structure of a material DB 23.

FIG. 30 shows an exemplary data structure of a tactile weight DB 18a.

FIG. 31 shows an exemplary data structure of a material DB 23a.

FIG. 34 shows an exemplary data structure of a tactile movement probability DB 27.

FIG. 43 shows an exemplary structure of a physical-psychological transformation section 110.

FIGS. 46(a) and 46(b) illustrate a tactile movement feature quantity vector space.

FIG. 51(a) defines a range 1302, which covers every group 1301 of vectors obtained in a tactile movement feature quantity vector space, and FIG. 51(b) shows how a group of vectors that are distributed evenly over the range 1302 has been defined.

DESCRIPTION OF EMBODIMENTS

Hereinafter, preferred embodiments of a tactile processor according to the present invention will be described with reference to the accompanying drawings.

The present invention does pay due attention to, and does take advantage of, the fact that a person gets various feels discretely over a period of time.

Generally speaking, any feel is produced by causing tactile receptors in a person's fingertip to fire, which is in turn brought about by his or her skin's vibrations. And those skin vibrations are generated when he or she touches something. According to the present invention, the feel that a person is getting is described quantitatively based on the status of contact between his or her hand and the object.

The status of contact between a person's hand and a still object is determined by his or her hand's movement. That is to say, if the object is not moving, the status of contact can be described by sensing exactly where the hand has touched the object and what kind of force the hand has applied to that object.

Figure 9:
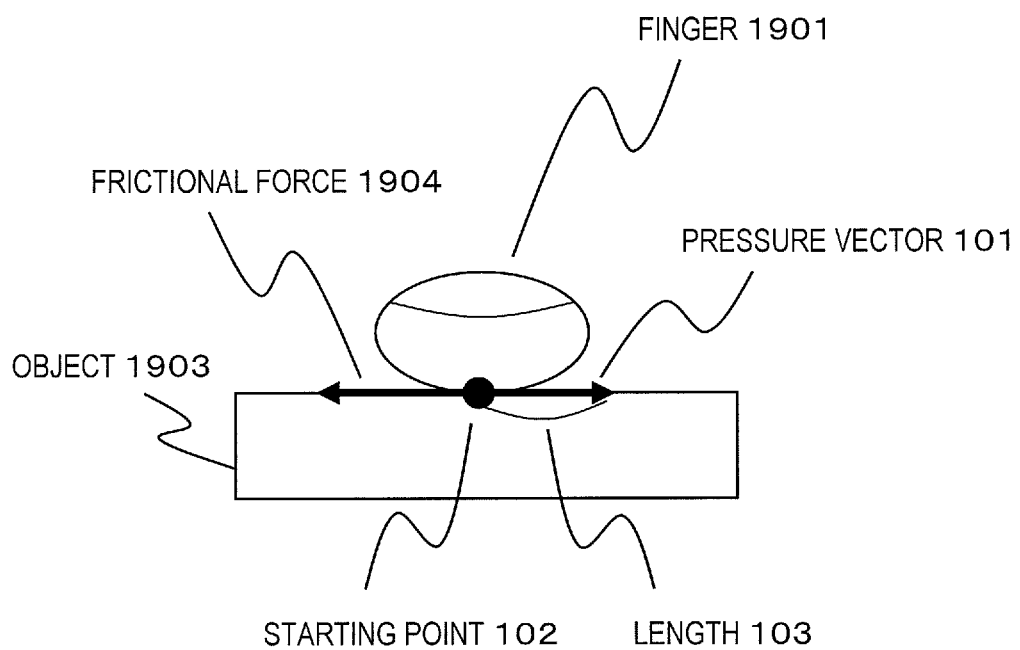
FIG. 9 shows the starting point 102 and the length 103 of the pressure applied by a person's hand.

As shown in FIG. 9, the pressure applied by a person's hand can be represented by the starting point 102 and the length 103 of a pressure vector 101, and the starting point 102 of the pressure vector 101 becomes a point of contact between the person's (1802) fingertip 1901 and the object 1903.

Secondly, the stimulus given to the person's skin elastic body is determined by physical properties that the object 903 has. Examples of the physical properties of the object 903 include hardness, elasticity, viscosity and surface shape. And means for measuring these physical properties is required.

Optionally, every physical property value could be measured redundantly. Nevertheless, basically, it is much less wasteful and far more preferred that only physical property values related to a person's hand pressure be measured. For example, if a person's hand has performed a pressing movement, the object's hardness and its elasticity and viscosity along a normal direction to the object may be measured but its surface shape and its elasticity or viscosity in the tangential direction may not. On the other hand, if a person's hand has performed a tracing movement, it is preferred that the object's surface shape and its elasticity or viscosity in the tangential direction be measured but its hardness and its elasticity or viscosity along a normal be not measured.

After the pressure applied by a person's hand and the object's physical properties have been measured, his or her skin's vibrations and tactile receptors' firing will be described. According to the present invention, this process will be referred to herein as a "black box", and the physical property values that have been measured in advance on the object of learning get directly correlated with the tactile quantity, thereby transforming the physical property values into tactile quantities by performing a matrix transformation or by referring to a table.

Figure 1:
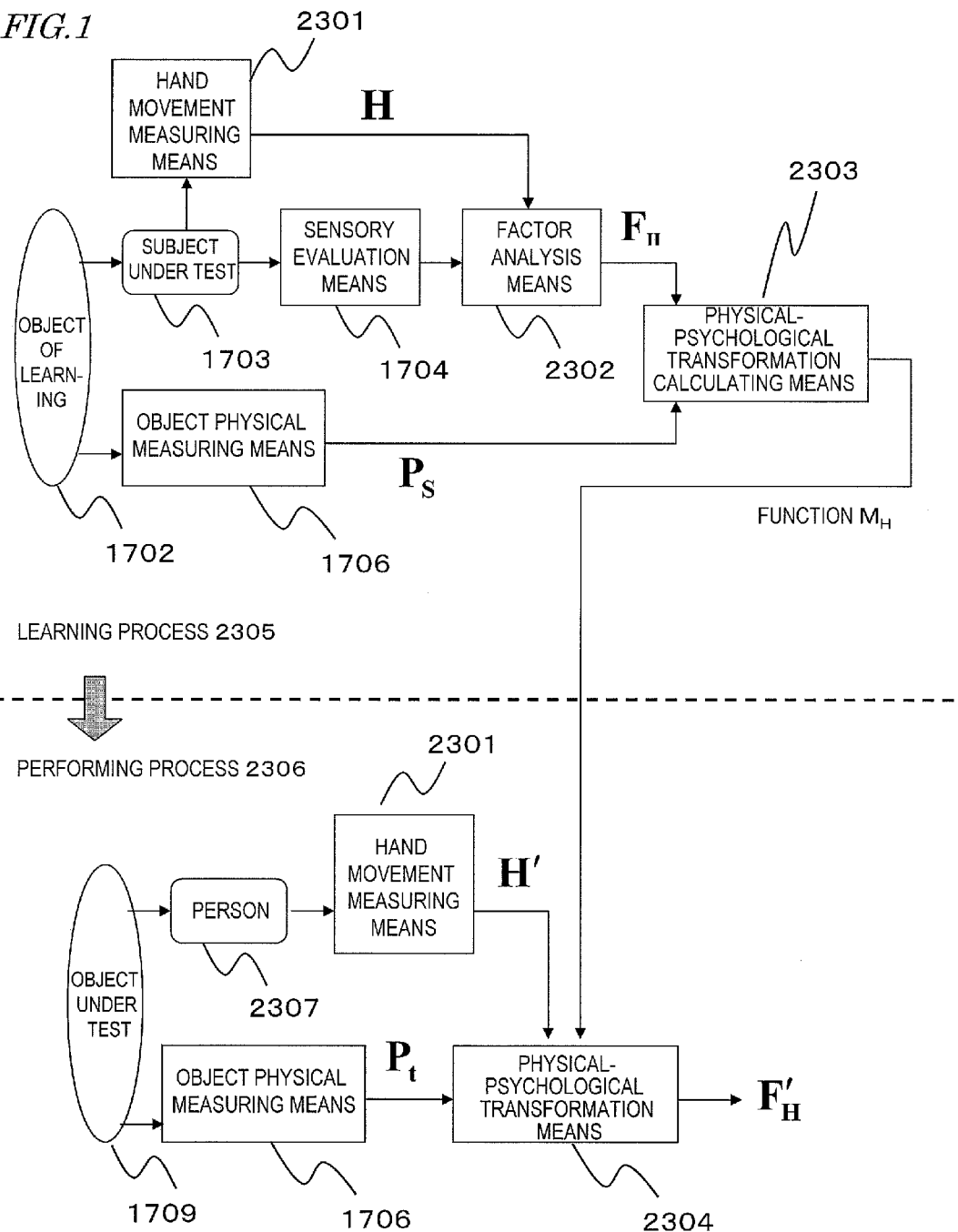
FIG. 1 is a block diagram illustrating the operating principle of a tactile sensor by the two processes 2305 and 2306 of learning and post-learning performing.

FIG. 1 is a block diagram showing, with those fundamentals of the tactile movement taken into account, how a tactile sensor operates in principle. In the example illustrated in FIG. 1, the processing done by the tactile sensor is roughly classified into a learning process 2305 and post-learning performing process 2306.

Figure 4:
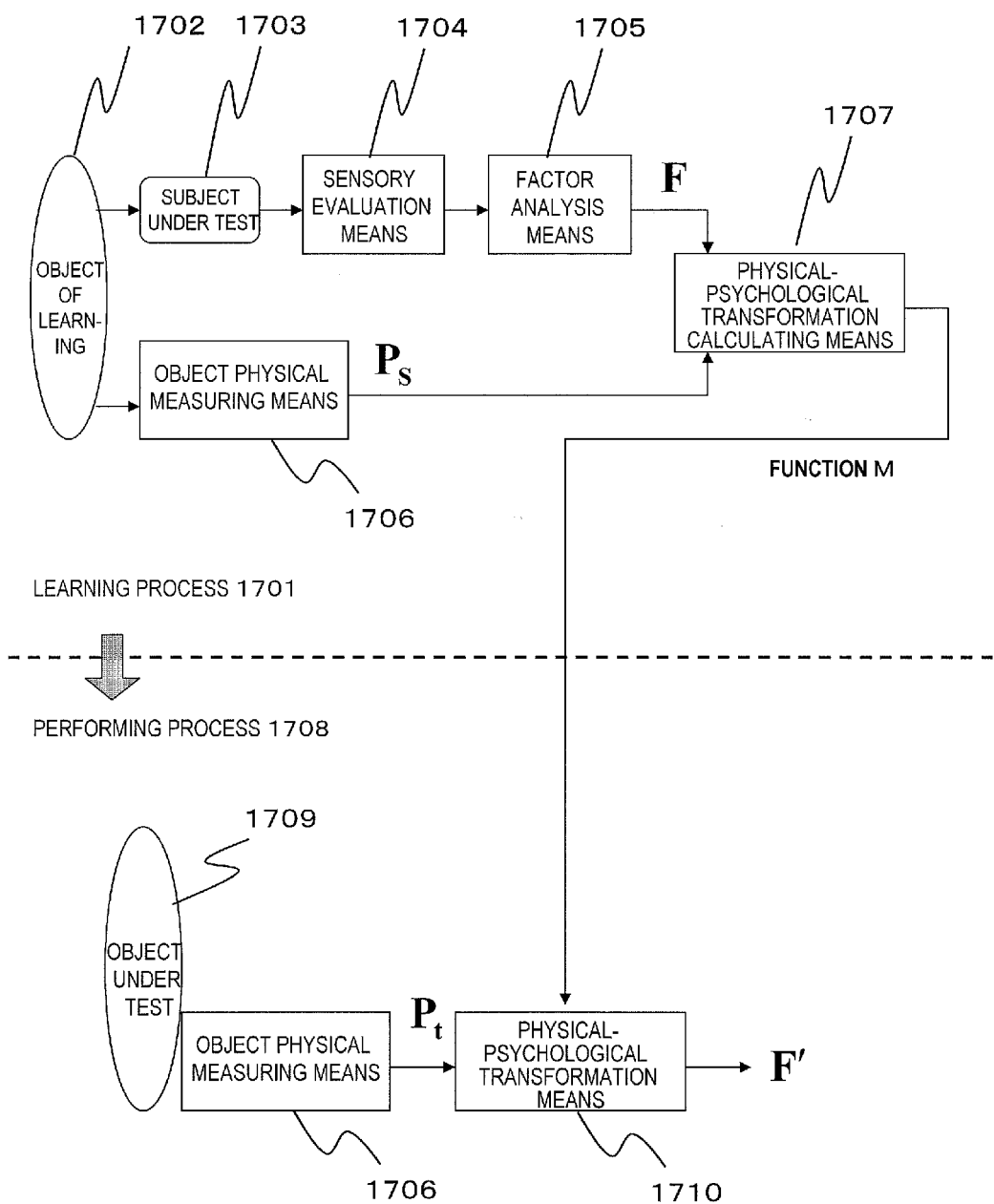
FIG. 4 is a block diagram illustrating the flow of a conventional process including tactile quantification and sensing processing steps.

The configuration shown in FIG. 1 is based on what is shown in FIG. 4 that has already been described as an example of the prior art but further has hand movement measuring means 2301.

In addition, since the factor analysis and the physical-psychological transformation need to be carried out differently according to the pattern of the tactile movement, the factor analysis means 2302, the physical-psychological transformation calculating means 2303 and the physical-psychological transformation means 2304 are different from the conventional ones shown in FIG. 4. Specifically, in the learning process 2305, the tactile movement sensed is classified into a number of patterns as tactile movement feature quantity vectors, the factor analysis is carried out on a pattern-by-pattern basis, and a function $M_H$ for transforming a learning material physical property value vector $P_S$ into a tactile feature quantity vector $F_H$ is calculated individually on a tactile movement pattern basis. In the performing process 2306, one of the functions $M_H$ is selected according to the type of the movement of feeling the object under test and a reference material physical property value vector $P_t$ is transformed into a tactile feature quantity vector $F'_H$.

Figure 2:
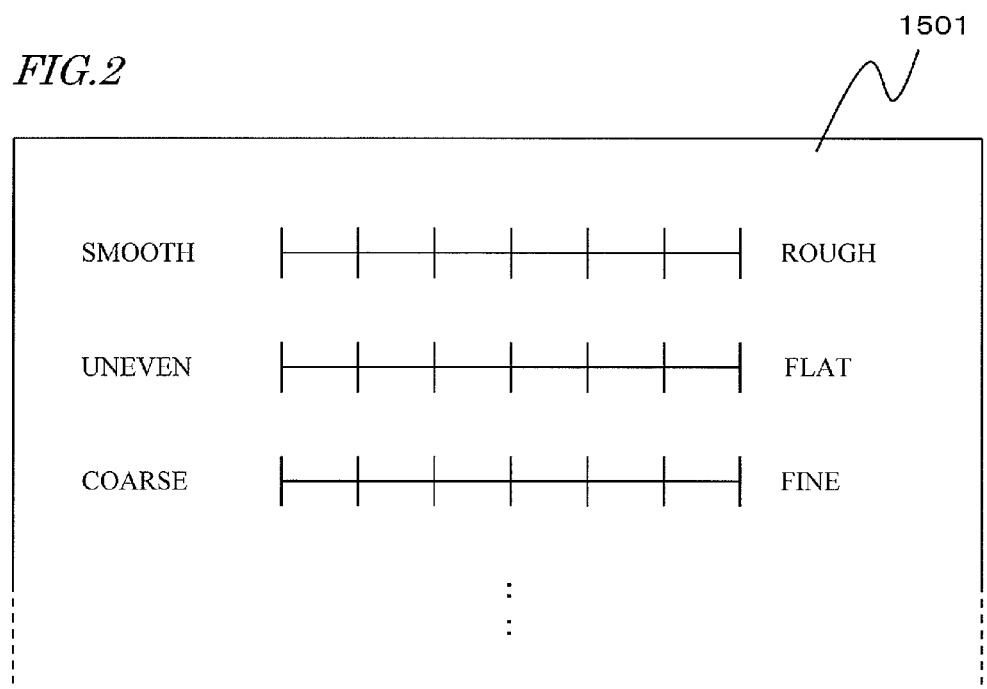
FIG. 2 shows an example of a questionnaire sheet 1501.
Figure 3:
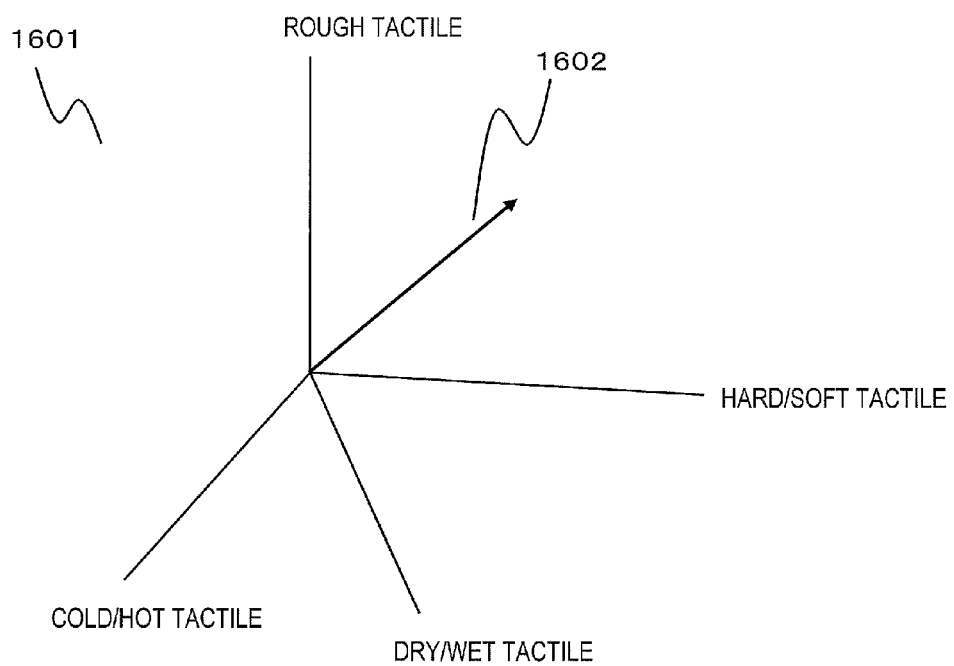
FIG. 3 shows a tactile feature quantity vector 1602 described in a four-dimensional feature quantity space 1601.

A tactile display for reproducing a feel senses a tactile movement, i.e., senses that a person 2307 has touched an actuator. Based on the degree of similarity between the tactile movement feature quantity vector measured and a saved one, a tactile feature quantity to be reproduced on the tactile display is chosen. And the tactile display is driven so as to display the tactile feature quantity. The tactile feature quantity chosen can be said to be an estimated tactile quantity. The tactile quantity is a factor that has been derived from a person's sensory response and can be represented as a psychological quantity about a feel (which may be at least one of an uneven feel, a hard/soft feel, a frictional feel, and a sticky feel). The psychological quantity may be his or her response to questions such as the ones shown in FIG. 2, for example.

According to this configuration, multiple feels that a person is getting time-sequentially can be detected and output with his or her hand's movement.

In the following description, roughly two different kinds of preferred embodiments of the present invention, both of which use the feel that has been estimated according to a person's hand movement, will be described. One of the two relates to a material search device for searching for a material that will produce a similar feel based on the material's feel that a person gets when touching a given material. Such a device will be described as first through third preferred embodiments of the present invention. The other relates to a tactile display for reproducing and displaying a given material's feel. Such a display will be described as fourth through seventh preferred embodiments of the present invention.

As for a material search device to be described as first through third preferred embodiment of the present invention, there is a conventional device for searching for a clothing fabric by using a vocabulary of tactile terms representing the feel (i.e., a handling) that a person will get when touching the clothing fabric and its tactile intensity (see Non-Patent Document No. 7, for example).

Figure 10:
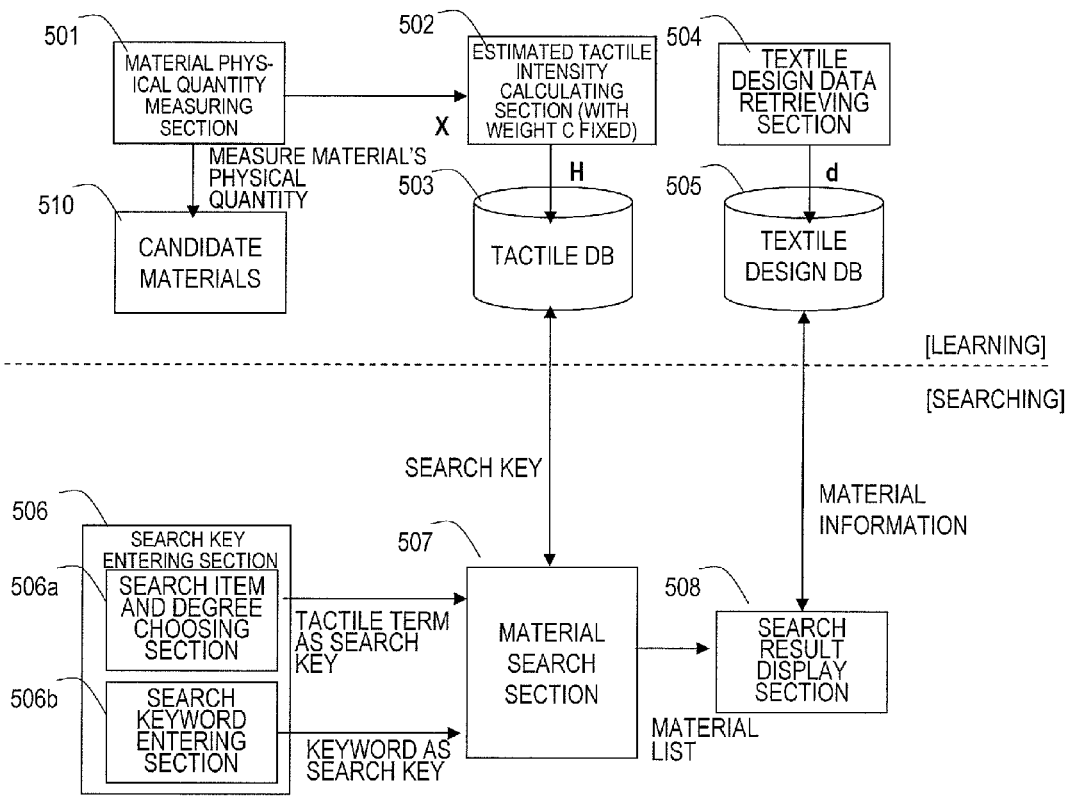
FIG. 10 illustrates a configuration for a conventional material search device.

FIG. 10 is a block diagram illustrating such a conventional material search device. First of all, to help the reader understand how that device works, the functions of that material search device will be described using a dialog box to be displayed during the search.

FIG. 11 illustrates a dialog box displayed on the conventional material search device. In this dialog box, the user can choose any of tactile terms about "stiffness", "anti-drape stiffness" and "scrooping feeling" representing various feels as a search item, and then specifies its tactile intensity to be "high", "moderate" or "low" on an item-by-item basis. In response, the material search device accepts these search keys. At the top of the search key entering dialog box shown in FIG. 11, "stiffness" is chosen as a search item and its degree is specified to be "high".

FIG. 12 illustrates an example in which 130 matching materials have been found in response to the search keys that have been entered in FIG. 11 and in which information about the first 20 materials is displayed. If the user wants to further narrow the search, he or she needs to use a search keyword. For example, the search can be narrowed by entering keywords such as "hemp" representing a material type, "plain woven" representing a weaving type, and "#40" representing the thickness of the yarn.

FIG. 13 shows detailed clothing fabric data about Fabric #53, which is included in the search result shown in FIG. 12. In FIG. 13, the textile design data describes the color, thickness and weaving width of the fabric, the fiber types, thicknesses and twist types of the warp and weft that form the material. On the other hand, the measurement data describes actually measured physical quantities such as the degree of crease worn out and the tactile intensities of "stiffness" and other tactile terms.

Hereinafter, it will be described how the material search device shown in FIG. 10 operates. The material search device operates differently depending on whether it is learning or searching. Specifically, in the learning process, the material search device compiles a tactile database (DB) 503 and a textile design database (DB) 505. On the other hand, in the searching process, a material searching section 507 searches the tactile database 503 using the tactile term and its intensity as search keys, thereby drawing up a list of matching materials. In accordance with the searcher's instruction, a search result display section 508 displays the detailed clothing fabric data of the material that has been chosen from the list of matching materials by reference to the textile design database 505.

The tactile database 503 has "tactile terms $Y_k$" representing the materials' feels and their "tactile intensities $H_k$" (where k=1, 2, ... or 12) for a great number of sample materials. As disclosed in Non-Patent Document No. 2 mentioned above, the tactile intensity $H_k$ can be calculated by substituting a material physical property value xi (where i=1, 2, or 16) into Equation (1).

The relation between the material physical property value xi and the tactile intensity $H_k$ represented by Equation (1) for each tactile term $Y_k$ can be described as follows using a row vector $C_k$, of which the components are weight coefficients $C_{k0}$ and $C_{ki}$, and a column vector X, of which the components are material physical property values xi:

$$H_k = C_k \cdot X \quad (7)$$

where $$C_k = (C_{k0} \ C_{k1} \ ... \ C_{kn}) \quad X = \begin{pmatrix} 1 \\ x_1 \\ \vdots \\ x_n \end{pmatrix}$$

In the following description, the row vector $C_k$ and the column vector X will be referred to herein as a "tactile weight vector" and a "material physical property value X", respectively.

An estimated tactile intensity calculating section 502 calculates the tactile intensity $H_k$ for every tactile term by Equation (7) using the material physical property value X that has been measured by the material physical quantity measuring section 501. The estimated tactile intensity $H_k$ that has been calculated by the estimated tactile intensity calculating section 502 is stored in the tactile database 503 in association with a material number to identify the material.

A textile design data retrieving section 504 retrieves various kinds of information, including the thickness and twist type of the yarn that forms the material/fabric and the weaving type of the cloth, and then stores that information in a textile design database 505 in association with a material number to identify the material.

The search key entering section 506 allows the user to enter the search keys of the conventional material search device disclosed in Non-Patent Document No. 2 mentioned above. First of all, a first search key is entered. A search item and degree choosing section 506a allows the user to choose one of the tactile terms representing the feels such as "stiffness", "anti-drape stiffness" and "scrooping feeling" as a search item and also allows the user to specify its tactile intensity to be one of the three levels of "high", "moderate" and "low" as shown in FIG. 11. In response, the material search device accepts these as search keys. On the other hand, a search keyword entering section 506b is used to accept keywords as search keys and to further narrow the search result that has been obtained by entering the tactile term and the tactile intensity (see FIG. 12) with those keywords.

A material search section 507 searches the tactile DB 503 for a material that matches the search keys that have been entered through the search item and degree choosing section 506a and outputs a list of material numbers of any matching materials. And a search result display section 508 displays the search result as shown in FIG. 12, for example, based on that list. In response, the searcher further chooses his or her favorite material from the list, thereby searching the textile design database 505 for the detailed clothing fabric data such as the one shown in FIG. 13 and getting the detailed data displayed. Such a material search device, however, has the following drawbacks.

First of all, as can be seen easily from the fact that a person is getting various feels discretely over a period of time, the feel that a person gets when touching the material changes according to his or her hand's movement. That is why if a material is simply searched for without paying attention to exactly how he or she intends to feel the material, a material that will make the searcher have a different feel from his or her expected one could be returned as a search result.

Secondly, the tactile terms to be used as search keys in the example shown in FIG. 11 are jargons that can be correctly understood only by experts in that business, and it is difficult for a general consumer to imagine exactly what the feel represented by such a jargon would be like. Also, even if those tactile jargons are replaced with normal terms such as "soft" that are easily understandable for even general consumers, a specific feel to be imagined from the same term will actually be different from one person to another. Furthermore, even if the tactile intensity is represented to be high, moderate or low or even by a numerical value, the specific intensity imagined will also be different from one person to another. For these reasons, even the result that has been obtained by searching various materials with such verbal or numerical search keys could be quite different from the one expected by the searcher.

Thus, material search devices that can overcome such problems will be described as first, second and third specific preferred embodiments of the present invention.

In the following description, a feel is supposed to be represented by the "specific type of the feel" and its "tactile intensity". For example, a material may have a "rough feel" with a tactile intensity level V. When the device of the present invention is used, however, the user does not have to enter any term such as the "rough feel" or any numerical value representing the tactile intensity such as "level V". The "specific type of the feel" and the "tactile intensity" are references by which the material search device of the present invention classifies the given material qualitatively or quantitatively. And the material search device gets parameters representing the "specific type of the feel" and "tactile intensity" by observing the user's hand movement, for example, and compiles a database based on those parameters.

Hereinafter, preferred embodiments of the material search device of the present invention will be described with reference to the accompanying drawings.

Embodiment 1

A device for searching for a material by estimating the specific type of the feel to be gotten particularly intensely by the feeler and its tactile intensity by observing his or her fingertip's movement (i.e., by determining what kind of tactile movement has been performed) will be described as a first specific preferred embodiment of the present invention. This device estimates the tactile intensity H by the following Equation (8), which is obtained by modifying Equation (7):

$$H(m) = C(m) \cdot X \quad (8)$$

where m is a variable representing the kind of the tactile movement and will be referred to herein as a "tactile movement variable m". This equation means that a tactile weight vector for use to obtain the tactile intensity is variable with the tactile movement variable m and that if a different type of tactile movement is performed on a material, then a different tactile intensity H will be obtained.

For example, the tactile intensity $H(m1)$ to be obtained when a tracing movement is performed on a material and the tactile intensity $H(m2)$ to be obtained when a pressing movement is performed on the same material are different from each other. Also, for the reasons described above, the specific type of the feel to be gotten particularly intensely also changes depending on what kind of tactile movement has been performed. Specifically, if a tracing movement has been performed, the person will feel the unevenness of the material particularly intensely. On the other hand, if a pressing movement has been performed on that material, then he or she will feel the softness of that material particularly intensely.

As there would be a certain relation between the tactile movement and the feel a person gets, the feel a person will get can be estimated by carrying out a feeling experiment on a subject under test and determining in advance that relation between the tactile movement and his or her feel based on the result of the experiment. Consequently, there is no need to perform the process of attempting to describe verbally, or represent numerically, the feel a person is getting by making learning through experiments on a subject under test, and therefore, the instability of the verbal description or numerical representation can be eliminated. No matter whether it is a skilled person with a deep understanding of tactile terms or a general user who is not familiar with such tactile jargons, he or she should get the same feel as long as their tactile receptors fire at the same level. For that reason, by monitoring the tactile movement that determines the vibrations set up in the tactile receptors, the feel should be able to be estimated, irrespective of the knowledge of the feeler.

Furthermore, according to this preferred embodiment, close attention is also paid to the specific type of the feel a person is getting particularly intensely. As described above, the type of the feel to be gotten particularly intensely changes depending on what kind of tactile movement is performed. In other words, if a person wants to get a particular type of feel intensely, he or she should perform the best kind of tactile movement to get it That is why if the relations between different kinds of tactile movements and various feels to be gotten as a result are learned in advance, the specific type of the feel a person is going to get can be estimated by observing his or her tactile movement. According to the conventional technique disclosed in Non-Patent Document No. 2, the user is prompted to specify the type of the feel he or she likes and its tactile intensity, and his or her favorite materials are searched for by using them as search keys as shown in FIG. 11. But according to the present invention, a similar function can be performed by estimating the specific type of the feel a person is getting particularly intensely through a tactile movement even without forcing him or her to describe verbally the type of the feel of the material he or she is looking for, which should otherwise be done in the prior art.

It has been described what effects will be achieved by considering the kind of the tactile movement being performed by a person who is making a tactile search for his or her favorite material and how that works in principle.

Hereinafter, the flow of the processing to be performed to search for a material will be described with reference to FIG. 14, which illustrates a configuration for a material search device 800 according to this preferred embodiment.

To find a material that will have a particular feel using a search server on a network, for example, the feeler 20 uses this material search device 800. First of all, the feeler 20 feels a reference material that has the same feel as that of a material to be searched for. For example, if he or she wants to search for a material that will have a soft feel when pressing the reference material 22, then the feeler 20 presses the reference material 22. On the other hand, if he or she wants to search for a material that will have a smooth feel when tracing the surface of a material, then the feeler traces the surface of the reference material 22. In response, the material search device 800 observes his or her tactile movement and measures the physical property values of the reference material, thereby estimating the type of the feel he or she is now getting and its tactile intensity. Then, using them as search keys, the device searches the database for materials that will give him or her exactly the same type of feel as the estimated one and that will have a similar tactile intensity, and presents the materials found to the feeler (i.e., searcher). As a result, similar materials can be searched for by the particular type of the feel to be gotten.

To perform such a function, the material search device 800 carries out processing that has roughly the following flow.

The material search device 800 gets the material physical property value X of the reference material 22 measured by a material physical quantity measuring section 1 and also gets the fingertip movement of the feeler 20 who is feeling the reference material 22 observed by a movement physical quantity measuring section 10. The feeler's tactile movement thus observed is eventually transformed by a movement feature quantity calculating section 11, a tactile movement DB 13 and a tactile movement estimating section 17 into a tactile movement variable m, which is used to identify the kind of the given tactile movement among a finite number of kinds of tactile movements. The tactile movement variable m is regarded as representing a movement to get a particular feel. That is why a tactile weight vector search section 19 determines a tactile weight vector C(m) to estimate the tactile intensity of that type of feel by the tactile movement variable m.

Using the tactile weight vector C(m) that has been determined based on the material physical property value X of the reference material and on the kind of the tactile movement observed, a material tactile estimating section 2 estimates, by Equation (8) mentioned above, the tactile intensity H of the particular type of feel to be gotten by the feeler 20 when touching the reference material 22 and represented by the tactile movement variable m. A material DB stores in advance the tactile intensities of multiple candidate materials, which are classified by the tactile movement variable m (i.e., on a tactile type basis). A material search section 3 searches the material DB 23 for a material, of which the tactile intensity H is closest to what has been calculated by the material tactile estimating section 2, using the tactile movement variable m of the feeler 20 as a search key. The search result is displayed on a search result display section 7. And the feeler 20 can confirm the search result by reference to text information, image information or any other kind of information that is displayed on the search result display section 7. In this manner, according to the specific type of feel that has been estimated by observing the feeler's tactile movement, a material that will have a similar feel to the reference material is searched for and displayed.

The material search is carried out as outlined above. Hereinafter, it will be described one by one exactly how each of those sections works.

The material physical quantity measuring section 1 measures the material physical property value X of the reference material. The material physical property value X may be any arbitrary kind of measured value. For example, the material physical property value X may represent the surface shape of the material by its flatness or unevenness, its friction property by its smoothness or roughness, or its elasticity by its softness or hardness. The material physical property value X may also be measured by any arbitrary method, too.

Figure 15:
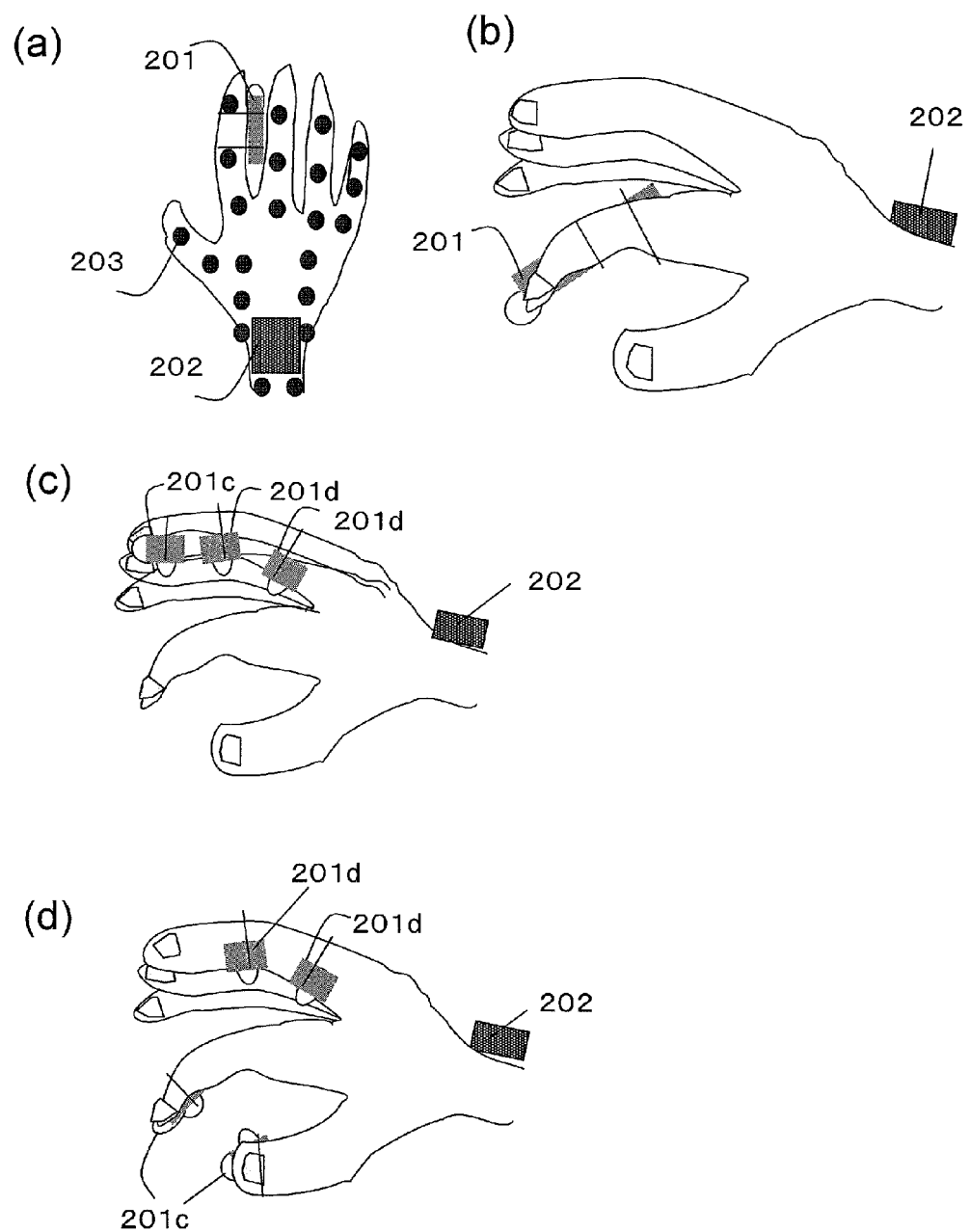
FIG. 15 illustrates exemplary arrangements of devices for measuring a physical property value of a material.
Figure 17:
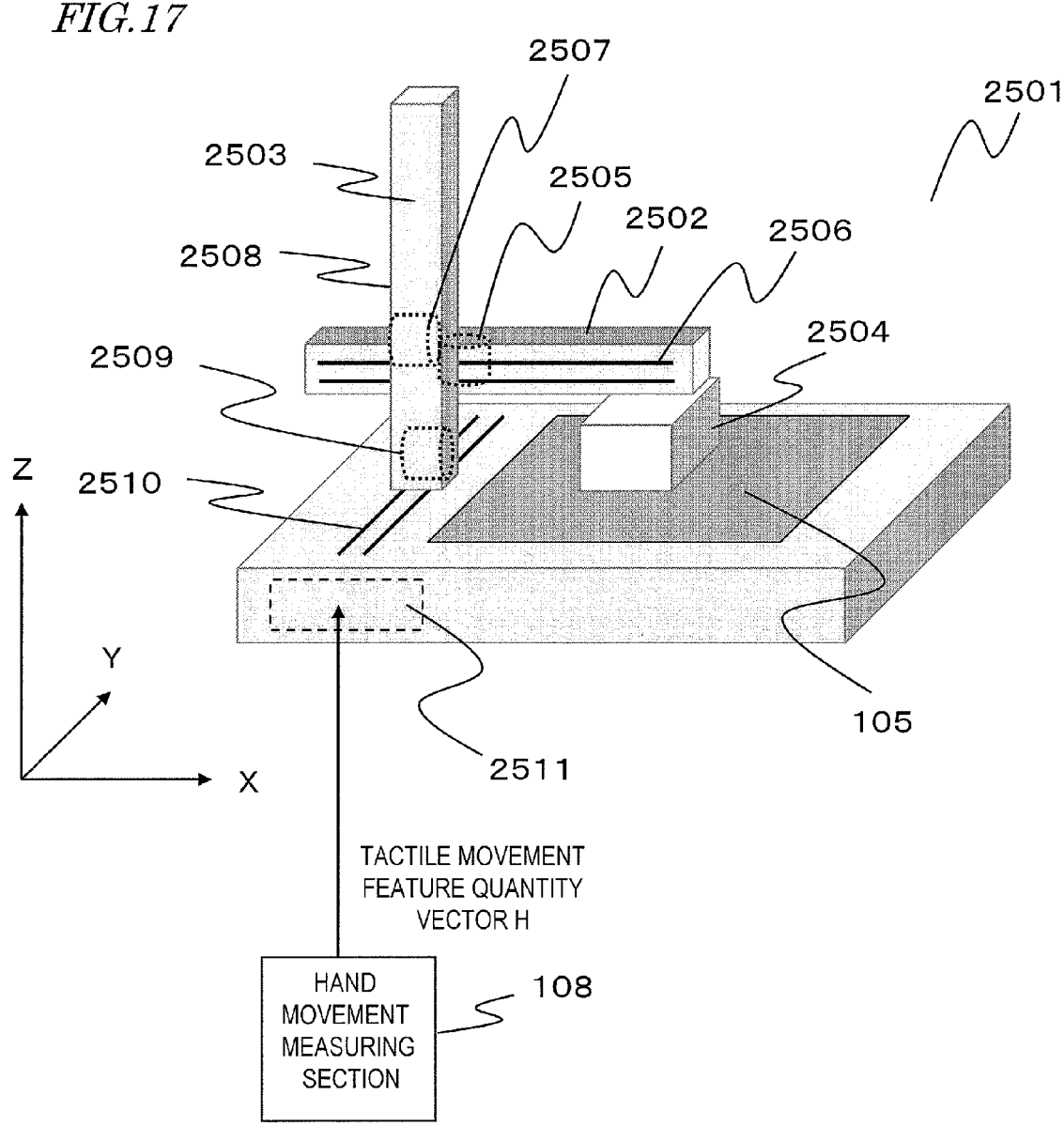
FIG. 17 illustrates an exemplary configuration for an object physical measuring section 109.

Nevertheless, it is preferred that the material physical property value X be measured according to the kind of the feeler's fingertip movement as shown in FIGS. 15 and 17. This is because if the fingertip has pressed the material, the elasticity represented by softness or hardness should be detected but the friction property that is unlikely to have anything to do with the pressing movement should be redundant information in most cases.

Specifically, the sensor 201 shown in FIG. 15(*a*) measures the material physical property value X. The sensor 201 is fixed on the feeler's fingers so as to contact with the material following the feeler's hand or finger movement. And while the user is getting a feel of the material, the sensor 201 measures the material physical property value X at the same time.

Figure 16:
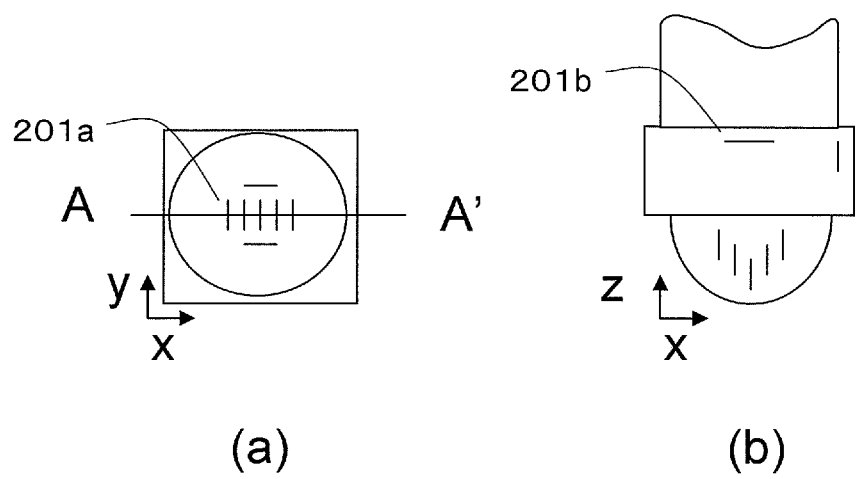
FIGS. 16(a) and 16(b) are respectively a top view, and a cross-sectional view as viewed on the plane A-A' shown in FIG. 16(a), of a sensor.

FIGS. 16(*a*) and 16(*b*) are respectively a top view, and a cross-sectional view as viewed on the plane A-A' shown in FIG. 16(*a*), of a sensor that can measure the material's surface shape to be represented by its flatness or unevenness, its frictional property to be represented by its smoothness or roughness and its elasticity to be represented by its softness or hardness. Such a sensor is disclosed in Non-Patent Document No. 8, for example.

This sensor has a shape similar to a human finger. As shown in FIG. 16(*a*), in this sensor, five strain gauges 201*a* and two strain gauges 201*a* are embedded in the X- and Y-axis directions of an elastic body. In addition, force sensors 201*b* are also arranged in the x- and z-axis directions, too, as shown in FIG. 16(*b*).

The feature quantities representing the tactile movement (i.e., the surface shape represented by flatness or unevenness, the frictional property represented by smoothness or roughness and the elasticity represented by softness or hardness) are calculated based on the outputs of the material physical property value strain gauges 201*a* and force sensors 201*b*. Specifically, the spatial frequency and the amplitude of the unevenness are calculated based on variations in the strains measured by the strain gauges 201*a* and the direction of the unevenness is calculated based on the output ratio of the strain gauges 201*a*. These are feature quantities corresponding to the surface shape to be represented by flatness or unevenness. In addition, the variance of the strain distribution obtained by the strain gauges 201*a* is also calculated and corresponds to the frictional property to be represented by smoothness or roughness. And by calculating the ratio of the forces that have been detected in normal and tangential directions by the force sensors 201*b*, the elasticity to be represented by softness or hardness can be obtained.

On the other hand, FIG. 17 illustrates an exemplary configuration for measuring the physical property value of an object under test by moving a physical measuring sensor in an XYZ three-dimensional stage 2501, in which a physical measuring sensor 2504 is held by two supporting poles 2502 and 2503. The supporting pole 2502 is driven not only by a motor 2505 so as to move in the X-axis direction along a rail 2506 but also by a motor 2507 so as to move in the Z-axis direction along a rail 2508. On the other hand, the supporting pole 2503 is driven by a motor 2509 so as to move in the Y-axis direction along a rail 2510. According to the tactile movement feature quantity vector H, a motor control section 2511 controls running of these motors 2505, 2507 and 2509, thereby moving a physical measuring sensor 2504 so that the sensor 2504 follows the feeler's hand movement. That is to say, if the feeler 20 has performed a pressing movement, the motor 2507 is driven to move the physical measuring sensor 2504 in the Z-axis direction. On the other hand, if the feeler 20 has performed a tracing movement, the motors 2505 and 2509 are driven to move the physical measuring sensor 2504 within the X-Y plane.

According to the present invention, any arbitrary type of physical measuring sensor 2504 may be used. However, to estimate the tactile quantity representing a person's feel by the physical property value, the physical measuring should be carried out so that the accuracy of the estimation meets a predetermined standard. For that reason, in most cases, there are a number of physical property values to measure by using a hardness meter for measuring an object's hardness and a tribometer for measuring a coefficient of friction, for example. On the other hand, if a single-function physical measuring sensor that can measure only one kind of physical property values needs to be used, then the measurements should be done a number of times by changing the physical measuring sensors 2504 each time. Meanwhile, if a sensor that can measure multiple different kinds of physical property values (representing the surface shape, elasticity and frictional property) by itself is used as disclosed in Non-Patent Document No. 8, the number of physical property value measuring process steps can be reduced.

Optionally, the physical property such as the surface shape can also be measured by optical measuring means such as a laser diode. That is why according to the present invention, the physical measuring sensor 2504 could be a sensor that makes measurements without contacting with the object.

Next, it will be described in detail exactly how to determine the tactile movement variable m by the kind of tactile movement that the feeler 20 is performing. In this case, the movement physical quantity measuring section 10 for measuring the feeler's tactile movement may make its measurement in any arbitrary manner. For example, an image sensor, an acceleration sensor or a piezoelectric sensor may be used. FIG. 18 illustrates how the tactile movement may be measured by using an image sensor. Specifically, FIG. 18(a) illustrates a situation where the feeler's hand 2201 is now feeling an object under test 105. The image sensor 202 captures the hand 2201 entirely and shoots the hand 2201 sequentially as either a moving picture or a series of still pictures. An image feature point extracting section 203 extracts edges or points with a significant variation in luminance from one of those sequential shots after another. Such a significant variation in luminance will occur on the boundary between the hand 2201 and the object under test 105, on the boundary between his or her crossed fingers or at his or her articulations. That is why the image feature point extracting section 203 can detect a rough profile of the hand. Using the pixel values that form the edges and points that have been extracted by the image feature point extracting section 203, a hand movement feature calculating section 204 calculates a tactile movement feature quantity vector H. Specifically, as shown in FIG. 18(b), two temporally consecutive pictures 205 and 206, which have been shot at times T1 and T2, respectively, are superimposed one upon the other, and each feature point where their pixel values match each other is tracked, thereby defining a tactile movement feature quantity by the changes of their x and y coordinates. For example, a thumb movement vector 207 may be defined by the changes of thumb coordinates (x1, y1). An index finger movement vector 208 may be defined by the changes of index finger coordinates (x2, y2). And a ring finger movement vector 209 may be defined by the changes of ring finger coordinates (x3, y3). Combining these three movement vectors (x1, y1, x2, y2, x3, y3), a tactile movement feature quantity vector H is obtained. In this case, the number of dimensions of the tactile movement vector may be any other number. For example, if two image sensors are used, the distances from the image sensors to each feature point can be calculated by the principle of triangulation. In that case, a three-dimensional vector can be obtained by adding the distance D to xy coordinates. Also, information about a point of contact between the object and the hand itself is important, and therefore, not just the changes of those coordinates but also the hand position coordinates (x, y) or (x, y, z) are important pieces of information as well.

Figure 19:
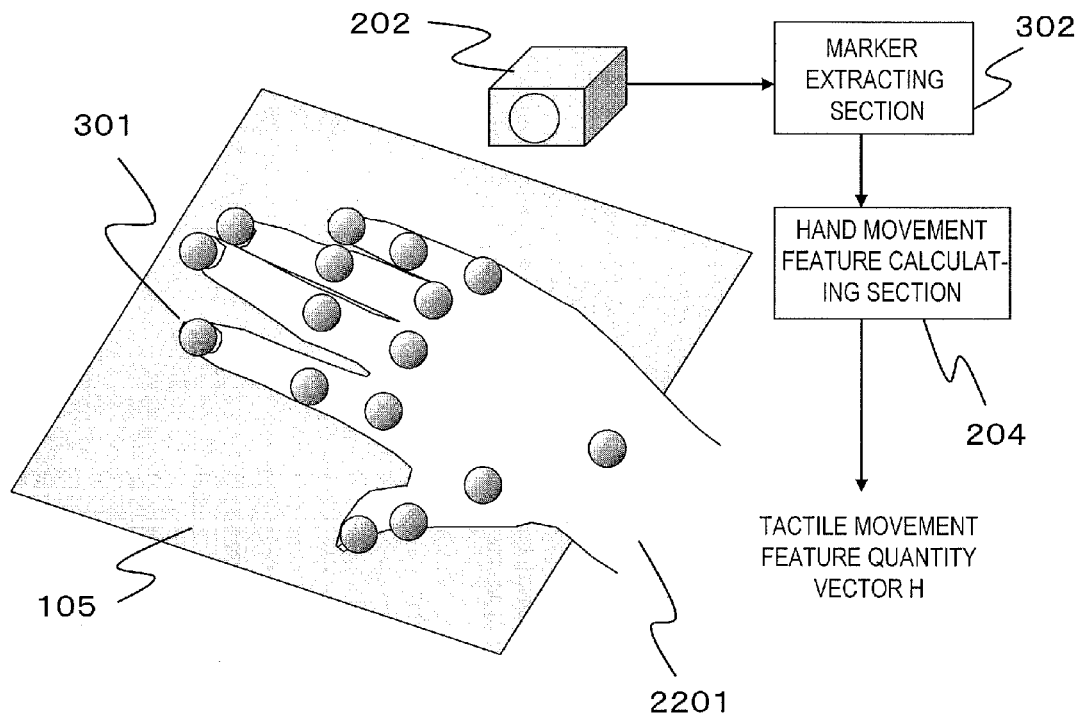
FIG. 19 illustrates an example in which markers are attached to the feeler's fingertips and articulations.

Since the feel cannot be determined unless the feeler moves his or her hand, the movement of his or her fingertips and articulations is important according to the present invention. That is why it is also effective to track the movements of particular feel determining sites with markers attached to those sites. FIG. 19 illustrates an example in which markers are attached to the feeler's fingertips and articulations. In this example, five markers are attached to his or her fingertips, ten markers are attached to his or her finger articulations, and one marker is attached to his or her wrist. An image sensor 202 shoots the hand 2201 with those markers 301 and a marker extracting section 302 extracts the markers 301 from the image shot. In this case, in order to extract the markers 301 as accurately as possible, either the brightness or color of the markers 301 is set to be different from that of the hand 2201 or the object under test 105. As in the example shown in FIG. 18(b), a hand movement feature calculating section 204 tracks the coordinates of each marker's center from the time T1 to the time T2 and defines a tactile movement feature quantity vector H by the changes of its x and y coordinates.

If the tactile movement is observed with an acceleration sensor, the acceleration sensor is also attached to the feeler's fingertips or articulations as in the situation where markers are attached as shown in FIG. 19. When an acceleration sensor is attached, however, there is no need to perform shooting separately unlike the situation where the image sensor 202 is used but the acceleration sensor attached makes measurements by itself. If the acceleration is differentiated, the velocity can be obtained. If the acceleration is subjected to a second order differentiation, the position can be obtained. And by reference to the positional information, the movement of a corresponding feature point is calculated as in the situation where an image sensor is used, thereby calculating a tactile movement feature quantity vector H.

Figure 20:
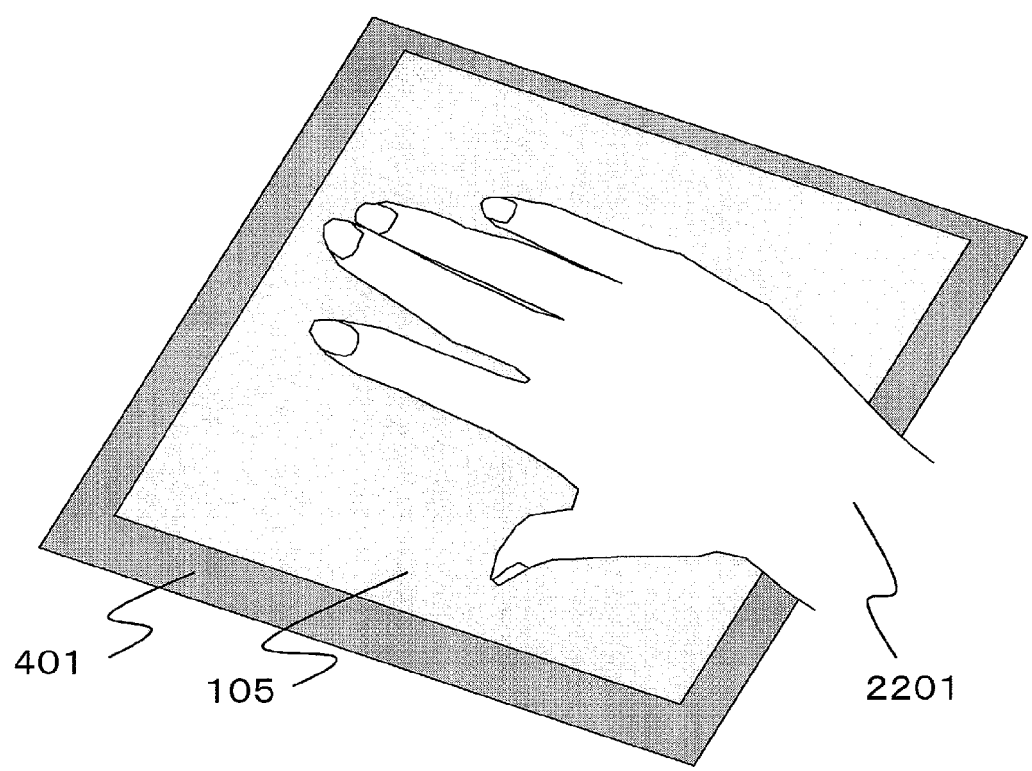
FIG. 20 illustrates an example in which a piezoelectric sensor 401 is arranged under an object under test 105.

Furthermore, if the tactile movement is observed with a piezoelectric sensor, the piezoelectric sensor 401 is arranged under an object under test 105 as shown in FIG. 20. In the piezoelectric sensor 401, piezoelectric transducers that will produce electromotive force under pressure are arranged to form a two-dimensional array, thereby sensing the position where the feeler's hand 2201 touches the object under test 105.

Figure 14:
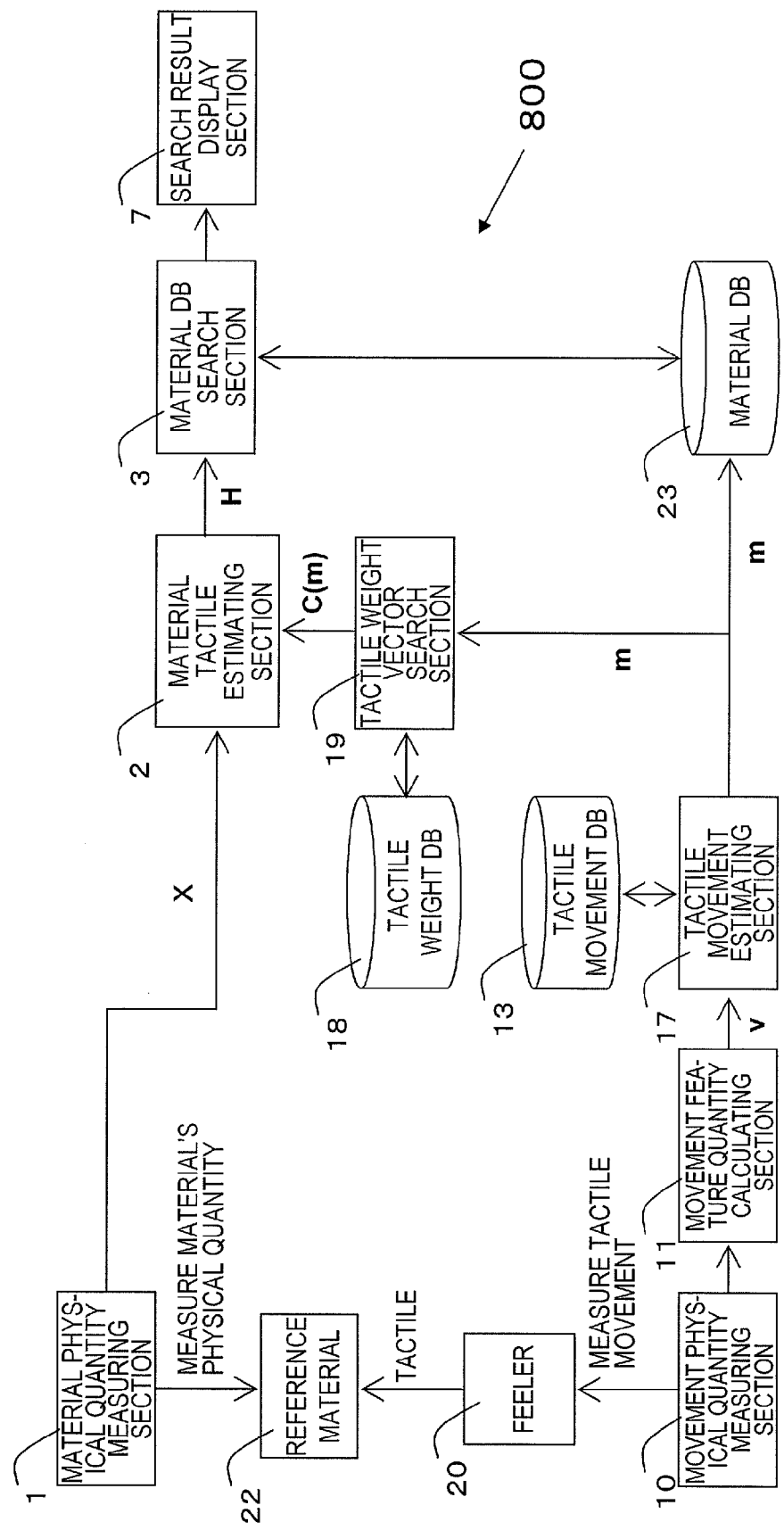
FIG. 14 illustrates a configuration to be used by a feel-based material search device 800 according to a first preferred embodiment of the present invention mostly to make a search.

The movement feature quantity calculating section 11 shown in FIG. 14 transforms the movement physical quantity that has been measured by the movement physical quantity measuring section 10 into a tactile movement feature quantity vector v, which is a time series of a vector representing the feature of a movement and which is used by the tactile movement estimating section 17 to determine what kind of tactile movement is being performed. Specifically, the tactile movement feature quantity vector v refers to a collection of records of the XYZ coordinates and the velocity, rotation and other parameters in the XYZ axis directions of the hand or fingertip at each point in time t. Alternatively, the movement can be represented by rotational components on XY axes, rotational components on YZ axes, rotational components on ZX axes or six components in total. Furthermore, by paying attention to the fact that a tactile movement usually involves reciprocation and rotation, the iterative movement may be detected by a technique such as auto-correlation analysis, and those parameters for one period and parameters representing their numbers of times of repetition and their periods may be combined together. Optionally, those parameters may be data that has been quantified to a practically sufficient resolution.

The tactile movement estimating section 17 searches the tactile movement DB 13 with the tactile movement feature quantity vector v that has been supplied from the movement feature quantity calculating section 11, thereby outputting a tactile movement variable m.

The tactile movement DB 13 describes the relation between the tactile movement feature quantity vector v and the tactile movement variable m for use to identify the kind of the tactile movement. Taking even subtle differences in velocity into consideration, tactile movements can have an infinite number of kinds of movements. However, if only the type of the feel and the tactile intensity can be estimated, those various tactile movements could be classified into a finite number n of groups. And each of those groups is associated with a "tracing movement" or a "pressing movement", for example.

For example, if the variation in movement physical quantity represents repetitive vertical movements perpendicular to the material, then the tactile movement is classified into the group of "pressing movements". On the other hand, if the variation in movement physical quantity represents linear movements parallel to the material (e.g., repetitive horizontal movements parallel to the surface of the material), the tactile movement is classified into the group of "tracing movements". Furthermore, if angle information representing the feeler's finger movements indicates that he or she is bending and unbending his or her fingers at a time, then the tactile movement is classified into the group of "grabbing movement".

The tactile movement variable m is used to identify the group to which the tactile movement sensed belongs. In this case, the tactile movement variable m may be either a mere identification label indicating a particular group or a tactile movement feature quantity vector $v_{ave}$ representing an average movement of the group. What is stored in the tactile movement DB 13 is the relation between tactile movement feature quantity vectors v representing various kinds of tactile movements and the tactile movement variables m indicating their groups. For example, a lookup table showing correspondence between the tactile movement feature quantity vectors v and the tactile movement variables m can be stored there.

FIG. 21 shows an example of the tactile movement DB 13 in the format of a lookup table. In this example, the tactile movement feature quantity vector v is supposed to be a times series pattern represented by movement velocities in the X, Y and Z axis directions and rotational angular velocities on the X, Y and Z axes. In this table, an average tactile movement pattern of each group of tactile movements is represented by the tactile movement feature quantity vector v. For example, as for a tactile movement represented by the tactile movement variable m1, a pattern in which reciprocations are repeatedly performed only in the Y axis direction is described. To define such a relation as the one stored in the tactile movement DB 13, data about the tactile movements performed by a subject under test that has felt the material needs to be collected and a huge number of tactile movement data thus obtained needs to be grouped based on similarity between those movements. For that purpose, a "learning processing step" such as clustering should be done as will be described later.

The tactile movement estimating section 17 searches the tactile movement DB 13 with the tactile movement feature quantity vector v that has been obtained as a result of the tactile movement by the feeler 20, thereby obtaining a tactile movement variable m. In making this search, the degrees of similarity are compared to each other based on a vector-to-vector distance between the tactile movement feature quantity vector v of the feeler 20 and the tactile movement feature quantity vector vi of each tactile movement variable mi of the tactile movement DB 13 and the most similar tactile movement variable mi is selected and output. As shown in FIG. 21, a tactile movement is generally described as a time series pattern with repetition. The tactile movement feature quantity vector v obtained as a result of the tactile movement performed by the feeler 20 and the tactile movement feature quantity vector stored in the tactile movement DB 13 would have vector time series of different lengths. For that reason, when the degree of similarity between the tactile movement feature quantity vectors is calculated, some matching technique such as dynamic time warping, by which multiple time series patterns can be matched to each other by nonlinear compression and expansion, is preferably used. It should be noted that various sorts of movements could be classified in advance and it could be determined by a movement signal supplied from the sensor what kind of the movement has been performed by not just the technique that uses the learning processing step to be described later but also any other known method as well. For example, as disclosed in Patent Document No. 1, the kind of the overall movement can be determined by detecting the series of the label attached to a partial movement.

Using the tactile movement variable m thus obtained, the tactile weight vector searching section 19 searches the tactile weight DB 18, thereby obtaining a tactile weight vector C(m). That is to say, the tactile weight DB 18 is a database in which information about the correlation between the material physical property value X and the tactile intensity H obtained by Equation (8) has been written in association with the tactile movement and in which the relation between the tactile movement variable m and the tactile weight vector C(m) is stored. In this preferred embodiment, a tactile movement is regarded as a conduct to get a feel of a certain tactile type, and therefore, each tactile movement variable m is associated with one tactile type. For that reason, the tactile weight C(m) of the tactile weight DB 18 is a tactile weight vector for getting a tactile intensity of the tactile type associated with the tactile movement variable m. A tactile weight DB 18 of the simplest form is a lookup table showing the relation between the tactile movement variable m and the tactile weight matrix C(m).

FIG. 22 shows the concept of the tactile weight DB 18, which is shown in the form of a table E01.

As shown in FIG. 22, the tactile weight DB 18 stores a tactile weight vector C(m) for each tactile movement variable m. For example, if the tactile movement variable m is m1, a tactile weight vector C(m1) is selected and used as the tactile weight vector C(m) represented by Equation (8). Before the search is carried out, the tactile weight vector C(m) needs to be learned beforehand as will be described in detail later.

Using the material physical property value X of the reference material that has been measured by the material physical quantity measuring section 1 and the tactile weight vector C(m) that has been determined as a result of the tactile movement, the material tactile estimating section 2 estimates, by Equation (8) described above, the tactile intensity H that the feeler 20 will get when touching the reference material 22. As described above, that tactile intensity is associated with the tactile type represented by the tactile movement variable m.

Using the tactile movement variable m of the feeler 20 and the tactile intensity H that has been calculated by the material tactile estimating section 2, the material DB searching section 3 searches the material DB 23 that stores a lot of candidate materials for a material with a similar feel. In making this search, the difference between the tactile intensity H estimated by the material tactile estimating section 2 and the tactile intensity H' of a candidate material at the same tactile movement variable m is calculated as a search score. And either a material with the best score (i.e., with the minimum distance difference) or a group of materials, of which the scores meet a predetermined condition (i.e., which have distance differences that are equal to or smaller than a predetermined value), along with the search score information, is output as a search result.

An exemplary material DB 23 for use to get such a search done is shown in FIG. 23. As shown in FIG. 23, in this material DB 23, the relation between the material, the tactile movement, and the tactile intensity is described. The type of the feel is determined unequivocally by the tactile movement variable m as described above, and therefore is not needed explicitly but shown there anyway for convenience sake. As already described as the principle of the present invention at the beginning of the description of this preferred embodiment, the tactile movement not only defines the type of feel the feeler gets but also affects the tactile intensity of that type of feel. However, by adopting the material DB shown in FIG. 23, a material with the same type of feel as the one that the feeler is getting and with a tactile intensity closest to that of the feeler's feel can be searched for by using the tactile movement variable m as a search key.

Finally, the search result display section 7 receives the result from the material DB searching section 3 and presents the result to the user who is searching for a material. The search result may be displayed in any form, which may be only the specific type or product name of the material, a photo of the material, a moving picture showing how the material will be deformed under pressure, or any other physical property value of that material. Or the result may also be an index number indicating one of the sample materials that the searcher has at hand. In that case, the searcher can confirm the search result by feeling that sample material indicated. Optionally, a tactile display device that can reproduce the material's feel could also be used. For example, to display a rough/smooth feel, a tactile display device that uses an electrostatic actuator as disclosed in Patent Document No. 2 may be used. On the other hand, to display a soft/hard feel, a tactile display device with an array of movable pins as disclosed in Patent Document No. 3 may be used. The smooth/rough feel may also be displayed by using a tactile display device that uses ultrasonic vibrations as disclosed in Patent Document No. 4.

Furthermore, the search result displayed does not have to be a single material, of which the feel is closest to the estimate one, but may also be a number of materials, of which the feels are close to the estimate one within a certain range. In this case, it would be effective to rearrange the materials displayed by reference to the search score information attached to the search results.

In the example described above, the target material is searched for by performing a series of tactile movements on multiple reference materials 22 that should have the one type of feel specified and by estimating the target tactile type and the target tactile intensity. However, it would be even more effective to perform either an AND movement or an OR movement on the search results obtained through tactile movements that have been carried out separately and to output the outcome as the final result. In that case, if the kind of the tactile movement and/or the type of the reference material is changed every time the tactile movement is performed, a more preferred material for the searcher can be found. For that purpose, the tactile processor of the present invention may further include a combination instructing section that instructs that the AND/OR movement be performed.

The respective elements shown in FIG. 14 may be implemented by the following pieces of hardware, for example. Specifically, the functions of the material physical quantity measuring section 1 and the movement physical quantity measuring section 10 can be performed by using any of the sensors described above. On the other hand, the movement feature quantity calculating section 11, the tactile movement estimating section 17, the tactile weight vector searching section 19, the material tactile estimating section 2 and the material DB searching section 3 may have their functions performed by a computer, for example. And the tactile movement DB 13, the tactile weight DB 18 and the material DB 23 may be implemented as a hard disk drive (HDD), a memory card, a solid state drive, or any other kind of storage medium.

The material search device 800 may perform a material search as described above. Next, learning processing steps for compiling the respective types of databases, which should be used to search for the target material, will be described with reference to FIGS. 24 and 25.

Figure 24:
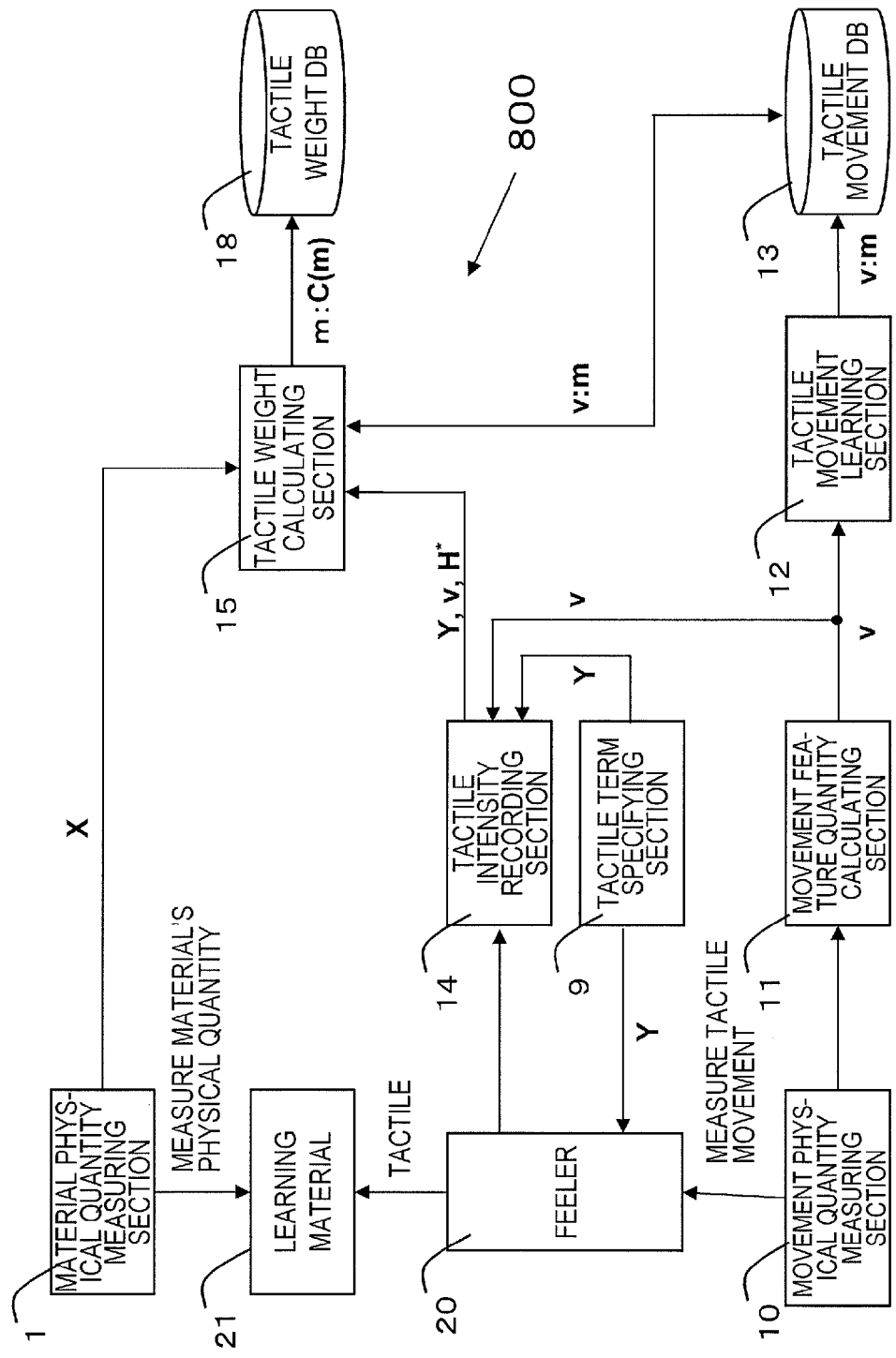
FIG. 24 illustrates a configuration to be used by the feel-based material search device 800 of the first preferred embodiment of the present invention mostly to make leaning.

In a series of learning processing steps, learning processing step #1 for compiling the tactile movement DB 13 and the tactile weight DB 18 shown in FIG. 24 needs to be performed only once when this material search device 800 is fabricated. If necessary, however, the respective databases may be recompiled, too. On the other hand, learning processing step #2 for compiling the material DB 23 shown in FIG. 25 needs to be carried out every time a candidate material is added even after the tactile weight DB 18 has already been compiled. Hereinafter, those processing steps will be described one step after another.

First of all, the learning processing step #1 for compiling the tactile movement DB 13 and the tactile weight DB 18 shown in FIG. 24 will be described. In this learning processing step, a number of persons are made to feel multiple test materials and data about tactile intensities representing their different feels are collected on a tactile type basis. In addition, not just data about those various tactile intensities but also data about various kinds of tactile movements performed by them are collected as well, and then combined together statistically, thereby compiling the two databases described above.

This processing may be carried out roughly as follows. First off, to define the types of feels, each feeler 20 is made to feel respective test materials 21 by reference to each tactile term presented by a tactile term specifying section 9. And the tactile intensities felt by the feeler 20 at this time in response to the term specified are recorded by a tactile intensity recording section 14. At the same time, the tactile movement performed by the feeler 20 is observed by the movement physical quantity measuring section and the tactile movement feature quantity vector v is obtained by the movement feature quantity calculating section 11 and then recorded with the tactile term. Furthermore, the material physical property value X of each test material 21 is measured by the material physical quantity measuring section 1.

A tactile movement learning section 12 collects all of those tactile movement feature quantity vectors v obtained and classifies those vectors into a finite number of groups so that each group consists of similar tactile movement feature quantity vectors v. Then, the learning section 12 stores a tactile movement variable m for use to identify each of those groups and the average tactile movement feature quantity vector $v_{ave}$ of those groups in the tactile movement DB so that the variable m and the average vector $v_{ave}$ are associated with each other. Using the tactile intensity data that varies according to the individual feeler, test material and tactile type and that has been collected by the tactile intensity recording section 14, a tactile weight calculating section 15 defines statistically the relation between the material physical property value X and the tactile intensity on a tactile movement variable m basis as a tactile weight vector C(m). Then, the relation between the tactile movement variable m and the tactile weight vector C(m) thus obtained is stored in the tactile weight DB 18, thereby completing the learning processing step #1.

Hereinafter, the respective sections will be described in detail one by one.

Figure 26:
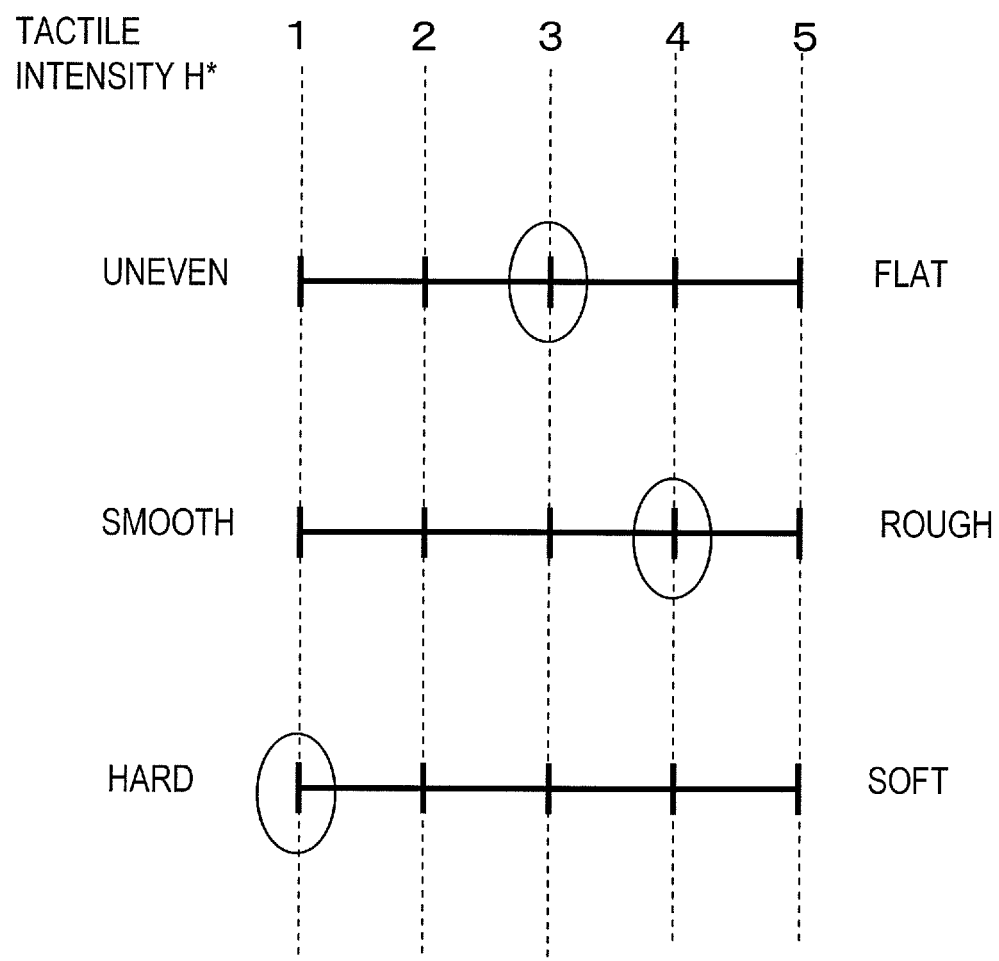
FIG. 26 shows exemplary pairs of adjectives with opposite meanings.

The learning processing step #1 begins by carrying out a feeling experiment on a number of feelers 20 as subjects under test and making them get tactile intensities from the given material. At this point in time, the tactile term specifying section 9 presents a tactile term Y to them to indicate the type of feel to be gotten by the feelers 20 when touching it. In this case, the tactile term Y is usually presented as a pair of adjectives representing two opposite feels such as "uneven/flat feel", "smooth/rough feel" and "hard/soft feel" as shown in FIG. 26.

In response to the tactile term Y presented, the feelers 20 answer the tactile intensities that they have gotten by touching the test material 21 as relative intensities. Those relative intensities may be answered in any way. In the example illustrated in FIG. 26, the feelers answer the relative intensities in five different levels. That is why each of them answers the tactile intensities they have gotten by touching the test materials 21 by rearranging the materials 21 by their tactile intensities. For example, if he or she has gotten tactile intensities about the uneven/flat feel, he or she answers the tactile intensities they have gotten from all of those test materials 21 in five levels by rearranging those test materials 21 in the order of the tactile intensities and their positions.

The tactile intensity recording section 14 records the tactile intensities H* that they have gotten from all of those test materials in response to each tactile term Y presented. These tactile intensities are identified by "H*", which means that these are tactile intensities that have been directly answered by the feelers 20. On the other hand, the tactile intensities H are supposed to refer to the feels estimated by the material tactile estimating section 2.

By adopting such a method, a feel that should be a subjective sensation of a human being can be obtained as an objective value that can be compared to another. On top of that, by presenting a tactile term to feelers 20 who are subjects under test, the type of the feel that that feelers 20 should get can be defined. As will be described later, the tactile intensity recording section 14 records each tactile intensity H* in association with either the tactile term Y presented at this time or the tactile movement feature quantity vector v representing the kind of the tactile movement that the feeler 20 has performed. Furthermore, to prevent the results from losing consistency due to the individual difference in interpretation of the given tactile term, it is preferred that those subjects under test be instructed or trained in advance so as to interpret the given term in the same way. In the example illustrated in FIG. 26, as for a certain test material 21, tactile intensities H* of Level 3, 4 and 1 were answered in response to the tactile terms "uneven/flat", "smooth/rough" and "hard/soft", respectively.

When carrying out a feeling experiment on those feelers 20, the tactile movement performed by each feeler 20 who touches the material is also observed by the movement physical quantity measuring section 10 at the same time and then is transformed into a tactile movement feature quantity vector v by the movement feature quantity calculating section 11. In this case, the movement physical quantity measuring section 10 and the movement feature quantity calculating section 11 operate in quite the same way as when the target material is searched for, and the description thereof will be omitted herein.

The tactile movement learning section 12 collects a great number of tactile movement feature quantity vectors v that have been obtained as a result of the feeling experiment on all of those feelers 20 and then classifies them into a finite number of characteristic tactile movement groups (or clusters). To divide a set of great many items of data represented by vectors or any other quantities into a finite number of subsets (or clusters) by combining together the ones that have similar distances by a predetermined type of element-to-element distance calculation, a so-called "clustering" technique is ordinarily used. The tactile movement learning section 12 performs clustering using the tactile movement feature quantity vectors v as such elements. In this case, the method and condition of clustering and the distance between the elements may be defined arbitrarily.

Figure 27:
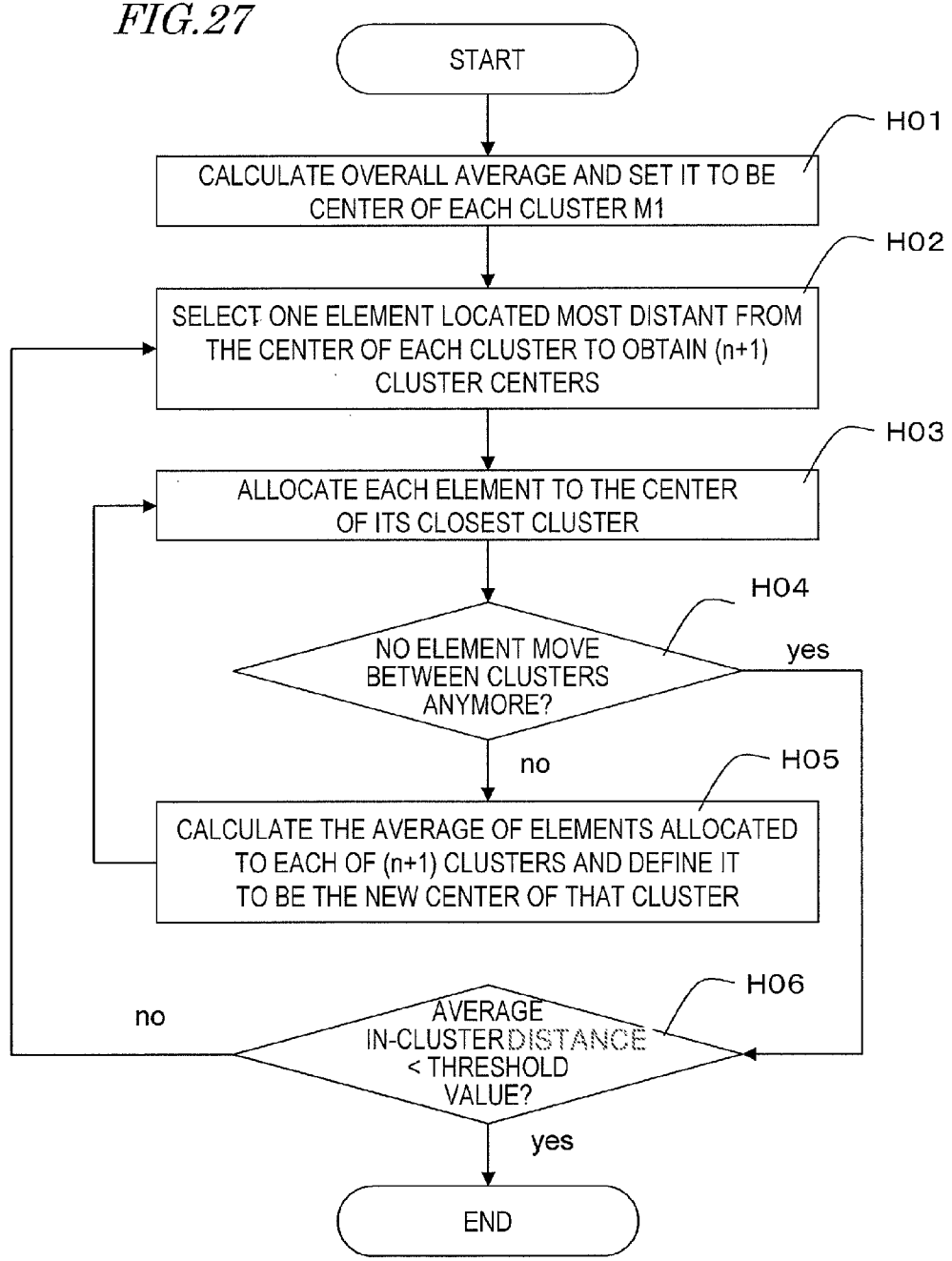
FIG. 27 is a flowchart showing the procedure of a clustering process that uses a tactile movement feature quantity vector v as an element.

One example is shown in FIG. 27. In this example, clustering is carried out on the supposition that all of those tactile movement feature quantity vectors v collected form a universal set and that the vector-to-vector distance between the tactile movement feature quantity vectors v is defined as the element-to-element distance. The clustering process is started in Step H01 with the number of clusters in the initial state supposed to be one (i.e., universal set) and with the average of all of those tactile movement feature quantity vectors v supposed to be the center of that one cluster. If the number of clusters is n, one element that is located most distant from the center of each of the n clusters is selected to obtain (n+1) cluster centers overall in Step H02. And then by determining which of the (n+1) cluster centers each of the elements is located closest to, those elements are classified into the (n+1) clusters in Step H03. In this case, if there is any element that has moved to a different cluster from the previous one in Step H04, the average vector of those elements that have been classified into each of the (n+1) clusters is calculated and defined to be the new center of that one of the (n+1) clusters in Step H05.

Thereafter, these processing steps H03 to H05 are carried out repeatedly until there are cluster-to-cluster moves anymore. And when the average of the distances between each element and the center of the cluster to which that element belongs becomes smaller than a predetermined threshold value, clustering is finished in Step H06.

By adopting such a method, various kinds of tactile movements can be classified into a number of groups, each consisting of similar kinds, according to the distances between the tactile movement feature quantity vectors v.

In the example described above, the distance between tactile movement feature quantity vectors v is used as an exemplary element-to-element distance. However, it is no less effective to calculate the distance by supposing that the elements in each cluster have a predetermined distribution such as a normal distribution. Furthermore, it is also effective to use the degrees of similarity of tactile weight vectors C(m), which have been calculated by the tactile weight calculating section 15 as will be described later, as a parameter for making clustering. By using such values, various kinds of tactile movements can be classified by not only the mere degree of similarity in movement as represented by the velocity or angular velocity but also the degree of similarity in eventual feel gotten as well. As a result, the tactile intensities can be estimated more accurately without increasing the number of categories of tactile movements unnecessarily.

Figure 28:
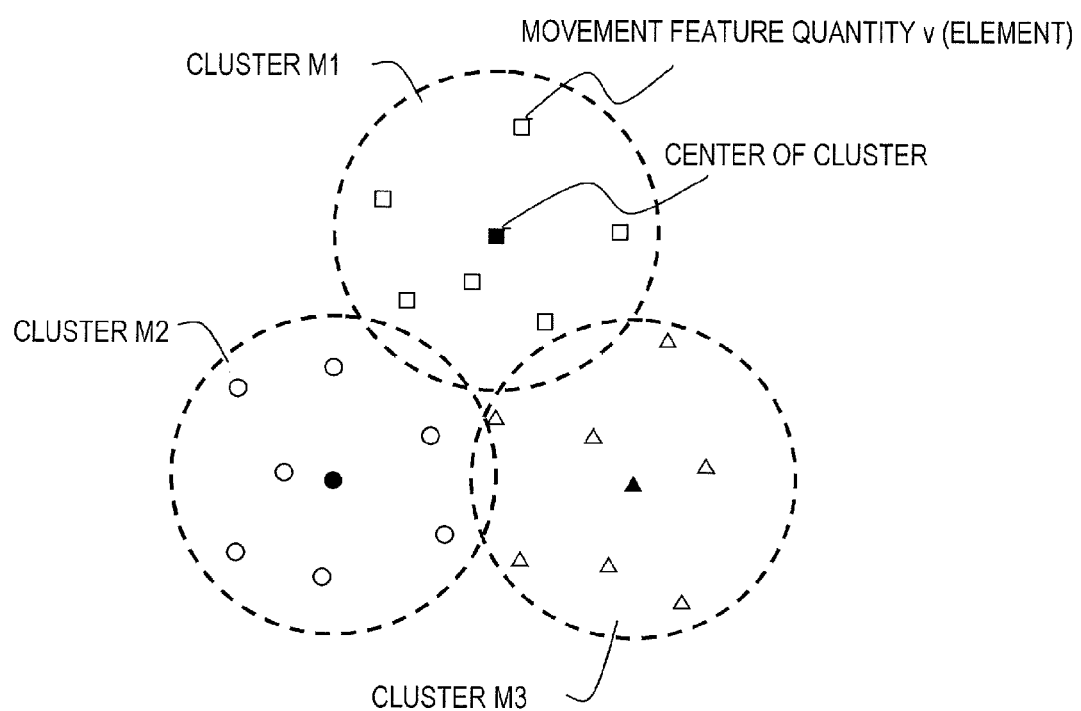
FIG. 28 illustrates an exemplary spatial distribution of clusters and elements.

FIG. 28 shows conceptually a result of clustering that has been made on tactile movement feature quantity vectors v by the method described above. In FIG. 28, the open squares □, open circles ○ and open triangles Δ represent the tactile movement feature quantity vectors v of respective tactile movements that have been obtained from the feelers 20 based on the feeling experiment. The range of each cluster is indicated by a dashed circle, and respective clusters represent mutually different groups of tactile movements. On the other hand, the solid square ■, solid circle ● and solid triangle ▲ represent the averages of those elements □, ○ and Δ in the respective clusters and indicate the centers of the respective clusters that have been generated by clustering.

To these clusters thus obtained, added are symbols to identify them such as index values. And then those clusters with the index values are stored, along with pieces of information indicating the contents of the clusters, in the tactile movement DB 13. In this case, the symbol that has been added to each cluster is the tactile movement variable m. On the other hand, the information indicating the contents of each cluster is a piece of information that allows the user to decide which cluster an arbitrary tactile movement feature quantity vector v obtained as a result of a tactile movement belongs to. In the example illustrated in FIGS. 27 and 28, that information may be an average vector at the center of each cluster. As already described for the search movement, data such as the one shown in FIG. 21 may be stored in the tactile movement DB 13.

When the tactile movement DB 13 is compiled, a tactile weight DB 18 starts to be compiled next. The tactile weight calculating section 15 determines the relation between the material physical property value of every learning material 21 that has been measured in advance by the material physical quantity measuring section 1 and the tactile intensity H* that has been recorded by the tactile intensity recording section 14 through a feeling experiment. The material physical quantity measuring section 1 adopts the same measuring means for collecting the same kind of data as what has already been described for the material searching section, and the description thereof will be omitted herein.

First of all, the tactile weight calculating section 15 determines the relations between the tactile movements and the tactile terms. Specifically, for that purpose, the tactile movement feature quantity vectors v, which are recorded along with the tactile intensities H*, are transformed into tactile movement variables m, and the tactile intensities H* collected with accompanying data are classified according to the tactile movement variable. As a result, it can be determined, on a tactile movement variable m basis, what is the most frequently encountered tactile term Y. For example, supposing the most frequent tactile term is Y1 when the tactile movement variable is m1, data, of which the tactile movement variable is m1 and the tactile term is Y1, are collected and the tactile weight vectors C(m1) are defined so that the material physical property values X and the tactile intensities H* satisfy Equation (8).

Such processing is carried out repeatedly on every tactile movement variable. To obtain the tactile weight vectors C(m), it is effective to use a technique such as multiple regression analysis. Once the tactile weight vectors C(m) have been obtained in this manner on a tactile movement variable m basis, the tactile weight vectors C(m) and the tactile movement variables m are stored in the tactile weight DB 18 in association with each other. As described above, an example of the tactile weight DB 18 is shown in FIG. 22.

By adopting such a procedure, the type of the feel that the feeler is now getting can be estimated (implicitly) by the tactile movement variable m and a tactile weight vector C(m) for calculating the tactile intensity of that tactile type can be obtained.

It should be noted that to obtain a tactile weight vector C(m), the number of learning materials 21, tactile terms in the set, and feelers 20 who answer the feels they got when feeling the materials (i.e., subjects under test of the feeling experiment) should all be large enough. To obtain a statistically reliable tactile weight vector C(m), the number of learning materials provided with mutually different physical properties is preferably as large as possible, so is the number of tactile terms in the set so as to cope with various types of feels. And the same can be said about the number of subjects under test, who may be both sexes of various ages.

In the preferred embodiment described above, the tactile weight vector C(m) is supposed to be obtained based on the data of the most frequently encountered tactile term that have the same tactile movement variable. According to such a method, however, the data of the other tactile terms is not used for learning.

That is why the flow of the learning process for obtaining the tactile weight vector C(m) may be split into the two processing steps of defining the relation between the tactile movement variable m and the tactile term Y and obtaining the tactile movement variable m and the tactile weight vector C(m). Specifically, first, a feeling experiment is carried out to determine a tactile movement variable m and the most frequently encountered tactile term Y at that time. Next, each feeler is presented with both that tactile term and the kind of the tactile movement and prompted to answer to a given tactile term in response to a particular kind of tactile movement, thereby obtaining a tactile intensity H*.

By adopting such a method, a lot of tactile intensities H*, associated with the same combination of tactile movement variable m and tactile term Y, can be collected, and therefore, a more statistically reliable tactile weight vector C(m) can be obtained. A more specific method for making every feeler perform the same kind of tactile movement by presenting that kind of tactile movement to him or her will be described later for the learning processing step #1 of the third preferred embodiment.

Finally, it will be described with reference to FIG. 25 how to compile the material DB 23, which is a database of the feels that have been gotten by touching candidate materials through various kinds of tactile movements. As described above, an example of such a material DB 23 is shown in FIG. 23, in which the materials, tactile movement variables m indicating the kinds of tactile movements, and tactile intensities of the feels to be gotten through those kinds of tactile movements are associated with each other.

The processing of compiling such a database (i.e., the learning processing step #2) may be performed in the following procedure.

Each of the candidate materials 24 to be added to the database has its material physical property value X measured by the material physical quantity measuring section 1 described above. A tactile weight extracting section 25 extracts sets of tactile weight vectors C(m), which are associated with the tactile movement variables m stored in a tactile weight DB 18, one set after another. Next, the material tactile estimating section 2 mentioned above applies Equation (8) to the tactile weight vectors C(m) thus extracted, as well as the material physical property values X, thereby calculating tactile intensities H(m) associated with the tactile movement variables m. Then, each of those tactile movement variables m that have been extracted by the tactile weight extracting section 25 and its associated tactile intensity H(m) that has been calculated by the material tactile estimating section 2 are stored in combination in the material DB 23. In this manner, the tactile intensity can be estimated for every possible combination of each of the given number of candidate materials 24 and an associated one of the tactile movement variables m that are stored in the tactile weight DB 18, and then stored in the material DB 23. Also, this processing step can be carried out independently on each candidate material 24. That is why every time any material needs to be newly added to the DB, only that material can be added by performing the processing described above on that material alone.

In the preferred embodiment described above, candidate materials, tactile movement variables, and tactile intensities are supposed to be stored in association with each other in the material DB 23 as an example. However, the present invention is in no way limited to that specific preferred embodiment. Alternatively, in the material DB 23, candidate materials and their material physical property values may also be stored in association with each other. In that case, every time a search is carried out, the tactile intensity of each of the candidate materials may be calculated by using a tactile weight vector that has been determined based on its material physical property value and tactile movement variable. If such a method is adopted, the tactile intensity of each of the candidate materials needs to be calculated every time a search is carried out, but only the material physical property value of each material should be stored in the database. As a result, the size of the database can be reduced. Optionally, if the tactile intensity is stored in the database, then data about [the number of candidate materials]×[the number of tactile movement variables] is needed.

The material's tactile intensity data to be stored in the material DB 23 does not have to be the tactile intensity H that has been estimated by the tactile weight vector C(m) based on the material physical property value, but may also be the tactile intensity H* that the feeler who is a subject under test has answered through the feeling experiment. For that purpose, the feeling experiment should be carried out so as to have each feeler feel every candidate material and answer his or her feel gotten each time. In that case, however, a numerical value directly representing his or her own feel is used as the tactile intensity of each candidate material, and therefore, the search result should be more convincing. Also, in such a situation, the learning material 21 and the candidate material 24 can be the same. That is why the tactile weight vector C(m) is also obtained exclusively from the set of candidate materials 24. As a result, the tactile intensity can be estimated even more appropriately for the specific type of the candidate material. Consequently, the material search can be done with much more accuracy.

As described above, just by having the user feel a material that has a similar feel to the target one, the material search device 800 can search for the target material by using both the property (i.e., the specific type of the feel) of the candidate material and its tactile intensity as search keys. As a result, in making an e-commerce, for example, information can be searched for by means of a feel to be gotten when the user touches an item he or she is going to purchase. By adding the use of a feel to the conventional process of confirming a product to order such as clothes or a piece of furniture using mainly its photos, electronic commerce and distribution of information via a network can be even more popularized among general consumers.

Embodiment 2

In the first preferred embodiment of the present invention described above, the type of the feel that the feeler is getting is supposed to be estimated unequivocally by the kind of the tactile movement. Actually, however, even though feelers are getting quite different types of feels, their tactile movements could be very similar and the tactile movement variables m represented discretely could be the same. In that case, even if the tactile movement variable m is determined by the kind of the tactile movement the feeler is performing, the feel he or she is getting cannot be determined automatically, which is a problem. According to this preferred embodiment, however, such a problem can be overcome by adopting the idea of probability model.

First of all, it will be described how in principle the type of the feel can be estimated by the tactile movement variable m following the probability model.

Suppose in a learning process in which the feeler who is a subject under test feels a learning material, the specific type of the feel the feeler is instructed to get is y and the tactile movement variable of the tactile movement performed by the feeler in such a situation is m. By carrying out such a feeling experiment on a lot of feelers, numerous types of feels, and various materials, the following Equation (9) that represents the conditional probability of the variable m of the tactile movement performed by the feeler with the type y of the feel specified is obtained:

$$P(m|y) \tag{9}$$

In this case, what should be interesting in order to estimate the type of the feel the feeler is getting through the tactile movement is the probability represented by the following Equation (10):

$$P(y|m) \tag{10}$$

That is to say, this is posterior probability that the type of the feel that the feeler, who has performed a tactile movement with the variable m, is getting is y. According to Bayes' theorem, Equations (9) and (10) satisfy the following Equation (11):

$$P(y|m) = \frac{P(m|y) \cdot P(y)}{P(m)} \tag{11}$$

Provided that the tactile movement variable m is known, the denominator P(m) of the right side is a constant value. On the other hand, the second term P(y) of the numerator represents probability that the type of the feel that the feeler wants to get when searching for a material is y. Supposing those types of the feels to be gotten have approximately equal probabilities according to a first-order approximation, that term can be regarded as a constant term. Under these suppositions, Equation (11) can be rewritten into the following Equation (12):

$$P(y|m) = A \cdot P(m|y) \tag{12}$$

where $$\sum_y P(y|m) = 1$$

where A is a constant if the tactile movement variable m is the same.

If P(y|m) has been obtained in this manner, there is probability that P(y|m) is not equal to zero in multiple types of feels for a certain tactile movement variable m. That is why in searching for a material, the search is carried out by using a weight representing the posterior probability P(y|m) of the tactile type that has been estimated by the kind of the tactile movement. That is to say, for each type of feel, the tactile intensity is estimated by the method that has already been described for the first preferred embodiment and the difference from the tactile intensity of the candidate material of the same tactile type is calculated. The differences in tactile intensity between the reference and candidate materials are calculated with respect to each tactile type, a weight representing P(y|m) is added to each of those differences, and then the weighted differences are added together, thereby obtaining a search score for use to make a search.

If these processing steps are represented by a mathematical expression, the search score S(T) of each candidate material T can be calculated by the following Equation (13):

$$S(T) = \sum_y f(P(y \mid m)) \cdot |H_y - t_y| \qquad (13)$$

where $H_y$ represents the tactile intensity of a reference material of a tactile type y, $t_y$ represents the tactile intensity of the candidate material T, and f( ) represents a function.

By searching for a material based on the magnitude of such a search score S(T), the material can be searched for with the possible type of the feel weighted with the degree of probability even if the type of the feel the feeler is getting can be estimated only vaguely by the kind of the tactile movement he or she is doing. In the simplest example of f( ) in Equation (13), f(x)=x, i.e., the posterior probability P(y|m) is used as the weight as it is. On the other hand, if a function that becomes equal to one only for a tactile type that produces the highest P(y|m) but becomes equal to zero for the other types of feels (as represented by the following Equation (14)) is used, the method of the first preferred embodiment described above, by which the target material is searched for with the tactile type y determined unequivocally by the tactile movement variable m, is supposed to be used.

$$f(X) = \begin{cases} 1 & \text{where } X = \max_x x \\ 0 & \text{where } X = \max_x x \end{cases} \qquad (14)$$

Figure 29:
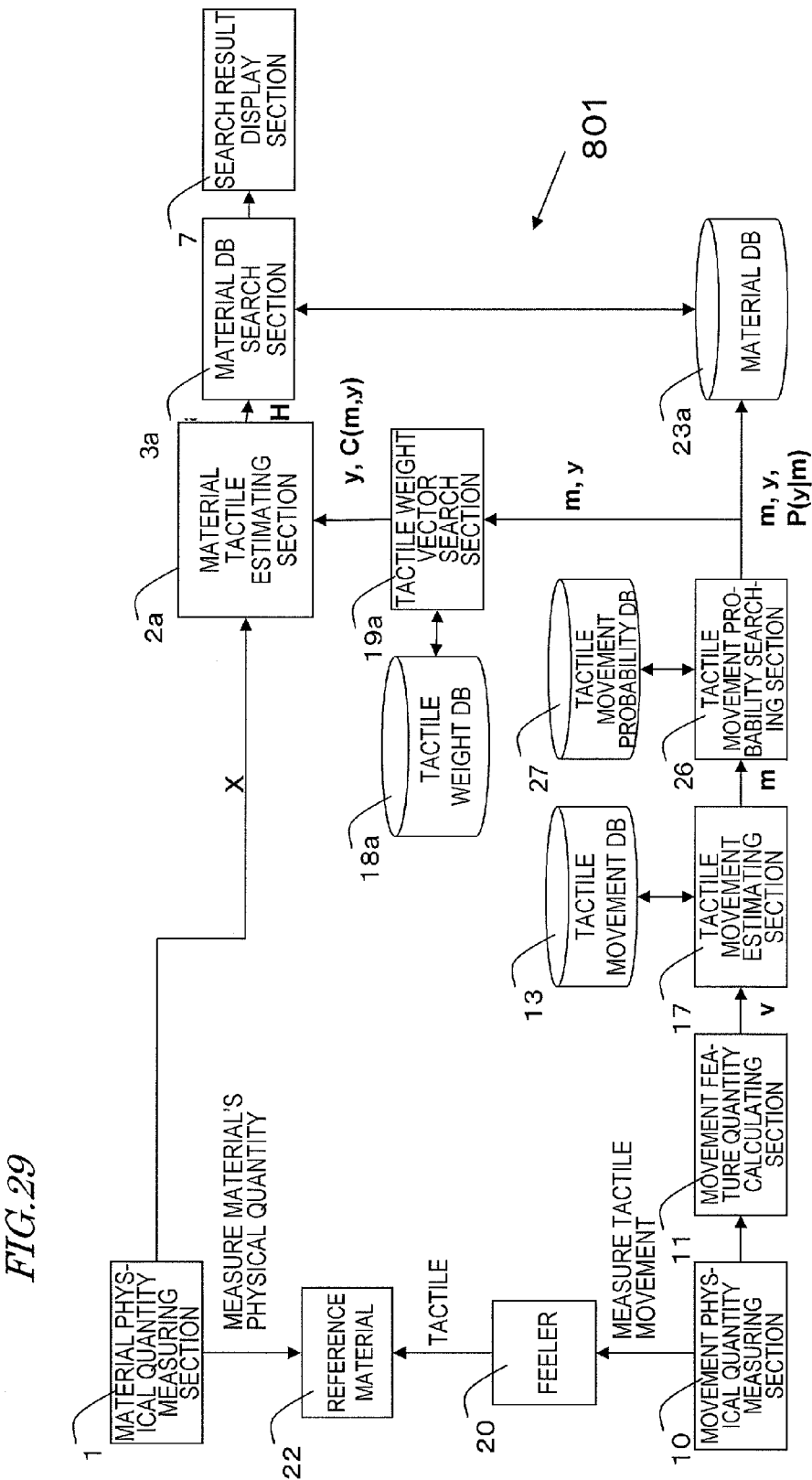
FIG. 29 illustrates a configuration to be used by a feel-based material search device 801 according to a second preferred embodiment of the present invention mostly to make learning.

Next, a material search device that operates based on such a principle will be described with reference to FIG. 29. In the material search device 801 shown in FIG. 29, any component that is also shown in FIG. 14 illustrating the first preferred embodiment of the present invention and that has substantially the same function as its counterpart is identified by the same reference numeral. Differences from the configuration of the first preferred embodiment (shown in FIG. 14) are that a tactile movement probability calculating section 26 and a tactile movement probability DB 27 are provided as additional components and that some of the other components are modified to get computations done by those components. Hereinafter, the flow of the material search to be performed by the device shown in FIG. 29 will be outlined.

The general flow of the processing of this preferred embodiment is the same as that of the first preferred embodiment described above. That is to say, the feeler 20 is also made to feel a given reference material 22, and the tactile intensity he or she is getting is estimated by the kind of the tactile movement and the material physical property value X of the reference material, thereby searching for the target material.

However, unlike the first preferred embodiment described above, after the tactile movement variable m has been determined by the kind of the tactile movement the feeler 20 is performing, the tactile weight vector searching section 19a searches the tactile weight DB 18a for the tactile weight vector C(m) on a tactile type y basis and the material tactile estimating section 2a estimates the tactile intensity $H_y$ on a tactile type y basis, too. In addition, the tactile movement probability searching section 26 searches the tactile movement probability DB 27 for the posterior probability P(y|m) of the tactile type y that has been obtained in advance by learning and makes a material search using that probability, which is also a difference from the first preferred embodiment described above.

Hereinafter, these differences will be described in detail.

Specifically, when the tactile movement variable m is determined as a result of the tactile movement performed by the feeler 20, the tactile movement probability searching section 26 searches for the posterior probability P(y|m) that the type of the feel the feeler is getting is y under the condition on which the tactile movement m was observed. These probabilities have already been obtained in advance through learning as will be described later and the results are stored in the tactile movement probability DB 27. In this case, the posterior probability P(y|m) searched for by the tactile movement probability searching section 26 may be either every P(y|m) about the tactile movement variable m or at least one P(y|m) that satisfies the following Inequality (15) with respect to predetermined ϵ:

$$P(y|m) \geq \epsilon$$

where 0≤ϵ≤1 (15)

The tactile movement probability searching section 26 outputs the posterior probability P(y|m) of every tactile type searched and a label y indicating that tactile type in combination.

In the tactile movement probability DB 27, the tactile type posterior probability P(y|m) is stored on a tactile movement variable m basis as described above. The DB 27 may have a lookup table format as shown in FIG. 34.

Next, the tactile weight vector searching section 19a searches the tactile weight DB 18a for a tactile weight vector that needs to be used to estimate the tactile intensity on a tactile type basis, which has been searched for by the tactile movement probability searching section 26. In the first preferred embodiment described above, there is a one-to-one correspondence between the tactile movement variable m and the tactile type. That is why once the tactile movement variable is determined, the tactile type is also determined automatically. For that reason, according to Equation (8) for use to estimate the tactile intensity, the tactile intensity can be estimated by the tactile movement variable m.

On the other hand, according to this preferred embodiment, the tactile type cannot be determined only by the tactile movement variable m. Rather, since the tactile intensity varies from one tactile type to another, the tactile weight vector for use to estimate the tactile intensity also needs to be obtained on a tactile type basis. That is to say, Equation (8) needs to be rewritten into the following Equation (16):

$$H_y(m) = C(m,y) \cdot X \qquad (16)$$

where $H_y$ represents the tactile intensity that has been estimated according to the tactile type y and the tactile weight vector C(m, y) indicates that a weight matrix is determined by the tactile type and the tactile movement variable m.

The tactile weight vector searching section 19a searches for, and outputs, such a tactile weight vector C(m, y) with respect to the tactile movement variable m of the tactile movement performed by the feeler 20 and to every tactile type y output by the tactile movement probability searching section 26. Also, to estimate the tactile intensity at this time, the tactile weight vector C(m, y) is output in association with the label y indicating the tactile type.

To perform the function described above, tactile weight vectors C(m, y), each of which is determined by the tactile movement variable m and the specific tactile type, are stored in the tactile weight DB 18a. The vectors may be stored to form a lookup table. An example of the tactile weight vector DB 18a is shown in FIG. 30. Unlike the tactile weight vector DB 18 of the first preferred embodiment shown in FIG. 22, the tactile weight also varies with the tactile type in the tactile weight vector DB 18a.

The material tactile estimating section 2a estimates the tactile intensity on a tactile type basis based on the material physical property value X of the reference material 22 that has been measured by the material physical quantity measuring section 1 and on the tactile weight vector C(m, y) supplied from the tactile weight vector searching section 19a. The estimation is done based on Equation (1) described above, thereby outputting each tactile intensity $H_y$ in association with the label y indicating the tactile type.

The material searching section 3a searches the material DB 23a with the group of tactile intensities that have been estimated with respect to the reference material 22. According to the first preferred embodiment described above, the search is supposed to be made based on the difference in tactile intensity between the reference material and the candidate materials with respect to only one tactile intensity of the tactile type that has been determined unequivocally by the tactile movement variable m. That is to say, the difference in tactile intensity with respect to only one tactile type is supposed to be the search score.

On the other hand, according to this preferred embodiment, the differences in tactile intensity are calculated for multiple tactile types, weights representing the posterior probabilities P (y|m) of the tactile types are added to the differences, and the sum of those weighted differences is used as a search score as represented by Equation (13). To get such a search score calculated, the tactile intensities of the respective candidate materials need to be stored in the material DB 23a so as to sorted by the tactile movement variable m and the tactile type y. An example of such a material DB 23a is shown in FIG. 31. In the example illustrated in FIG. 31, if the tactile movement variable m and the tactile type y are determined for a given candidate material, then the tactile intensity $t_y$ of that material can be obtained automatically.

Figure 32:
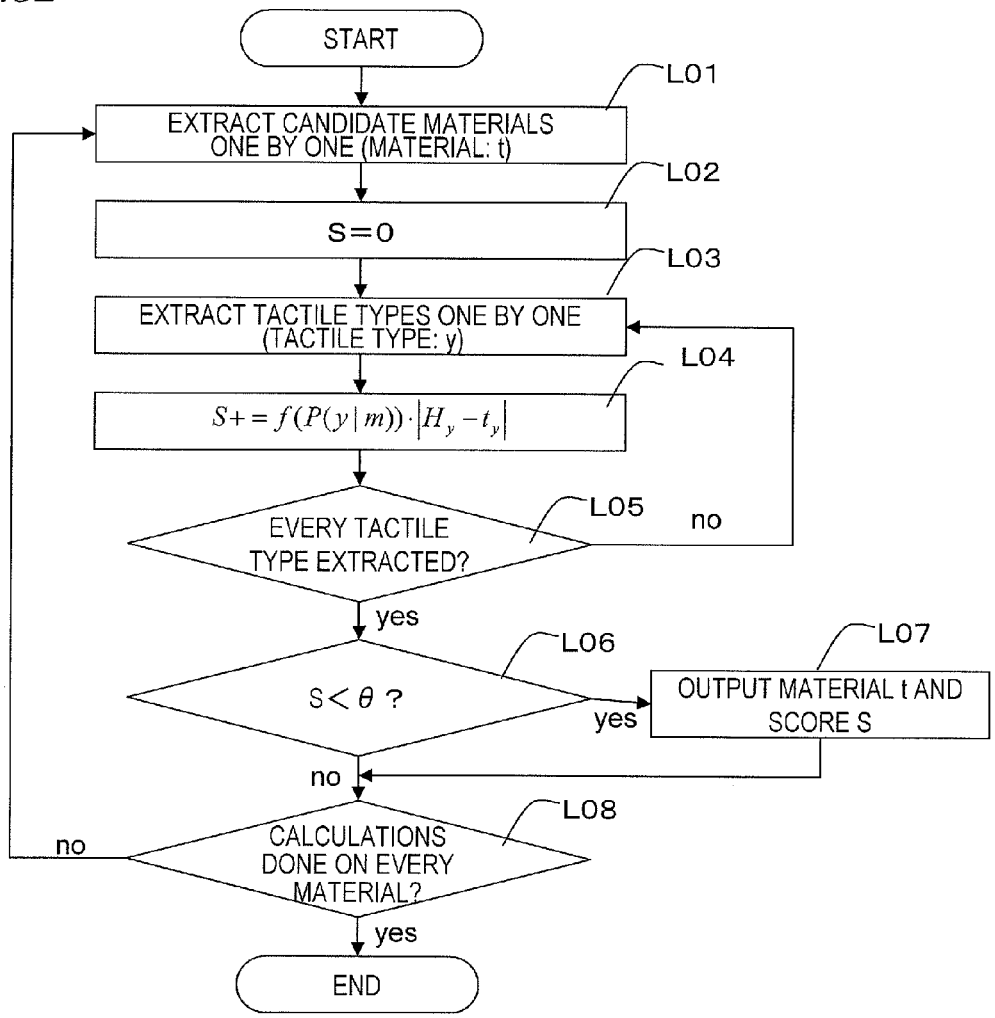
FIG. 32 is a flowchart showing the procedure of a material search process.

Hereinafter, it will be described with reference to FIG. 32 in what procedure the material searching section 3a gets its processing done.

The material searching section 3a processes each of the candidate materials, which are stored in the material DB 23a, on a one-by-one basis (in Step L01). Suppose the material searching section 3a has taken one material (which may be a material t), and has started calculating the search score of that material (in Step L02). When the search score is calculated by Equation (13), the scores are added together based on the difference in tactile intensity between the respective tactile types that have been extracted by the tactile movement probability searching section 26. That is why the tactile types are extracted one by one (in Step L03).

When a tactile type y is taken, the scores are added together as follows. Specifically, the difference $|H_y - t_y|$ in distance between the tactile intensity $H_y$ of the reference material that has been estimated by the material tactile estimating section 2a with respect to the tactile type y and the tactile intensity $t_y$ of the material t that has been extracted from the material DB 23a with respect to the tactile movement variable m and the tactile type y is weighted with the posterior probability P (y|m) with respect to the tactile type y to obtain a score. And the sum of such scores is calculated (in Step L04).

In this case, as already described for Equation (13), f( ) for transforming the posterior probability P (y|m) into a weight value may be any arbitrary one. For example, in the simplest case, it is also effective to set f(x)=x, i.e., to use the P(y|m) value as it is.

By adding together the scores of all tactile types that have been extracted by the tactile movement probability estimating section 26, the search score S of that material t can be determined. That score S is based on the difference in tactile intensity between the materials. That is why the more similar the materials are, the smaller the score S will be. For that reason, if (it turns out in Step L06) the search score S is less than a predetermined threshold value θ, then the material t should have a rather similar feel to the reference material 22. Therefore, that material t is output as a search result along with the score S (in Step L07).

When (it turns out in Step L08) the same series of processing steps are done on every material stored in the material DB 23a, the process ends successfully. By performing these processing steps, a material with a rather similar tactile intensity can be searched for with every possible tactile type that has been estimated from the feeler's tactile movement variable m taken into consideration.

In the material search process to be performed following this flowchart, every candidate material, of which the similarity falls within a predetermined range defined by the threshold value θ, is supposed to be output as a search result. However, the present invention is in no way limited to that specific preferred embodiment. Instead, those candidate materials may be sorted by their search score on a material-by-material basis and only n material(s) (where n is equal to or greater than one) with the highest score(s) may be returned as a search result. In the preferred embodiment described above, the function f( ) for transforming the posterior probability P (y|m) into a weight value is supposed to be f(x)=x. However, this is only an example. Alternatively, the function f( ) may also be a function that considers only the tactile types that will produce the highest probability as represented by Equation (14). Still alternatively, a function such as f(x)=C (where C is a constant) that treats every possible tactile type equally may also be used. In general, it is effective to use either a monotonically increasing function or a monotonically decreasing function.

The search result display section 7 outputs the search result as in the first preferred embodiment described above, and the description thereof will be omitted herein.

It has been described how to search for a target material in a situation where a number of tactile types are estimated by the kind of feeler's tactile movement. To perform this method, the tactile movement probability DB 27, the tactile weight DB 18a, and the material DB 23a should be compiled in advance. As in the first preferred embodiment described above, these learning processing steps consist of learning step #1 for compiling the tactile movement DB 13, the tactile movement probability DB 27 and the tactile weight DB 18a and learning step #2 for compiling the material DB 23a. Hereinafter, these learning processing steps will be described sequentially.

Figure 33:
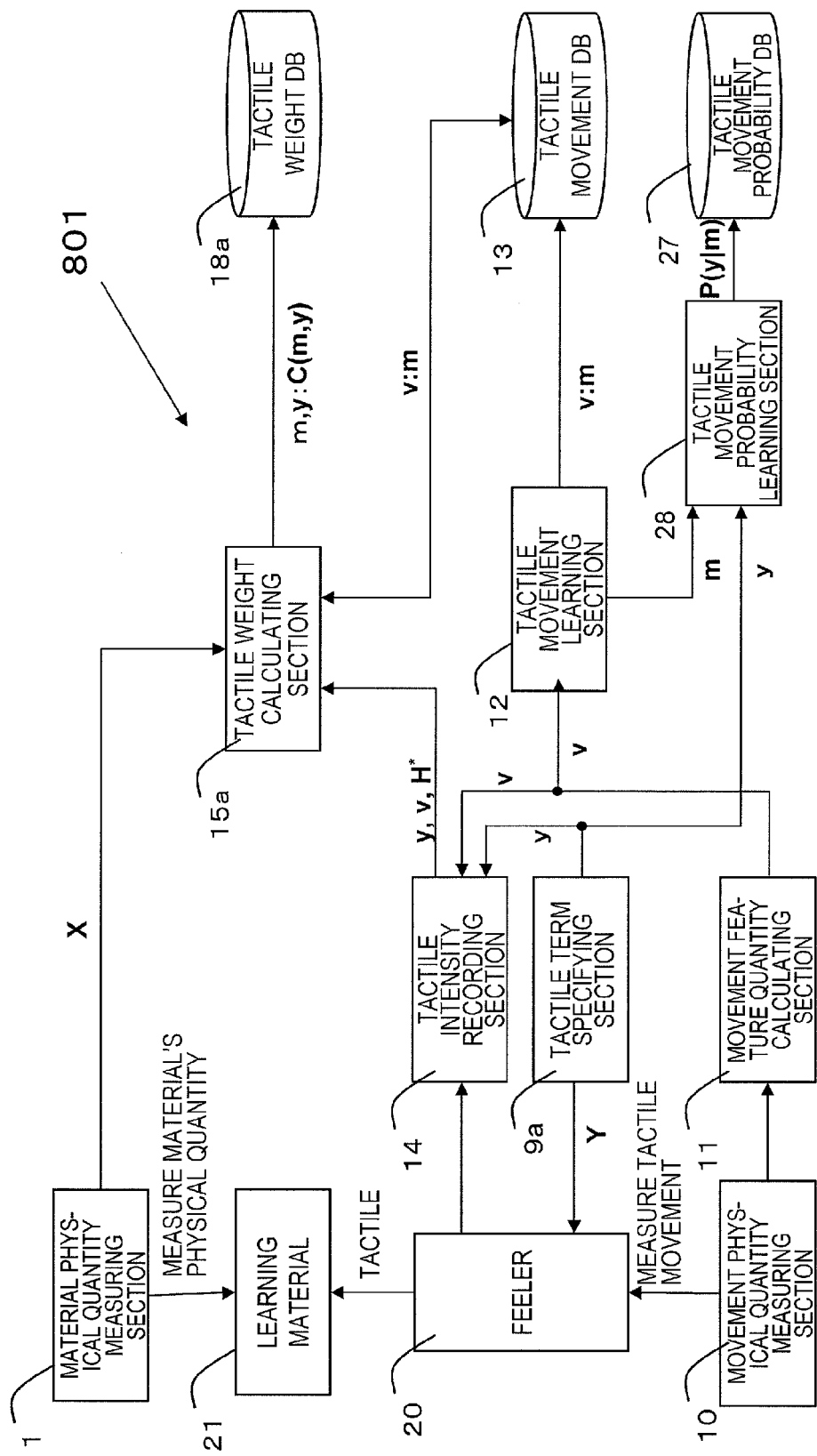
FIG. 33 illustrates a configuration to be used by the feel-based material search device 801 of the second preferred embodiment of the present invention mostly to make learning.

FIG. 33 illustrates a configuration for compiling the tactile movement DB 13, the tactile movement probability DB 27 and the tactile weight DB 18a by performing learning step #1. In FIG. 33, any component that is also shown in FIG. 24 illustrating the first preferred embodiment of the present invention and that has substantially the same function as its counterpart is identified by the same reference numeral and a detailed description thereof will be omitted herein. In this preferred embodiment, a tactile movement probability learning section 28 and a tactile movement probability DB 27 are newly added and the tactile weight learning section 15 and the tactile weight DB 18 shown in FIG. 24 are modified into a tactile weight learning section 15a and a tactile weight DB 18a, respectively.

These modified sections perform their processing roughly in the following manner. When the tactile movement variable m of each kind of tactile movement is determined by classifying various kinds of tactile movements of the feeler 20, who is a subject under test of the feeling experiment, by clustering, the tactile movement probability learning section calculates the posterior probability P (y|m) of the tactile type based on the co-occurrence frequency of the tactile movement variable m and the tactile type y at that time, and then stores it in the tactile movement probability DB 27. To make this calculation, the tactile term specifying section 9a outputs the tactile term information that has been presented to the feeler to the tactile movement probability learning section 28, too, thereby determining the type y of the feel the feeler is getting and calculating the tactile movement probability based on that tactile type.

The tactile weight calculating section 15a obtains, as the tactile weight vector C(m, y), the relation between the tactile type y and the tactile intensity H* gotten by the feeler 20 for every combination of the tactile movement variable m and the tactile type y. And the correlation between the tactile movement variable m, the tactile type y and the tactile weight vector C(m, y) is stored in the tactile weight vector DB 18a, thereby finishing the learning step #1.

Hereinafter, the learning step #1 will be described in further detail.

Unlike the first preferred embodiment described above, the type of the feel that the feeler is getting is not determined unequivocally by the tactile movement variable m according to this preferred embodiment. That is why each value is calculated by using another parameter y for determining the tactile type in addition to the tactile movement variable. Thus, the tactile term specifying section 9a not only defines the type of the feel to be gotten by presenting a tactile term to the feeler 20 but also outputs a variable y indicating to what type of feel the feeler is responding his or her tactile intensity.

Strictly speaking, a tactile term Y and its corresponding tactile type y do not mean exactly the same thing. For example, a tactile term "fluffy" may include a more basic tactile type "softness" as an element. The correlation between the tactile term presented to the feeler and the tactile type may be defined arbitrarily. But the simplest possible method is defining a set of most basic tactile types imaginable and a set of their corresponding tactile terms and using these two sets in association with each other. Alternatively, a sensory evaluation experiment may be carried out in advance to make each subject under test answer his or her tactile intensity in response to each of various tactile terms given and the results may be subjected to a factor analysis, thereby determining basic tactile types numerically and statistically and defining the correlation between those tactile terms and the basic tactile types.

Also, if the interpretation of the same tactile term is different from one feeler to another, then the tactile types gotten by respective feelers will also fluctuate among them, which can also cause the difference between a given tactile term and its corresponding tactile type. As far as this problem is concerned, such a fluctuation in tactile types can be reduced by teaching and training the feelers, who are subjects under test, about tactile terms sufficiently in advance. Alternatively, the fluctuation in tactile term interpretation, which surfaces as a sort of error, could be neglected by adopting some technique for extracting some of a huge number of data statistically (such as the factor analysis described above). In the following description, the correlation between a tactile term Y and the type y of the feel gotten by the feeler responsive to that term is supposed to be defined in advance.

The data of tactile movement variables obtained from a lot of feelers 20 who have touched a number of learning materials 21 and gotten multiple different types of feels is subjected to statistical computations by the tactile movement probability learning section 28. Specifically, based on the frequency of occurrence of a tactile type y and its associated tactile movement variable m, the tactile movement probability learning section 28 calculates a conditional probability about the tactile movement variable m by the following Equation (17):

$$P(m \mid y) = \frac{N(m, y)}{N(y)} \qquad (17)$$

In Equation (17), N(m, y) represents the number of times that the tactile movement variable m and the tactile type y occurred at the same time, and N(y) represents the number of times of occurrence of the tactile type y. Next, by collecting the conditional probabilities P (m|y) about the same tactile movement variable m and applying them to Equation (12), the posterior probability P (m|y) about the tactile type y can be calculated. And the result is stored in the tactile movement probability DB 27 in the form shown in FIG. 34.

Next, the tactile weight calculating section 15a calculates the tactile weight vector C(m, y), representing the relation between the material physical property value of each learning material 21 and the tactile intensity answered by the feeler 20, by Equation (16). In this preferred embodiment, the tactile weight vector is supposed to be determined by the tactile movement variable m and the tactile type y. In other words, it means that if either the type of the feel gotten or the tactile movement variable is different with respect to the same given material, the tactile intensity will be different.

To calculate such a tactile weight vector C(m, y), various data about material physical property values X and tactile intensities H* obtained by carrying out the feeling experiment are sorted out into a number of groups by the tactile type y and the tactile movement variable m. However, as the tactile intensity recording section 14 has recorded each tactile intensity H* in association with a tactile type y and a tactile movement feature quantity vector v, the tactile movement feature quantity vector v needs to be transformed into a tactile movement variable m by reference to the tactile movement DB 13 compiled. And for each group of data that have been sorted out by these parameters, the relation between the material physical property value X and the tactile intensity H* represented by Equation (16) is defined by some technique such as multiple regression analysis. As a result, the tactile movement variables m, tactile types y and tactile weight vectors C(m, y) are associated with each other and stored in the tactile weight DB 18a as shown in FIG. 30 as an example.

In this manner, the learning step #1 of this preferred embodiment gets done.

Figure 35:
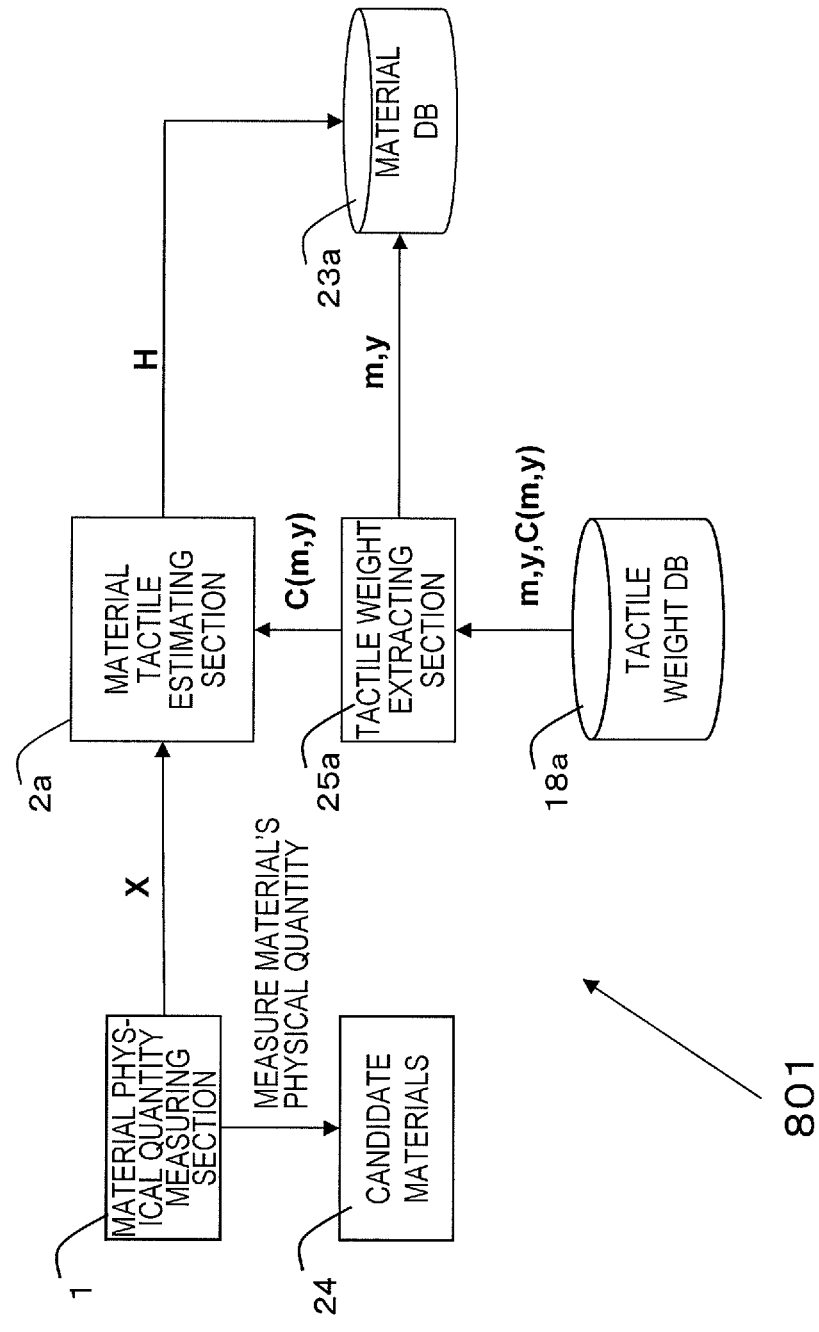
FIG. 35 illustrates a configuration to be used by the feel-based material search device 801 of the second preferred embodiment of the present invention mostly to make learning along with a material DB 23a compiled.

Next, the learning step #2 for compiling the material DB 23a will be described with reference to FIG. 35. In FIG. 35, any component that is also shown in FIG. 25 illustrating the first preferred embodiment of the present invention and that has substantially the same function as its counterpart is identified by the same reference numeral and the description thereof will be omitted herein. One of the differences between the configuration of this preferred embodiment shown in FIG.

Figure 25:
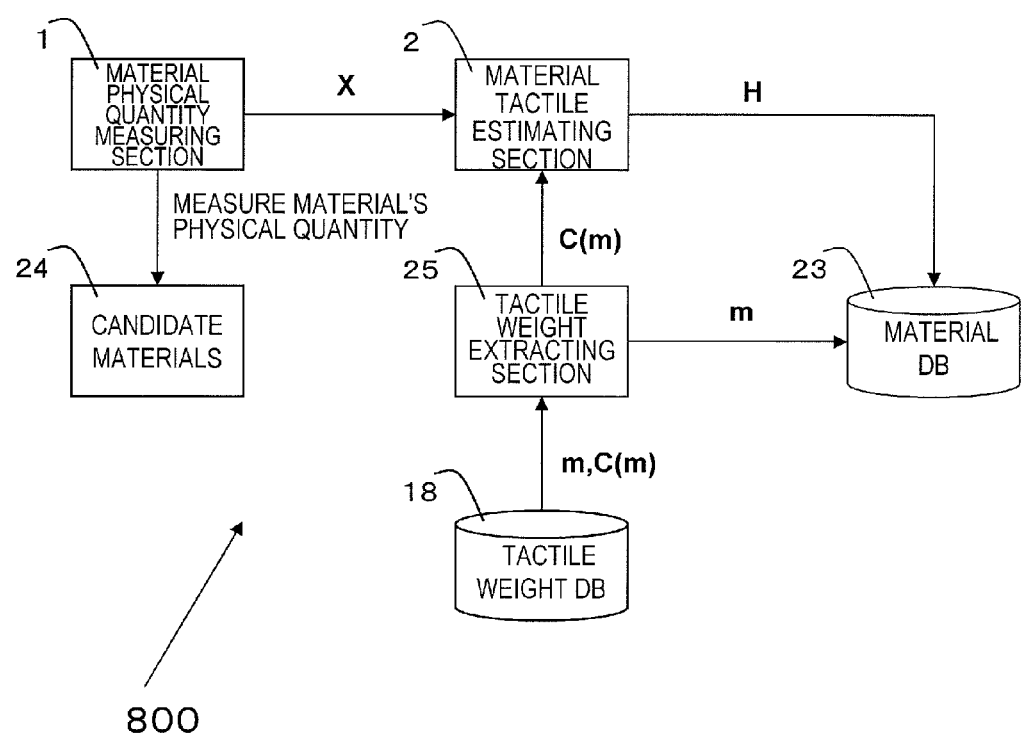
FIG. 25 illustrates a configuration to be used by the feel-based material search device 800 of the first preferred embodiment of the present invention mostly to make learning along with a material DB 23 compiled.

35 and that of the first preferred embodiment shown in FIG. 25 is that each tactile weight vector stored in the tactile weight DB 18a has been determined according to this preferred embodiment on a tactile movement variable m basis and on a tactile type y basis, and therefore, the tactile intensity of each material is also calculated and stored on a tactile movement variable m basis and on a tactile type y basis. The learning step #2 will now be described.

The tactile weight extracting section 25a sequentially extracts, as parameters, one combination of a tactile movement variable m and a tactile type y after another, along with the tactile weight vector C(m, y) at that time, from the tactile weight DB 18a. Among these parameters, the material tactile estimating section 2a applies the tactile weight vector C(m, y) to Equation (16), thereby calculating the tactile intensity $H_y(m)$ with respect to the tactile movement variable m associated with the tactile type y. The tactile intensity $H_y(m)$ thus obtained is stored, in association with the tactile movement variable m and the tactile type y, in the material DB 23a in the form shown in FIG. 31. Alternatively, just like the first preferred embodiment described above, the material DB 23a may simply store the material physical property values on a material-by-material basis and the tactile intensity may be calculated every time a material search is made. In that case, it would take extra time to get computations done during searching but the material DB 23a may have smaller storage capacity, which is beneficial.

By carrying out such learning and material search as described above, even if the type of the feel the feeler is getting cannot be determined unequivocally by the kind of the tactile movement he or she is doing, the target material can still be searched for with the type of the feel he or she is getting and its tactile intensity estimated.

As already mentioned for the first preferred embodiment of the present invention, the feeler does not have to feel the reference material only once, but may feel it a number of times, to search for a target material. In the latter case, it is effective to either narrow the range by performing an AND movement on the results of searches obtained by respective "feeling" movements or expand the range by performing an OR movement on them. In either case, if any tactile type y has been estimated more than once as a result of those tactile movements, then that tactile type y will contribute to searching for a target material a number of times. Consequently, the search result will be obtained with the tactile intensity associated with that tactile type y respected. This means that if the feeler touches the reference material a number of times so as to get the same type of feel consistently while changing the kinds of tactile movements, then the search result obtained will have a tactile intensity associated with that tactile type highlighted. This conforms to the person's behavior of feeling the object and will make it possible for the feeler to search for a target material comfortably without causing him or her any unnaturalness.

Embodiment 3

According to the principle of the present invention that has already been described at the beginning of the description of the first preferred embodiment, by expressing a feel as a vector, of which the components are represented by the respective tactile intensities of multiple types of feels, a variation in feel with the change of kinds of tactile movements can be processed more directly. First of all, this principle will be described.

Suppose the number of tactile types is M. If the tactile intensity associated with each type of feel the feeler is getting is identified by $H_k$, the overall feel can be represented as an M-dimensional column vector by the following Equation (18):

$$H = \begin{pmatrix} H_1 \\ \vdots \\ H_k \\ \vdots \\ H_M \end{pmatrix} \quad (18)$$

This vector will be referred to herein as a "tactile feature quantity vector". In this case, the variation in tactile intensity with the tactile movement variable m represented by Equation (8) can be expressed by the following Equations (19):

$$H(m) = C(m) \cdot X \quad (19)$$

where $$C(m) = \begin{pmatrix} C_{10}(m) & C_{11}(m) & \cdots & C_{1n}(m) \\ \vdots & \vdots & \ddots & \vdots \\ C_{k0}(m) & C_{k1}(m) & \cdots & C_{kn}(m) \\ \vdots & \vdots & \ddots & \vdots \\ C_{M0}(m) & C_{M1}(m) & \cdots & C_{Mn}(m) \end{pmatrix} \quad X = \begin{pmatrix} 1 \\ x_1 \\ \vdots \\ x_n \end{pmatrix}$$

Figure 36:
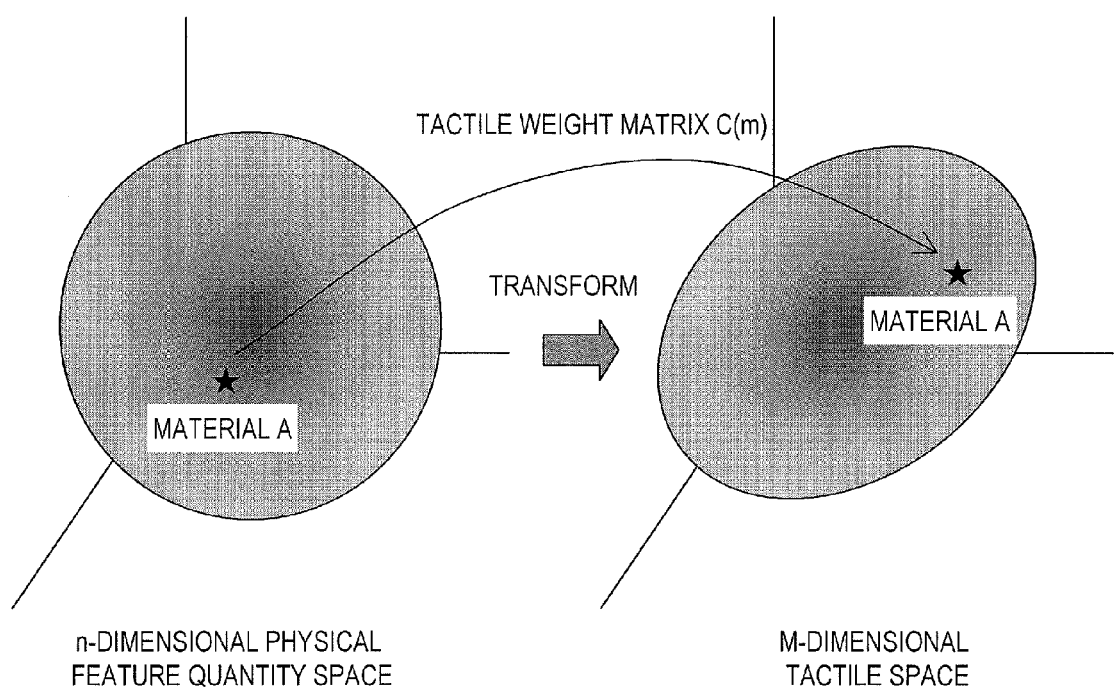
FIG. 36 shows the concept of a physical-to-tactile space transformation.

What has been referred to herein as a "tactile weight vector" in the foregoing description is expressed as a row component in the matrix C(m) represented by Equation (19). And by combining the tactile weight vectors of M different tactile types with each other, a single matrix is obtained. In the following description of this preferred embodiment, this C(m) matrix will be referred to herein as a "tactile weight matrix". Equation (19) means that a material's feel gotten by the feeler is expressed as a point in a tactile feature quantity vector space. That is to say, a material, which is a point in the physical feature quantity space, can be obtained by transforming it with the tactile weight matrix C(m) (see FIG. 36). The material can be searched for with the vector-to-vector distance between the tactile feature quantity vector that has been estimated from the reference material by Equation (10) and the tactile feature quantity vector of the candidate material that is stored in the database.

By searching for a material using such a tactile feature quantity vector, a material, which would have a similar feel to the one the feeler is now getting, should be found for the following reasons.

As already mentioned at the beginning of the description of the first preferred embodiment, the tactile intensity of each type of feel the feeler is getting is variable according to the kind of the tactile movement he or she is doing. Nevertheless, the feeler does not always determine the type of feel he or she is getting only by the tactile intensity of the most prominent type of feel but may also be getting another type of feel with relatively low tactile intensity as well. In other words, the feeler is feeling a given material as a point in the feel space represented by the tactile feature quantity vector.

However, as can be seen from the fact that the tactile weight matrix represented by Equation (19) is determined by the kind of the tactile movement, the position of a material in the feel space is changeable with the kind of the tactile movement. That is why if the target material is searched for so as to keep up with the variation in tactile feature quantity vector according to the kind of the tactile movement, the material can be searched for based on the degree of similarity of the feel the feeler is getting.

Hereinafter, material search processing to be performed based on such a principle of movement will be described with reference to FIGS. 37 and 38.

Figure 37:
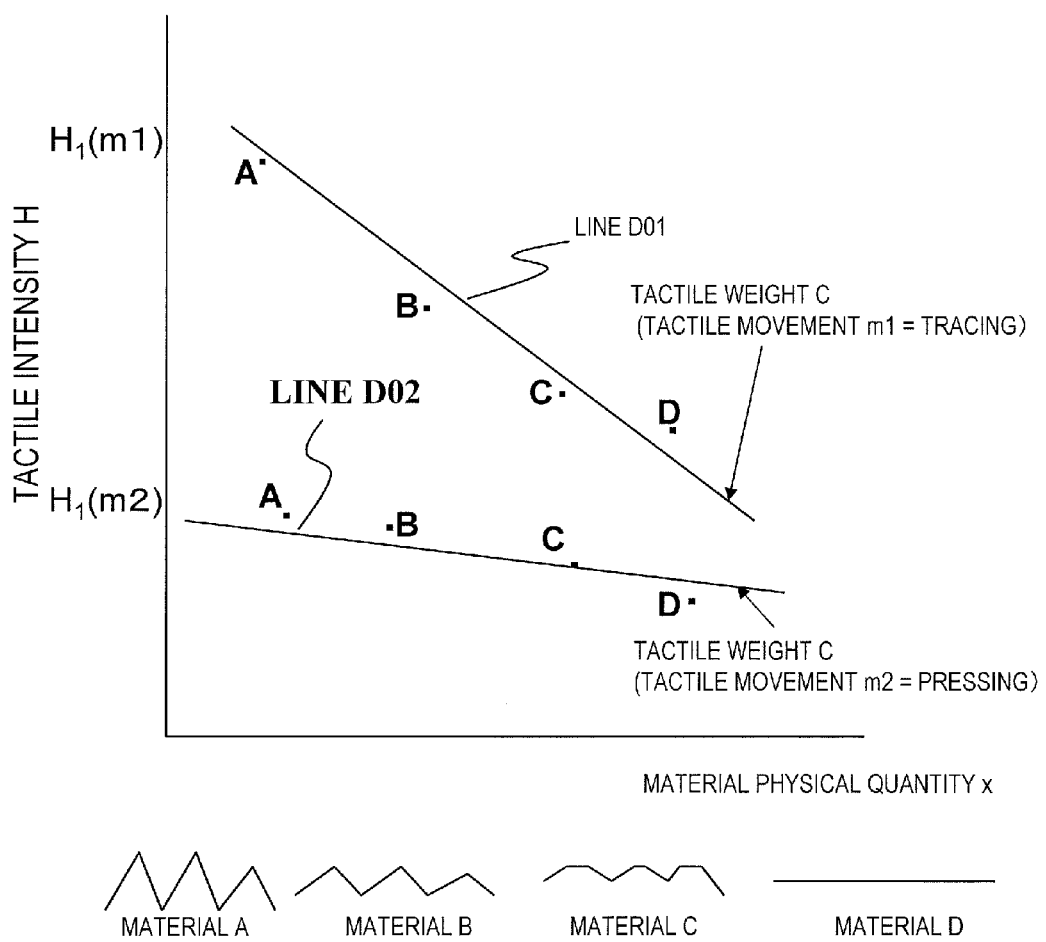
FIG. 37 shows how the tactile intensity gotten by feeling four materials A, B, C and D with mutually different surface roughnesses varies according to the kind of the tactile movement with respect to the surface roughness.

FIG. 37 shows how the tactile intensity gotten by feeling four materials A, B, C and D with mutually different surface roughnesses varies according to the kind of the tactile movement with respect to the surface roughness. Specifically, the tactile intensity gotten by performing a pressing movement varies as represented the line D02 as the materials are changed. In that case, the difference in tactile intensity between the materials is small and the average tactile intensity is relatively low, too. On the other hand, if a tracing movement has been performed, then the tactile intensity varies as represented by the line D01. Then, there is a significant difference in tactile intensity gotten from one material to another and the average tactile intensity is relatively high, too. That is to say, the variation of the tactile weight matrix C(m) represented by Equation (8) according to the kind of the tactile movement is expressed as the gradient and intercept of the line in this example. As a result, if the feeler is feeling a given material by performing a tracing movement on it, he or she should be feeling the roughness of the material more intensely than in a situation where he or she is performing a pressing movement.

Such a variation in tactile intensity according to the kind of the tactile movement will arise in not just when the feeler is getting a rough feel as shown in FIG. 37 but also when he or she is getting any other type of feel as well. And the tactile intensity varies differently according to the type of the feel. FIG. 38 illustrates such a situation as an example, and plots the distribution of the tactile intensities gotten by feeling the four materials A, B, C and D in two different ways (i.e., tracing and pressing movements). In FIG. 38, the abscissas represent the tactile intensities $H_1$ gotten by tracing them and the ordinates represent the tactile intensities $H_2$ gotten by pressing them.

Figure 38:
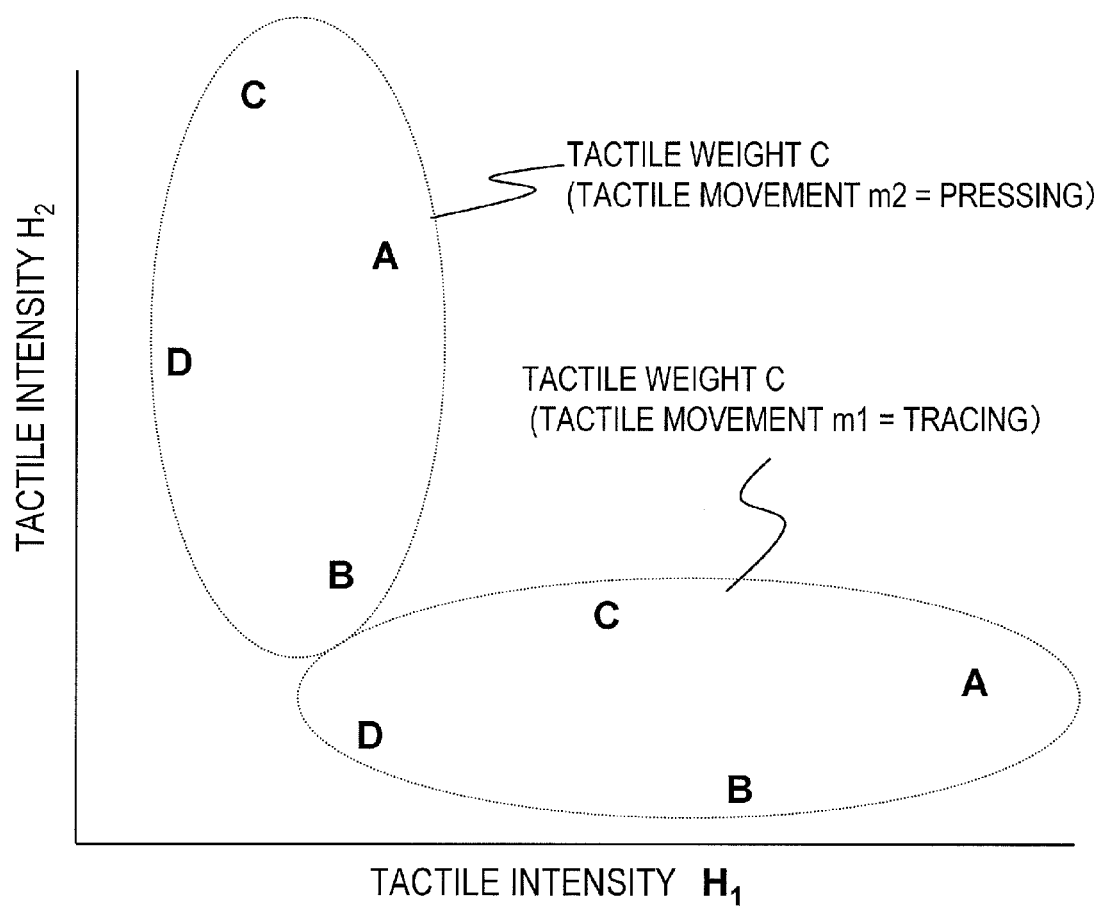
FIG. 38 shows how the distribution of tactile intensities changes according to the kind of a tactile movement performed.

As can be seen from FIG. 38, the distribution of the materials in the tactile intensity space varies according to the kind of the tactile movement performed. For example, if a tracing movement has been performed, the distribution will be elongated along the axis of abscissa. On the other hand, if a pressing movement has been performed, the distribution will be elongated along the axis of ordinates. That is why if a material that has a similar feel to that of the material B is searched for by performing a tracing movement, the material C will be found by reference to the distribution for the tracing movement.

But if such a material that has a similar feel to that of the material B is searched for by performing a pressing movement, the material D will be found by reference to the distribution for the pressing movement. Thus, by searching for a target material in the tactile feature quantity vector space in this manner, the material can be searched for based on the degree of similarity of the feel, which is variable according to the type of feel the feeler is getting and the kind of the tactile movement he or she is performing.

Figure 39:
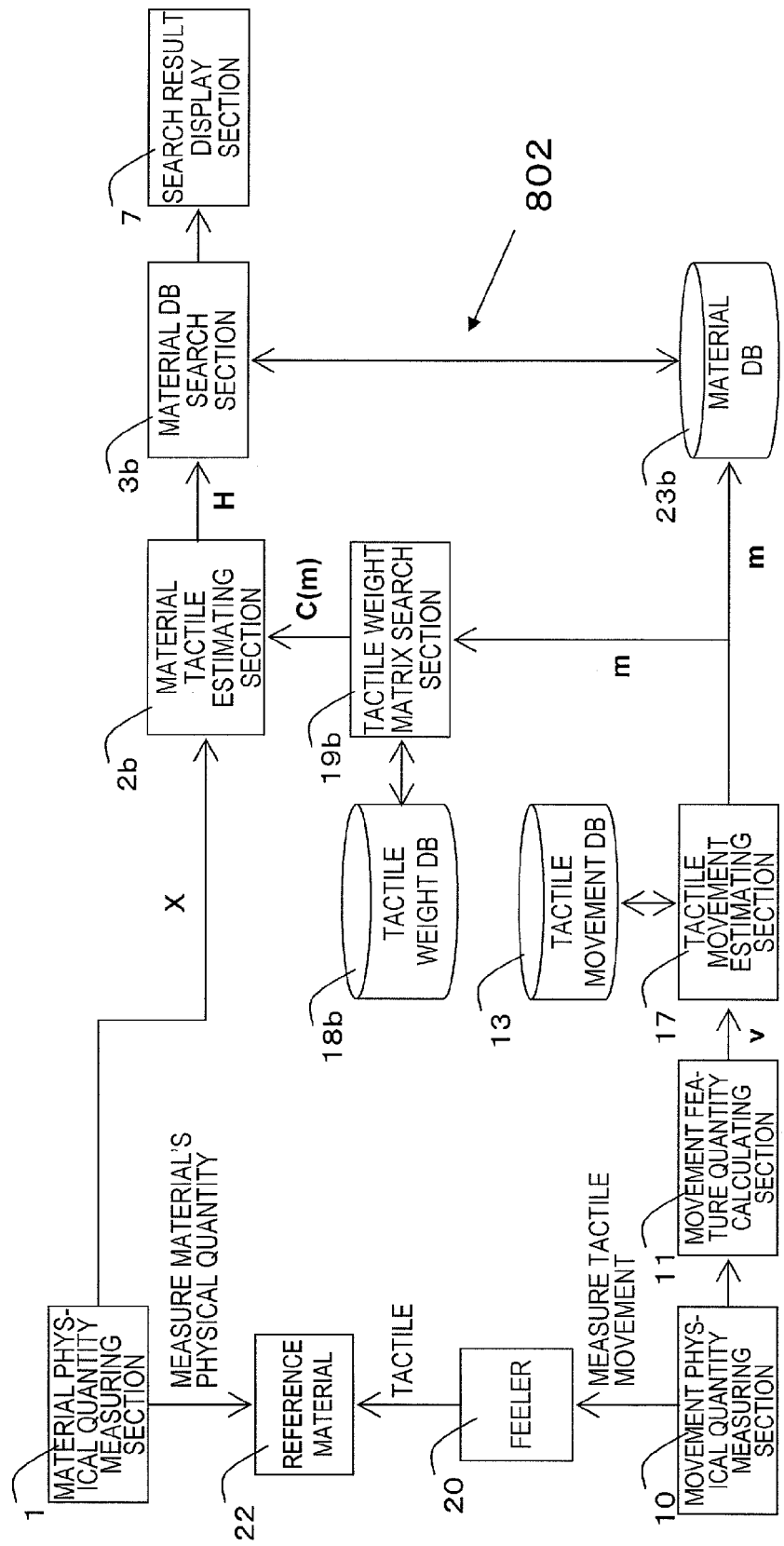
FIG. 39 illustrates a configuration to be used by a tactile feature quantity vector based material search device 802 according to a third preferred embodiment of the present invention mostly to make a search.

Hereinafter, a material search device 802 that uses such a tactile feature quantity vector will be described with reference to FIGS. 39, 40 and 41.

First of all, the material searching method will be described with reference to FIG. 39. In FIG. 39, any component that is also shown in FIG. 14 illustrating the first preferred embodiment of the present invention and that has substantially the same function as its counterpart is identified by the same reference numeral and the description thereof will be omitted herein.

The material search processing flow of this preferred embodiment is almost the same as that of the first preferred embodiment described above. The only difference is that according to this preferred embodiment, the tactile intensity is estimated not just for a particular tactile type that has been determined by the tactile movement variable but also for every other tactile type to be considered as well and the degrees of similarity between those tactile intensities are calculated as vectors.

Hereinafter, the processing of this preferred embodiment will be described in detail mainly about that difference.

Quite the same processing as that of the first preferred embodiment described above is carried out after the feeler has touched the reference material 22 and until the tactile movement variable m is determined by the kind of the tactile movement he or she has done.

After the tactile movement variable m has been determined, the tactile weight matrix searching section 19b searches the tactile weight DB 18b for the tactile weight matrix C(m) represented by Equation (19). That is to say, in the tactile weight DB 18b, the tactile movement variables m and the tactile weight matrices C(m) are stored in association with each other in the form of a lookup table, for example.

The material tactile estimating section 2b applies the tactile weight matrix C(m) and the material physical property value X of the reference material 22 that has been obtained by the material physical quantity measuring section 1 to Equation (19), thereby obtaining a tactile feature quantity vector H. The material DB searching section 3b calculates the vector-to-vector distance between the tactile feature quantity vector of each candidate material, which is stored in the material DB 23b, and the tactile feature quantity vector H that has been obtained by the material tactile estimating section 2b and defines a search score based on that distance. For example, a Euclidean distance between the two vectors may be used. Alternatively, the distance may also be calculated by adding different weights to respective vector components (i.e., respective tactile types). That is to say, supposing the tactile intensity of each of the materials T that are stored in the material DB is $t_i$, the score S(T) of the material T may be calculated by the following Equation (20):

$$S(T) = \sqrt{\frac{1}{M}\sum_{i}^{M} w(i)(H_i - t_i)^2} \qquad (20)$$

where w(i) is a weight function. It is effective to use the posterior probability P (y|m) with respect to the tactile type y as described for the second preferred embodiment as the weight function.

By making such calculations, a material with the best score (i.e., the most similar material) is output as a search result. Alternatively, a group of materials, of which the degrees of similarity are equal to or greater than a predetermined threshold value, could also be output as a search result. In that case, not just the type of the material but also its search score may be output as well. The search result display section 7 displays the result in quite the same way as in the first preferred embodiment described above.

To get such a material search done, the tactile movement DB 13, the tactile weight DB 18b, and the material DB 23b need to be compiled in advance. As in the first preferred embodiment described above, this learning processing step consists of learning step #1 for compiling the tactile movement DB 13 and the tactile weight DB 18b and learning step #2 for compiling the material DB 23b.

Figure 40:
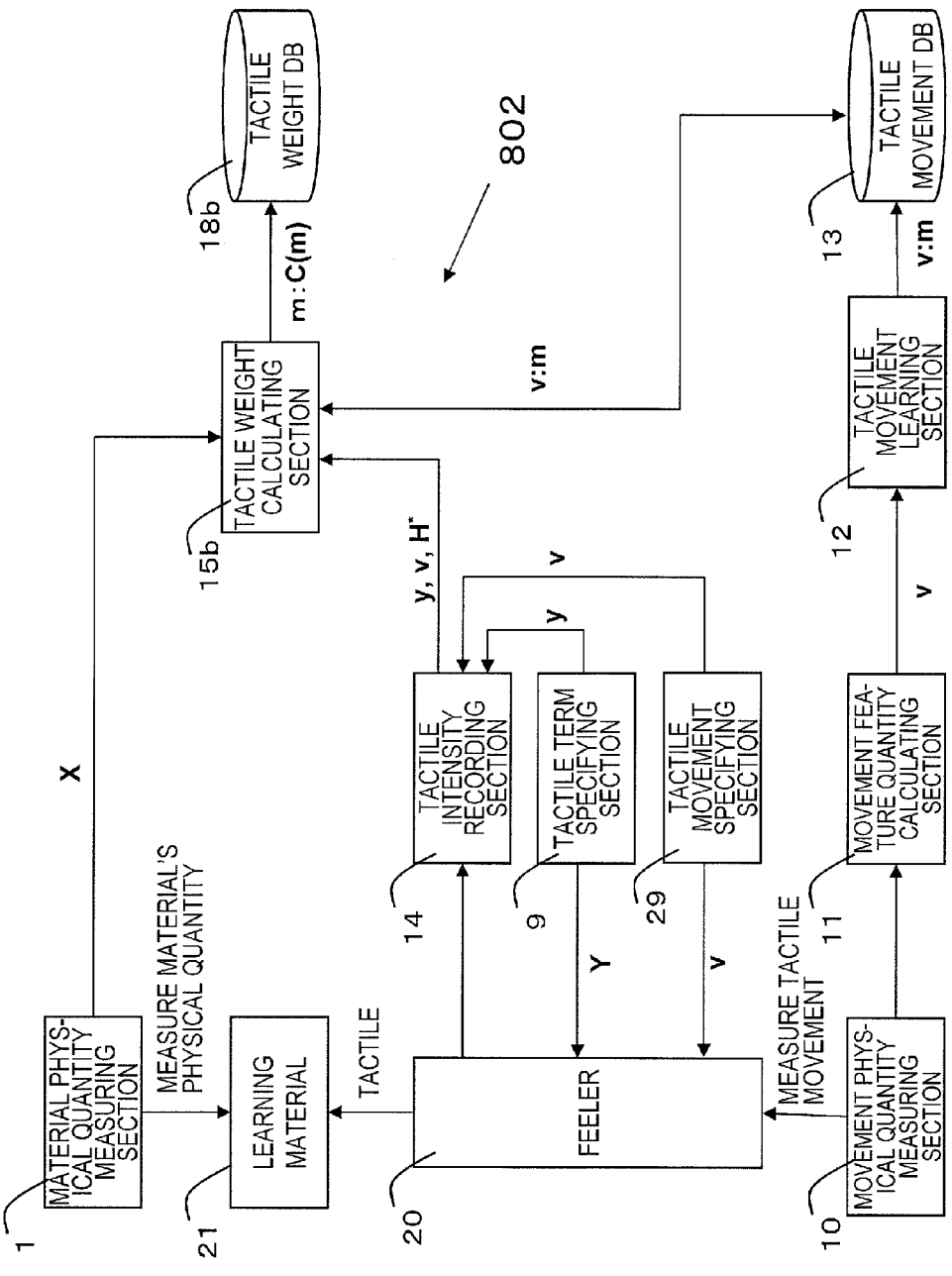
FIG. 40 illustrates a configuration to be used by the feel-based material search device 802 of the third preferred embodiment of the present invention mostly to make learning.
Figure 41:
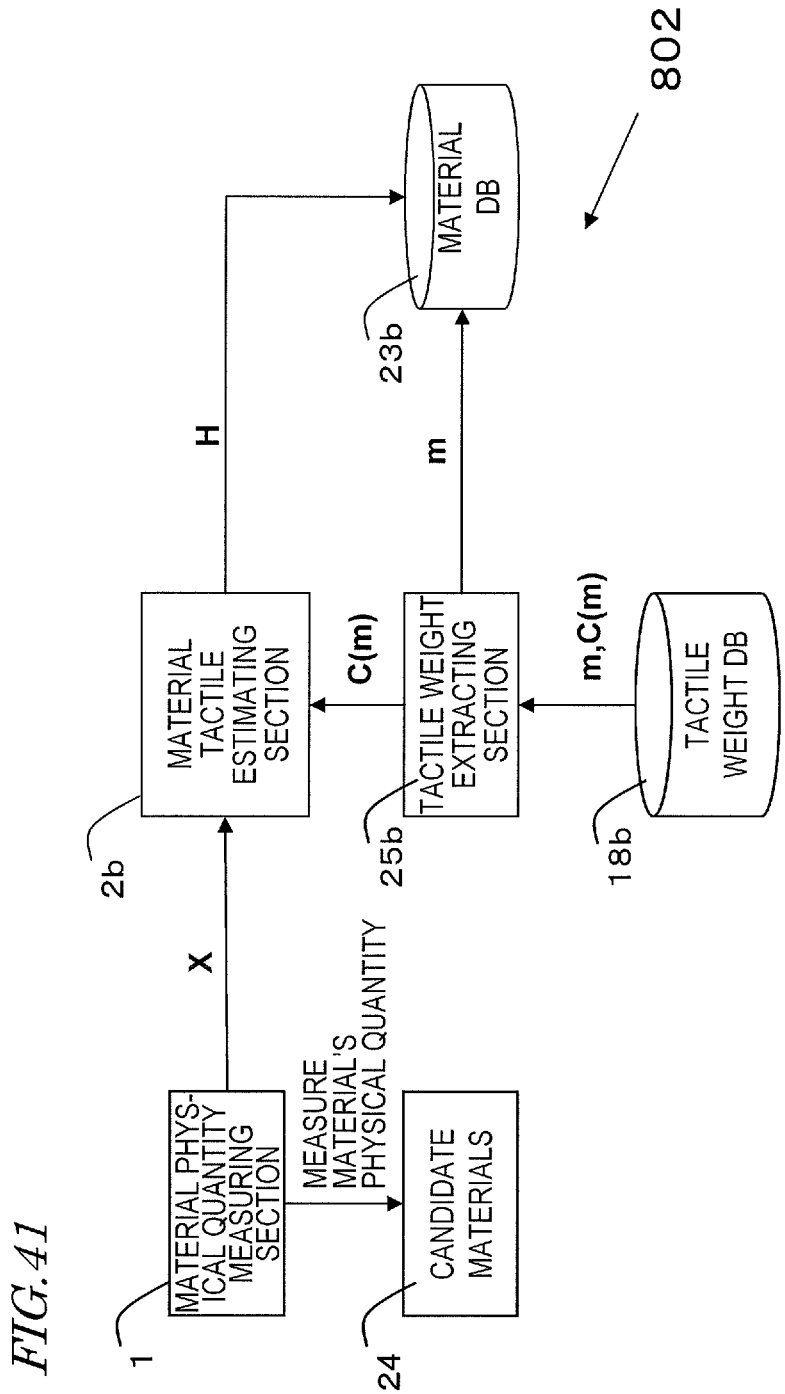
FIG. 41 illustrates a configuration to be used by the feel-based material search device 802 of the third preferred embodiment of the present invention mostly to make learning along with a material DB 23b compiled.

FIG. 40 illustrates a configuration for performing the learning step #1. Hereinafter, the learning step #1 of this preferred embodiment will be described with reference to FIG. 40. In FIG. 40, any component that is also shown in FIG. 24 illustrating the first preferred embodiment of the present invention and that has substantially the same function as its counterpart is identified by the same reference numeral and the description thereof will be omitted herein.

In the learning step #1, a feeling experiment, in which a number of feelers 20 feel multiple learning materials and answer tactile intensities they have gotten in response to multiple tactile terms presented, is also carried out as in the first preferred embodiment described above. Unlike the learning step #1 of the first preferred embodiment, however, each feeler needs to answer the tactile intensities of all of M different tactile types every time he or she performs a tactile movement. This should be done because the material tactile estimating section 2b estimates a vector, of which the components consist of the tactile intensities of all of those M different tactile types, and therefore, the learning data also needs to be a vector consisting of those tactile intensities as its components. In the first preferred embodiment described above, the material tactile estimating section 2 estimates only the tactile intensity of a particular tactile type, and therefore, the feeler has only to answer the tactile intensity of a particular tactile type during learning every time he or she performs a tactile movement.

For that purpose, the material search device of this preferred embodiment includes a tactile movement specifying section 29 and each feeler answers the tactile intensities he or she has gotten in response to each tactile term Y presented with the kind of the tactile movement fixed. And the tactile weight calculating section 15b obtains the tactile weight matrix C(m) by calculating statistically the material physical property values X of the learning materials, the tactile movement variables m and the tactile intensities of the M different tactile types so that when a lot of data about the tactile feature quantity vectors H*, each of which is represented by these parameters, are obtained, the relation represented by Equation (19) is satisfied. As a result, the tactile movement variables m and the tactile weight matrices C(m) are associated with each other and stored in the tactile weight DB 18b.

Next, it will be described in detail exactly how to collect the tactile intensity vector data H*, representing the feel gotten by the feeler, through the feeling experiment.

In carrying out a feeling experiment, the feeler has to answer the tactile intensities he or she has gotten in response to all tactile terms presented every time he or she has performed a tactile movement. That is why the same kind of tactile movement needs to be performed by every feeler. For that reason, the tactile movement specifying section 29 presents either a term instructing a tactile movement such as "trace" or "press" or video representing an actual tactile movement that was shot.

In this case, the movement physical quantity measuring section 10 and the movement feature quantity calculating section 11 may monitor the tactile movement performed by the feelers. And if anyone is performing a tactile movement in a significantly different way that is outside of the allowable range, then he or she may be warned to follow an instruction on how he or she has to perform the tactile movement. Optionally, an arm with an actuator that can move along multiple axes including X, Y and Z axes and their rotations may hold the feeler's hand and fingers, move them so that he or she performs the instructed kind of tactile movement, and make him or her answer the tactile intensity he or she has gotten.

As can be seen, the tactile movements specified by the tactile movement specifying section 29 are preferably comprehensive in order to obtain the tactile weight matrix C(m). And to obtain a comprehensive set of tactile movements, a feeling experiment for compiling the tactile movement DB 13 and a feeling experiment for compiling the tactile weight DB 18b may be carried out separately from each other in the learning step #1. More specifically, first of all, a feeling experiment is carried out in the same way as in the processing step of compiling the tactile movement DB 13 as already described for the learning step #1 of the first preferred embodiment, thereby compiling the tactile movement DB 13. As a result, multiple groups of tactile movements are determined along with the average of the tactile movement feature quantity vectors v of each group. Next, in carrying out the feeling experiment for compiling the tactile weight DB 18b, the tactile movement specifying section 29 either presents terms or video specifying the tactile movements of respective groups or gets the tactile movements determined by the tactile movement feature quantity vectors v reproduced by the multi-axis arm, thereby obliging the feelers to feel the materials. Then, the feelers can be prompted to perform every kind of tactile movement comprehensively. By sequentially instructing every combination of tactile movement and tactile term one after another, responses about [number of kinds of tactile movements]×[number of tactile types] tactile intensities can be obtained from each feeler.

The tactile weight calculating section 15b collects the tactile intensity data H* about the respective feelers, respective learning materials, respective tactile movement variables m, and respective tactile types y and processes them statistically, thereby determining the tactile weight matrix C(m). Each row component of the tactile weight matrix C(m) corresponds to a single tactile type as in the tactile weight vector that has been described for the first or second preferred embodiment. That is to say, the tactile weight vectors are determined for the respective tactile types by the method that has already been described for the first or second preferred embodiment and then synthesized together, thereby obtaining the tactile weight matrix C(m). Then, the tactile weight DB 18b stores the tactile weight matrix C(m) thus obtained in association with the tactile movement variables m.

Next, it will be described with reference to FIG. 41 how to compile the material DB 23b by performing the learning step #2. In FIG. 41, any component that is also shown in FIG. 25 illustrating the first preferred embodiment of the present invention and that has substantially the same function as its counterpart is identified by the same reference numeral and the description thereof will be omitted herein. The differences between this configuration for performing the learning step #2 and that of the first preferred embodiment described above are that the tactile weight DB 18b stores the tactile weight matrix instead of the tactile weight vectors and that the tactile intensity estimated by the material tactile estimating section 2b is not the tactile intensity (scalar) of a particular tactile type but a tactile intensity vector, of which the components are the tactile intensities of M different tactile types. The general flow of the processing is the same as that of the learning step #2 of the first preferred embodiment described above.

Specifically, a tactile weight extracting section 25b extracts a combination of a tactile movement variable m and a tactile weight matrix C(m) one after another from the tactile weight DB 18b. For each combination of the tactile movement variable m and the tactile weight matrix C(m), the material tactile estimating section 2b applies the material physical property value X of the candidate material 24 that has been measured by the material physical quantity measuring section 1 to Equation (19), thereby obtaining the estimated tactile feature quantity vector H of that material. In the material DB 23b, the candidate materials 24, the tactile movement variables m, and the tactile feature quantity vectors H estimated at that time are stored in associated with each other.

As described above, by estimating, as a tactile feature quantity vector, every type of feel the feeler may get while performing various kinds of tactile movements, the overall feel that the feeler gets by feeling a given material can be estimated. Also, by making a material search based on that tactile feature quantity vector, a material that has the most similar feel to the one gotten by the feeler while performing a certain kind of tactile movement can be searched for just by feeling a reference material.

Embodiment 4

The fourth through seventh preferred embodiments of the present invention to be described below relate to a tactile display for displaying the feel of a target material to the user as if he or she actually touched the material by hand. For that purpose, the tactile display senses a person's tactile movement, measures the physical property value of the object by the kind of his or her tactile movement, gets the physical property value that has been retrieved from a database compiled in advance by reference to the kind of the tactile movement transformed into a tactile quantity by physical-psychological transformation means, and then controls the actuator of the tactile display based on the tactile quantity, thereby reproducing the feel to be gotten by touching the object.

Figure 42:
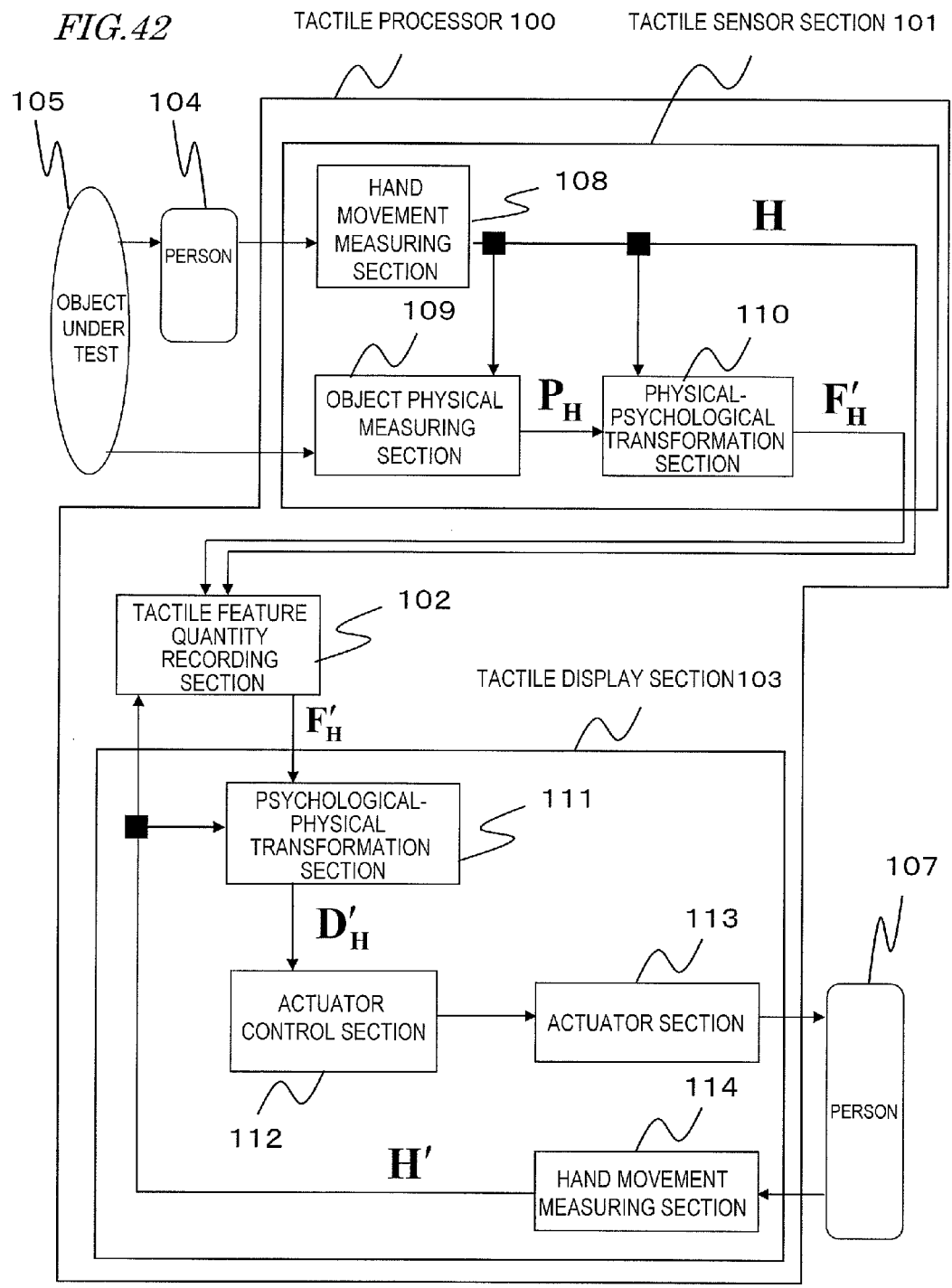
FIG. 42 is a block diagram illustrating a tactile processor 100 as a fourth specific preferred embodiment of the present invention.

FIG. 42 is a block diagram illustrating a tactile processor 100 as a fourth specific preferred embodiment of the present invention.

The tactile processor 100 of this preferred embodiment measures and records a tactile feature quantity by the kind of tactile movement performed by a person 104 who has touched an object, and retrieves the tactile feature quantity recorded by reference to the kind of the tactile movement performed by a person 107 who is touching a tactile display, thereby reproducing the feel on the tactile display.

The person 104 who is feeling the object under test 105 and the person 107 who is touching the tactile display section 103 may or may not be the same. If the persons 104 and 107 are different individuals, the feels they get should be different between them according to the sensitivity of their tactile receptors and their past experience. Also, the movements of their hands feeling those objects are also different. Specifically, when the person 107 is performing a tactile movement by touching the tactile display section 103, a tactile movement estimated tactile feature quantity vector $F'_H$ is retrieved from a tactile feature quantity recording section 102. In this processing step, the individual difference between the persons 107 and 104 causes an error in feel reproducibility. However, according to the present invention, a feel is displayed to the person 107 with the individual difference between the persons 104 and 107 left as it is, not ironed out. And even if the persons 104 and 107 are the same individual, it is natural that a slight difference is caused every time he or she performs a tentative tactile movement. As described above, there should be some kind of difference between the state in which the subject under test 104 feels the object under test 105 and the state in which the person 107 touches the tactile display section 103 and the feel is reproduced within the range of that difference according to the present invention.

That is why it makes no difference no matter whether the subject under test 104 and the person 107 are the same individual or not.

The tactile movement performed by the person 107 who is touching the tactile display represents a particular type of feel that he or she wants to experience among various types of feels (including an uneven feel, a hard/soft feel, a frictional feel and a sticky feel) he or she has gotten from the object. To improve the reproducibility on the tactile display, it is important to understand accurately the feeler's intention. That is why according to this preferred embodiment, one of multiple tactile feature quantities that have been stored in advance is selectively extracted by determining the type of the tactile movement that the feeler is performing on the tactile display, and the feel he or she wants to experience on the tactile display is reproduced based on that tactile feature quantity.

Hereinafter, the tactile processor 100 shown in FIG. 42 will be described in detail.

The tactile processor 100 includes a tactile sensor section 101, a tactile feature quantity recording section 102, and a tactile display section 103. The tactile sensor section 101 measures the feel that the person 104 has gotten by touching an object under test 105 and determines the kind of the tactile movement he or she has performed, and then records the feel measured, along with the kind of the tactile movement, as a tactile feature quantity in the tactile feature quantity recording section 102. Furthermore, in response to the tactile movement performed by the person 107 who has touched the tactile display section 106, the tactile feature quantity is retrieved from the tactile feature quantity recording section 102 and reproduced on the tactile display section 103.

The tactile sensor section 101 includes a hand movement measuring section 108, an object physical measuring section 109 and a physical-psychological transformation section 110, and estimates the feel that the person 104 has gotten by touching the object under test 105 by the method for estimating the feel with the kind of the tactile movement taken into account as shown in FIG. 1. The hand movement measuring section 108 measures the tactile movement performed by the person 104 who is touching the object under test 105. The object physical measuring section 109 calculates the physical property vector $P_H$ of the object under test 105 based on the status of contact between the person 104 and the object under test 105. Since the status of contact between the person 104 and the object under test 105 needs to be known, the hand movement measuring section 108 supplies a tactile movement feature quantity vector H to the object physical measuring section 109. The physical-psychological transformation section 110 corresponds to the physical-psychological transformation means 2304 shown in FIG. 1. Using a function $M_H$ that has been calculated in the learning processing step 2305, the physical-psychological transformation section 110 transforms the physical quantity that has been measured by the object physical measuring section 109 into a psychological quantity, thereby estimating the feel that the person 104 has gotten by touching the object under test 105.

The hand movement measuring section 108 has the same function as the movement physical quantity measuring section 10 that has already been described for the first preferred embodiment of the present invention, and the description thereof will be omitted herein.

The object physical measuring section 109 measures the physical property value of the object under test 105. At that time, to measure a physical property value related to the person's (104) tactile movement, the object physical measuring section 109 gets the tactile movement feature quantity vector H from the hand movement measuring section 108.

The physical property value thus measured is output as a tactile movement test physical property value vector $P_H$. As used herein, the "tactile movement" means "the hand movement of the person (104) who feels the object under test 105" and the "tactile movement test physical property value" means a "limited physical property value related to the tactile movement".

The object physical measuring section 109 of this preferred embodiment may have the same configuration as the material physical quantity measuring section 1 of the first preferred embodiment described above, and the description thereof will be omitted herein. Also, as in the first preferred embodiment of the present invention described above, any type of physical measuring sensor may be used. For example, measurement may be carried out using a non-contact sensor such as a laser displacement meter.

The physical property value measured by the object physical measuring section 109 is output, along with the position information (X, Y, Z obtained by the physical sensor 504, as the tactile movement test physical property value vector $P_H$.

The physical-psychological transformation section 110 transforms the tactile movement test physical property value vector $P_H$ into a tactile movement estimated tactile feature quantity vector $F'_H$, thereby estimating the feel that the person 104 has gotten by touching the object under test 105. The transformation equation is generated in the learning processing step 2305 shown in FIG. 1 and prepared as a function $M_H$, which is made up of multiple Equations (8) that have been classified according to the tactile movement feature quantity vector and that are used selectively according to the tactile movement feature quantity vector H that is supplied from the hand movement measuring section 108. That is why the calculating function of the physical-psychological transformation section 110 can be represented by the following Equation (21):

$$F'_H = M(P_H, H) \quad (21)$$

The tactile movement test physical property value vector $P_H$ may be defined by a roughness coefficient, a modulus of elasticity, a coefficient of static friction, and a coefficient of kinetic friction, for example. The roughness coefficient represents the surface unevenness by a single coefficient. Thus, the bigger the level difference produced by the surface unevenness, the greater the roughness coefficient value will be. The moduli of elasticity may be classified into a modulus of vertical elasticity representing the degree of deformation caused by pressure that has been applied perpendicularly to the object (i.e., a Young's modulus), and a modulus of horizontal elasticity representing the degree of deformation caused by pressure (or shear) that has been applied horizontally to the object (i.e., a modulus of shear elasticity). The tactile movement feature quantity vectors H may be classified by a K-mean method, in which a category center vector is sequentially updated by adding the nearest vector to multiple category center vectors that have been set as initial values, as already described for the first preferred embodiment or any other conventional classification method. Supposing the hand movement consists of a vertical movement and a horizontal movement, the tactile movement feature quantity vectors H are classified into two clusters as a result of clustering processing. If Equation (21) is expressed specifically with these instances, the following Equation (22) may be derived, for example:

$$F'_H = \begin{cases} 0.2a + 0.2b + 0.1c + 0.3d + 0.2e & (H=1) \\ 0.1a + 0.2b + 0.2c + 0.1d + 0.4e & (H=2) \end{cases} \quad (22)$$

where a represents the roughness coefficient, b represents the modulus of vertical elasticity, c represents the modulus of horizontal elasticity, d represents the coefficient of static friction, and e represents the coefficient of kinetic friction. H=1 represents a situation where the object is pressed perpendicularly, while H=2 represents a situation where the object is traced horizontally.

FIG. 43 shows an exemplary structure of the physical-psychological transformation section 110. Table 2401 receives tactile movement feature quantity vectors H and tactile movement test physical property value vectors $P_H$ as inputs and provides tactile movement estimated tactile feature quantity vectors $F'_H$ as outputs. With respect to n objects of learning, various kinds of tactile movements that the subject under test has performed by touching those objects are classified by clustering (e.g., into two categories in this example). Also, in this example, five different kinds of physical property values are measured and kept on record as a tactile movement test physical property value vector $P_H$. What is output is a vector representing the quantity of the response of the subject under the sensory evaluation test by factors. That vector is kept on record for each of the n objects of learning.

Figure 8:
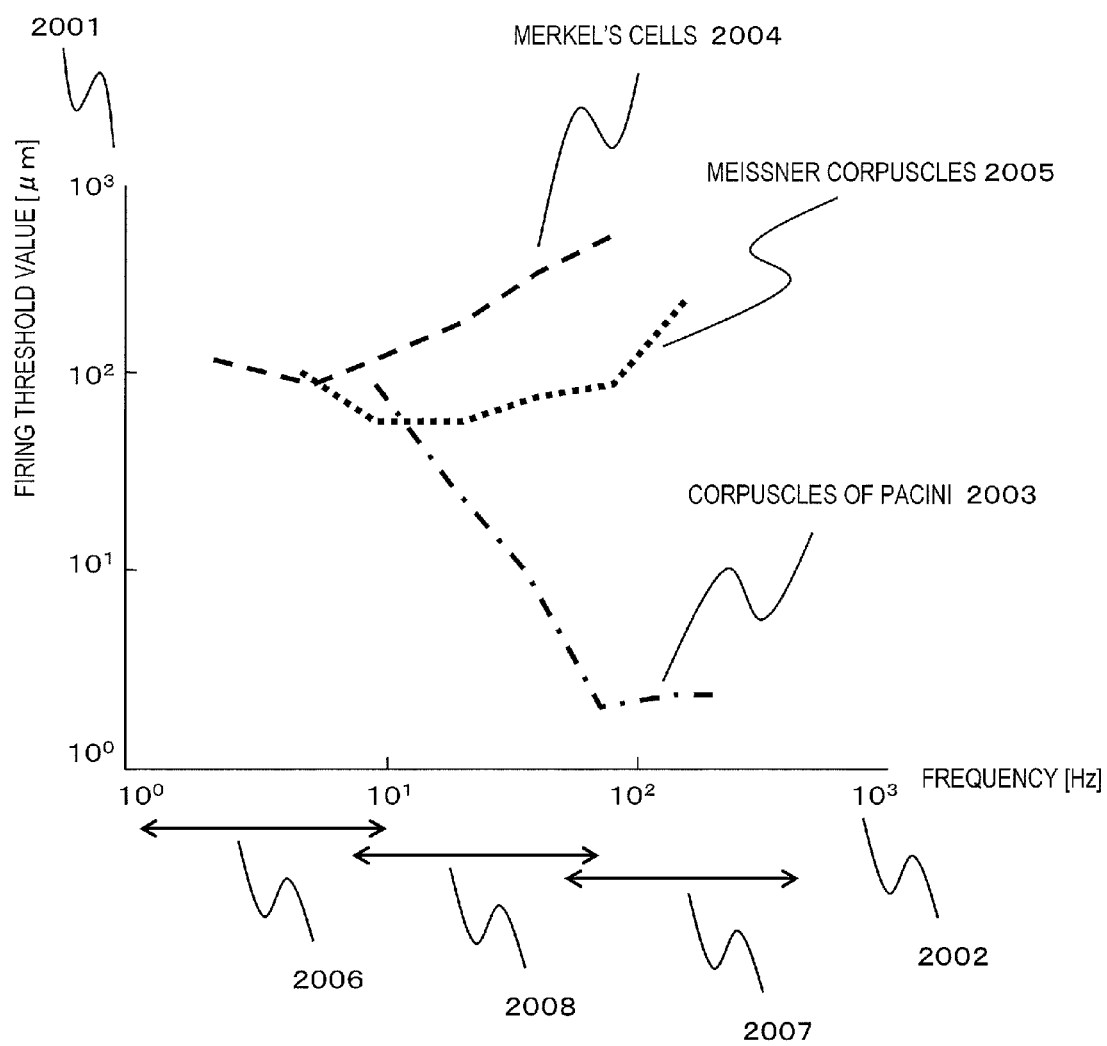
FIG. 8 provides information about the sensitivity distributions of Merkel's cells, Meissner corpuscles, and corpuscles of Pacini.

As already described mainly with reference to FIG. 8, the firing threshold value of tactile receptors varies according to the frequency of vibrations. That is why it is necessary to determine which tactile receptors will be fired according to the status of contact between the feeler's fingertips and the object. To fire the tactile receptors will eventually result in producing a feel. For that reason, the factors derived by the sensory evaluation test that describes the feel quantitatively heavily depend on the status of contact between the fingertips and the object. In other words, since the feel gotten varies if the kinds of tactile movements are changed, it can be said that different factors will be extracted if the kinds of tactile movements are changed. That is why a better factor analysis with high cumulative proportion could be done more easily by classifying various kinds of tactile movements into several patterns and performing the factor analysis on a pattern-by-pattern basis.

Figure 44:
FIG. 44 shows a table of correspondence between the kind of a tactile movement and the type of a feel gotten.

The tactile feature quantity recording section 102 records the tactile movement feature quantity vector H and tactile movement estimated tactile feature quantity vector $F'_H$ that have been calculated by the tactile sensor section 101. The tactile movement feature quantity vector H is a feature quantity vector representing the tactile movement that has been performed by the person 104 by touching the object under test 105. On the other hand, the tactile movement estimated tactile feature quantity vector $F'_H$ is a feature quantity vector representing the feel that has been gotten by the person 104 by touching the object under test 105. Both of these two vectors are measurement data about the person 104. And as shown in FIG. 44, the vectors representing the tactile movement and the feel are recorded in pairs, thereby drawing up a table of correspondence 2601 between the tactile movements and the feels. Specifically, in the example illustrated in FIG. 44, n different pairs of tactile movement feature quantity vectors H and tactile movement estimated tactile feature quantity vectors $F'_H$ are recorded. In this case, a vector H104, x (where x=1, 2, . . . or n) denotes the $x^{th}$ tactile movement feature quantity vector H, while a vector $F'_H 104$, x (where x=1, 2, ... or n) denotes the $x^{th}$ tactile movement estimated tactile feature quantity vector $F'_H$.

In addition, the tactile feature quantity recording section 102 further outputs a tactile movement estimated tactile feature quantity vector $F'_H$ representing the kind of the tactile movement that has been performed by the person 107 by touching the tactile display section 103. As already described with reference to FIG. 8, by changing the status of contact with the object, a person gives vibration stimuli of varying frequencies to his or her tactile receptors, thereby getting various feels. That is why this tactile processor 100 is designed so as to once store those various feels gotten by the person 104 in the tactile feature quantity recording section 102 and then call a corresponding feel in response to the tactile movement performed by the person 107.

As can be seen, by providing the tactile feature quantity recording section 102, numerous pieces of information about the tactile feature quantities are accumulated. That is why the greater the amount of the tactile feature quantity information collected, the more accurately a feel representing the feature quantity the person 107 wants to experience can be reproduced on the tactile display section 103.

Figure 45:
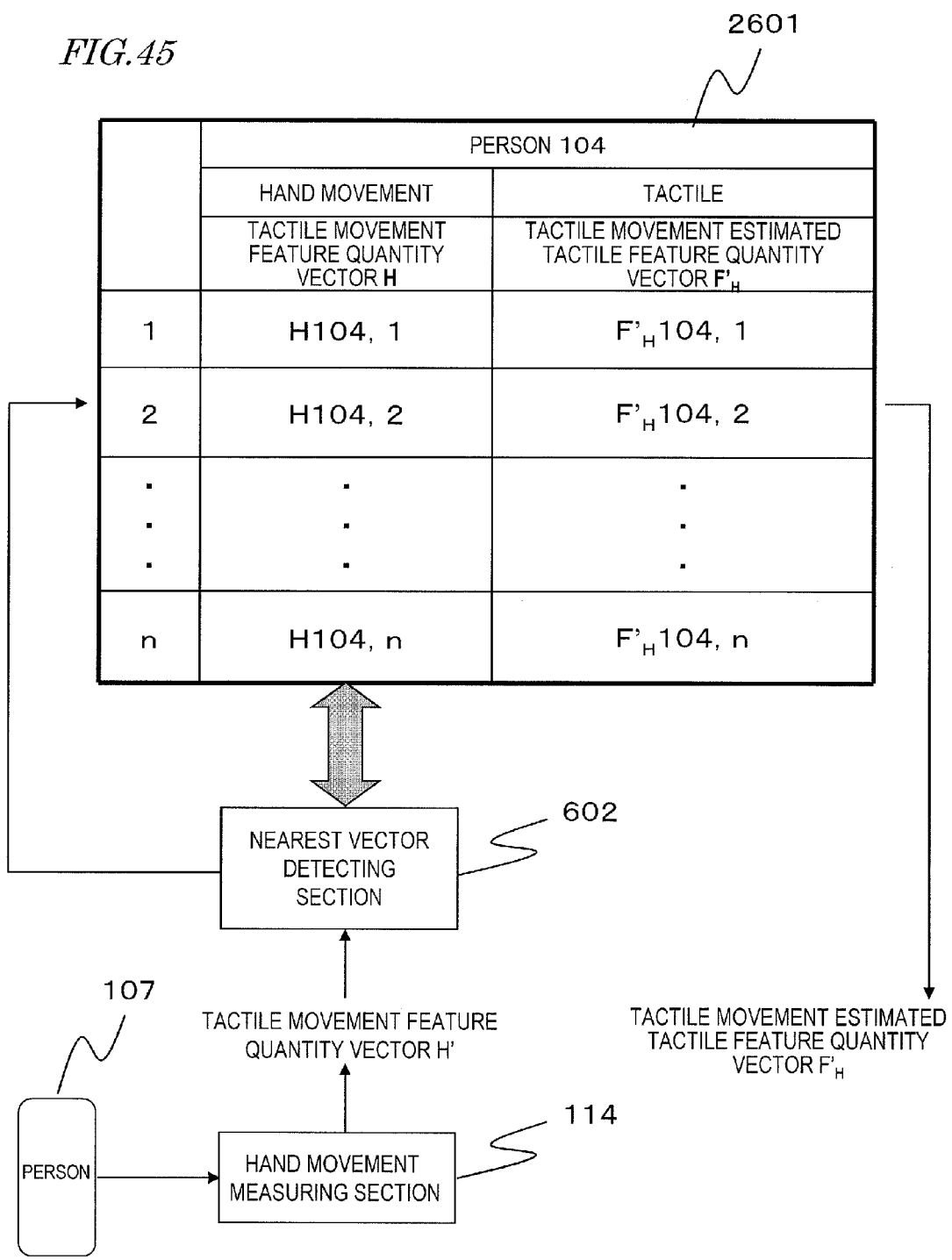
FIG. 45 illustrates how to select the tactile movement estimated tactile feature quantity vector $F'_H$ to be presented to a person 107 by using the person's (107) tactile movement feature quantity vector H' as a search key.

FIG. 45 illustrates how to select the tactile movement estimated tactile feature quantity vector $F'_H$ to be presented to the person 107 by searching the table of correspondence 2601 between the subject's (104) tactile movement and the feel using the person's (107) tactile movement feature quantity vector H' as a search key. As will be described in detail later, the tactile movement performed by the person 107 who has touched the tactile display section 103 is measured by the hand movement measuring section 114 of the tactile display section 103 and eventually output as a tactile movement feature quantity vector H'. A nearest vector detecting section 2602 compares the n tactile movement feature quantity vectors H in the tactile movement-feel correspondence table 2601 to the tactile movement feature quantity vector H', thereby detecting the nearest vector in the vector space. In the example shown in FIG. 45, the tactile movement feature quantity vector H104, 2, which belong to the second data item, is detected as the nearest vector. That is why the tactile movement estimated tactile feature quantity vector $F'_H 104, 2$, also belonging to the second data item, is output as the tactile movement estimated tactile feature quantity vector $F'_H$.

In the example illustrated in FIG. 45, only one nearest vector is supposed to be detected. However, multiple nearest vectors may be detected, weighted, and then the average of their sum may be calculated as the tactile movement estimated tactile feature quantity vector $F'_H$. That is to say, as represented by the following Equation (23), k tactile movement feature quantity vectors H104, x, of which the distances from the tactile movement feature quantity vector H' are relatively short, are detected, their associated tactile movement estimated tactile feature quantity vectors $F'_H 104$, x are multiplied by a weight wi, and then the resultant products are added together. As represented by the following Equation (24), the weight wi is calculated based on the inverse number of the distance between the tactile movement feature quantity vectors H' and H104, x as the ratio of that inverse number (numerator) to the sum of k inverse numbers (denominator).

$$F'_H = \sum_{i=1}^{k} w_i F'_{H,104,i} \qquad (23)$$

-continued $$w_i = \frac{\frac{1}{H' - H'_{104,i}}}{\sum_{m=1}^{k}\left(\frac{1}{H' - H'_{104,m}}\right)} \qquad (24)$$

Figure 47:
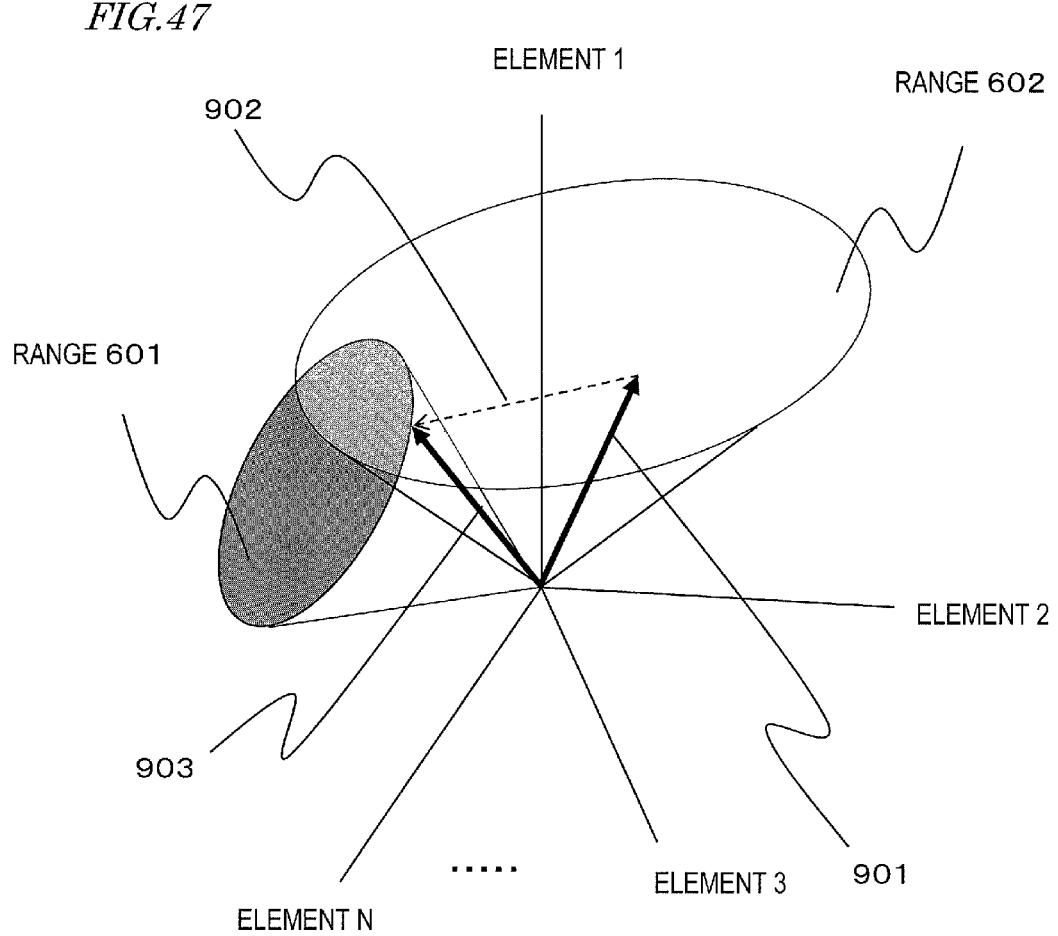
FIG. 47 shows how a tactile movement feature quantity vector 901 that is located outside of a range 601 (of a person 104) is mapped to the location nearest to the range 601 and how a tactile movement feature quantity vector 903 with some error 902 is detected.

Ideally, the person's (104) hand movement covers every possible hand movement of the person's 107 comprehensively. FIG. 46 illustrates a tactile movement feature quantity vector space. In FIG. 46, the range 601 indicates the distribution of tactile movement feature quantity vectors obtained from the person 104, while the range 602 indicates the distribution of tactile movement feature quantity vectors obtained from the person 107. If the (person's 104) range 601 does include the (person's 107) range 602 in its entirety (which means that sufficient learning is carried out) as shown in FIG. 46(a), the tactile movement estimated tactile feature quantity vector $F'_H$ of the object under test 105 can be provided for every possible hand movement of the person's 107. On the other hand, if the (person's 104) range 601 does not include the (person's 107) range 602 entirely as shown in FIG. 46(b), the tactile movement estimated tactile feature quantity vector $F'_H$ of the object under test 105 cannot be provided accurately with respect to some hand movements of the person's 107. The nearest vector detecting section 2602 detects the nearest vector. That is why the tactile movement feature quantity vector 901 that is located outside of the range 601 (of the person's 104) is mapped to the location nearest to the range 601 and a tactile movement feature quantity vector 903 with some error 902 is detected as shown in FIG. 47.

The relation between the tactile movement estimated tactile feature quantity vectors $F'_H$ and the tactile movement feature quantity vectors H shown in FIG. 44 may also be described by function as in the following Equation (25):

$$H = G(F'_H) \qquad (25)$$

That is to say, as already described mainly with reference to FIG. 8, there is a close correlation between the tactile movement and the feel gotten. And if their correlation is high, the relation between the two vectors can be described highly accurately by function. If the tactile movement feature quantity vector H is transformed into the tactile movement estimated tactile feature quantity vector $F'_H$ by the function G, the tactile movement feature quantity vector H' provided by the tactile display section 103 may be substituted for H in Equation (25), thereby calculating the tactile movement estimated tactile feature quantity vector $F'_H$, which can replace the movement shown in FIG. 45.

The tactile display section 103 includes a psychological-physical transformation section 111, an actuator control section 112, an actuator section 113, and a hand movement measuring section 114, and reproduces the feel of the object under test 105 for the person 107 based on the tactile movement estimated tactile feature quantity vector $F'_H$.

Figure 6:
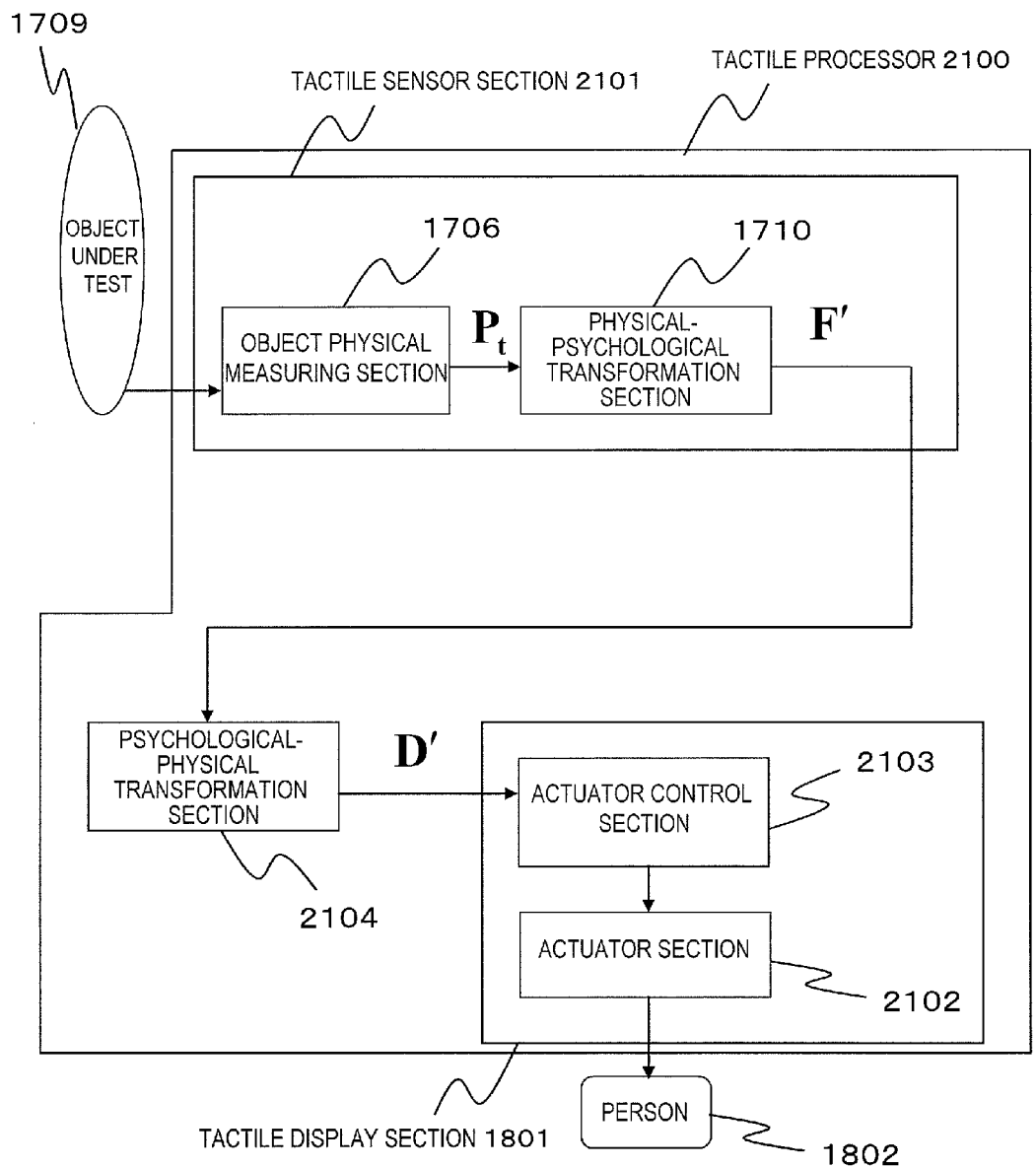
FIG. 6 is a block diagram illustrating a tactile processor 2100, which is tentatively obtained by the present inventors by virtually combining the tactile quantification and sensing scheme that has already been described with reference to FIG. 4 with the tactile display scheme that has just been described with reference to FIG. 5.

The psychological-physical transformation section 111 transforms the tactile movement estimated tactile feature quantity vector $F'_H$ into an actuator control signal $D'_H$. To get this transformation done, Equation (6) is also used as in the psychological-physical transformation section 2104 shown in FIG. 6. In this preferred embodiment, however, one of multiple Equations (6) that have been classified by the kind of the tactile movement is selected according to the tactile movement estimated tactile feature quantity vector $F'_H$. Just like the physical-psychological transformation section 110, this is done in order to carry out a factor analysis according to the pattern of the tactile movements classified. Specifically, for that purpose, the tactile movement feature quantity vectors of the person 107 who has touched the tactile display section 103 are classified into a number of categories by the K-mean method, for example, and the factor analysis is carried out on a category-by-category basis. In that case, the relation between the feature quantity vector F' and the actuator control signal D', both of which are factors, is represented by a matrix V and Equation (6) is provided as its inverse matrix.

In accordance with the actuator control signal $D'_H$ received, the actuator control section 112 controls the actuator section 113.

Figure 5:
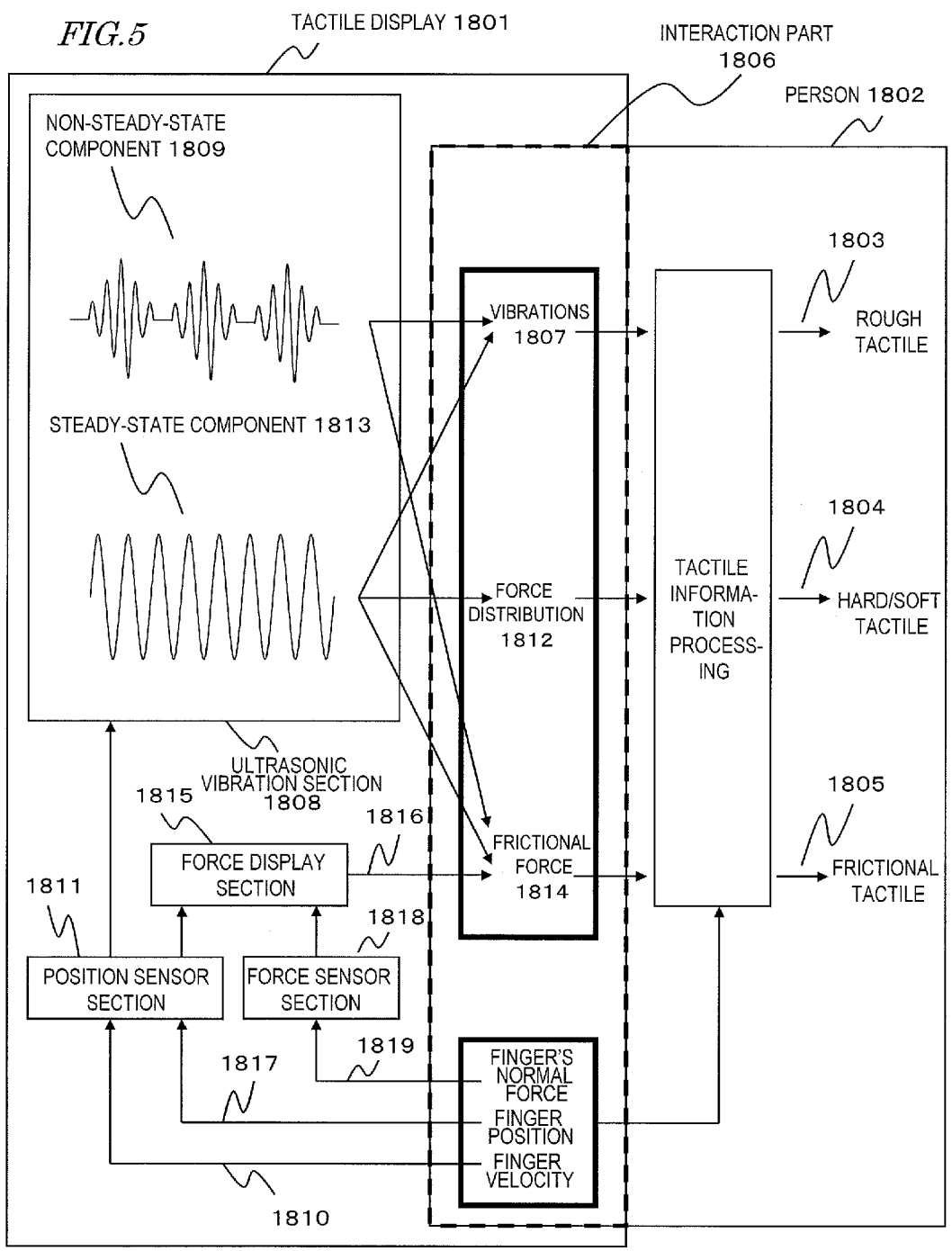
FIG. 5 illustrates the configuration of a tactile display section 1801 and also shows its correlation with a rough feel 1803, a hard/soft feel 1804 and a frictional feel 1805, which are all feels of a person's 1802.

The actuator section 113 may operate on any arbitrary principle. Specifically, as already described in background section with reference to FIG. 5, the actuator section 113 may present vibrations, a sense of force or frictional force. According to the present invention, however, the person's (107) tactile movement is monitored, and therefore, the actuator just needs to perform a required movement associated with the tactile movement and not all actuators need to operate at the same time. That is to say, if the finger 1901 has performed a tracing movement 1902 as shown in FIG. 7(a), a rough feel 1803 and a frictional feel 1805 are reproduced. On the other hand, if the finger 1901 has performed a pressing movement 1905 as shown in FIG. 7(b), then a hard/soft feel 1804 is reproduced. As described above, the tactile display 1801 produces vibrations 1807 as non-steady-state components 1809 of an ultrasonic vibrator, thereby presenting the rough feel 1803, and also produces a force distribution 1812 as steady-state components 1813 of the ultrasonic vibrator, thereby presenting the hard/soft feel 1804. However, as the tactile display 1801 attempts to present both the rough feel 1803 and the hard/soft feel 1804 at the same time, the steady-state components 1813 will also affect the vibrations 1807, thus making it necessary to correct the rough feel 1803. Specifically, by adjusting the amplitude ratio between the steady-state components 1813 and the non-steady-state components 1809, the influence on the rough feel 1803 is minimized. On the other hand, according to the present invention, since the tactile movement is monitored, there is no need to control the force distribution 1812 when only a tracing movement 1902 is performed. That is why the steady-state components 1813 can be controlled freely on the supposition that only the vibrations 1807 will be produced, which is quite contrary to the prior art that requires correction.

As described above, this tactile processor 100 can convey the feel gotten by a person 104 by touching an object under test 105 to another person 107. That is to say, the same feel can be shared by multiple persons who are located at distant locations even without transporting it physically. And if the persons 104 and 107 are the same individual, the feels gotten by him or her may be archived. That is to say, the feels he or she has gotten by actually touching something may be stored electronically and any of those feels may be reproduced on the tactile display anytime later.

Embodiment 5

Figure 48:
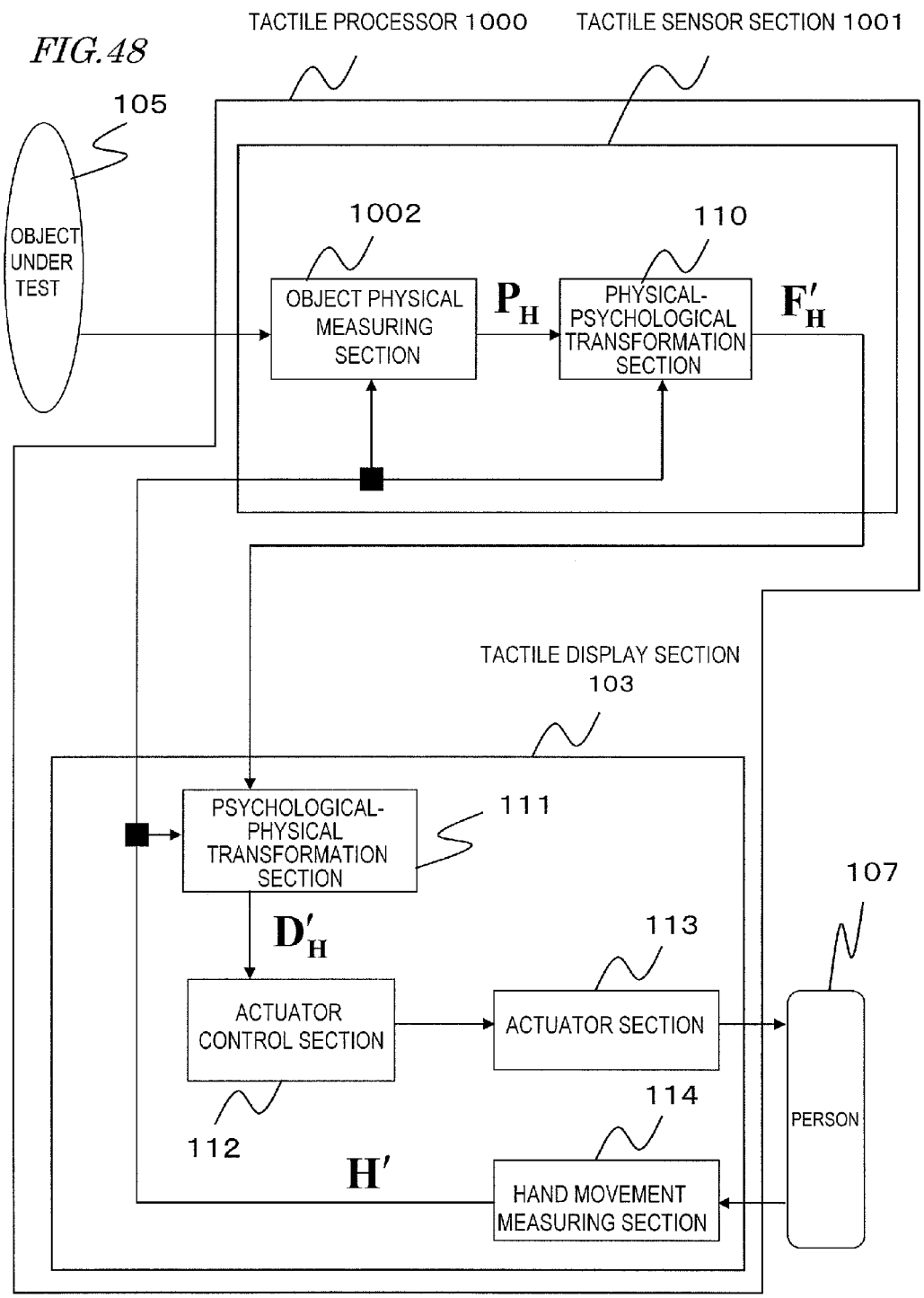
FIG. 48 is a block diagram illustrating a configuration for a tactile processor 1000 as a fifth specific preferred embodiment of the present invention.

FIG. 48 is a block diagram illustrating a configuration for a tactile processor 1000 as a fifth specific preferred embodiment of the present invention.

The fifth preferred embodiment of the present invention to be described below is a tactile processor that measures the physical property values of an object by sensing the tactile movement performed by a person who is touching a tactile display and that reproduces a feel, which the person would get if he or she actually touched the object, on the tactile display based on the kind of the tactile movement and the physical property value of the object. In FIG. 48, any component that is also included in the tactile processor 100 shown in FIG. 42 and that has the same function as its counterpart of the tactile processor 100 is identified by the same reference numeral and a detailed description thereof will be omitted herein.

The tactile processor 100 of the fourth preferred embodiment described above is supposed to make the person 104 touch the object under test and to accumulate the feature quantities of the feel gotten by him or her. On the other hand, the tactile processor 1000 of this preferred embodiment measures the physical property values of the object in response to the tactile movement by the person 107 who has touched the tactile display and gets the tactile feature quantities while the person 104 is absent.

Thus, even if the object under test 105 and the person 107 are located far away from each other, the tactile processor 1000 of this preferred embodiment can still enable the person 107 at such a distant location to get the feel of the object under test 105.

Hereinafter, the tactile processor 1000 shown in FIG. 48 will be described in detail.

The tactile processor 1000 includes a tactile sensor section 1001 and a tactile display section 103. In FIG. 48, the tactile processor 1000 is illustrated as if the processor 1000 is a single device including the tactile sensor section 1001 and the tactile display section 103. However, this illustration is adopted just for convenience sake. Actually, if the object under test 105 and the person 107 are located far away from each other, then the tactile sensor section 1001 will be located near the object under test 105 but the tactile display section 103 will be located near the person 107. In that case, the tactile processor 1000 will be implemented as a system that is established to include two independent components (i.e., the tactile sensor section 1001 and the tactile display section 103).

In this preferred embodiment, the physical property value of the object under test 105 is measured by determining what kind of tactile movement the person 107 has performed by touching the tactile display section 103, and the feel that the person 107 would get if he or she actually touched the object under test 105 is reproduced on the tactile display section 103 based on the kind of the tactile movement and the physical property value of the object.

The tactile sensor section 1001 includes an object physical measuring section 1002 and a physical-psychological transformation section 110, and calculates a tactile movement estimated tactile feature quantity vector $F'_H$, representing the feel that the person 107 would get if he or she actually touched the object under test 105, based on the physical property value of the object under test 105 and the kind of the tactile movement performed by the person 107.

The object physical measuring section 1002 measures a physical property value of the object under test 105. At that time, to measure a physical property value associated with the person's (107) tactile movement, the object physical measuring section 1002 gets a tactile movement feature quantity vector H' from the hand movement measuring section 114 of the tactile display section 103. The physical property value measured is output as a tactile movement test physical property value vector $P_H$.

The object physical measuring section 109 of the tactile processor 100 shown in FIG. 42 moves the physical measuring sensor 504 using the XYZ stage 501 shown in FIG. 17. In this case, if the physical measuring sensor 504 is a mono-function sensor that can measure only one kind of physical property value, then measurements need to be done in multiple stages with the sensors changed. On the other hand, if the physical measuring sensor 504 is a multi-function sensor that can measure multiple different kinds of physical property values (such as surface shape, elasticity and friction property) by itself as disclosed in Non-Patent Document No. 8, for example, the number of physical property value measuring process steps can be reduced, to say the least. And sometimes the measurement could also be done at a time. According to this preferred embodiment, the physical sensor 504 is activated by sensing the kind of the hand movement of the person 107 who is touching the tactile display section 103. The person 107 is touching the tactile display section 103 in order to get a particular type of feel. That is why once the person 107 has put his or her hand on the actuator section 113, the actuator should start to be driven as quickly as possible. For that reason, the physical measurement on the object under test 105, which must be done before the actuator starts to be driven, is preferably finished in as short a time as possible. It is particularly preferred that the physical measurement on the object under test 105 be done instantaneously. This is because by getting the physical measurement on the object under test 105 done instantaneously, the feel can be displayed on the tactile display section 103 in real time according to the kind of the hand movement of the person who is touching the tactile display section 103. Consequently, it is more preferred to use such a multi-function physical measuring sensor that can measure various kinds of physical property values of the object by itself rather than changing sensors one after another.

Once this tactile processor 1000 has been turned ON, every component thereof is always active. Thus, even if the person 107 does not touch the actuator section 113, the hand movement measuring section 114 keeps on working and outputting the tactile movement feature quantity vector H' to the object physical measuring section 1002. In the meantime, the physical sensor 504 of the object physical measuring section 1002 is inactivated. And when the person 107 puts his or her hand on the actuator section 113, his or her hand movement is sensed by the hand movement measuring section 114. And in accordance with the tactile movement feature quantity vector H', the physical sensor 504 of the object physical measuring section 1002 changes its positions, thereby varying the status of contact between the physical sensor 504 and the object under test 105 according to the person's (107) hand movement. The tactile movement test physical property value vector $P_H$ that has been obtained by the object physical measuring section 1002 is converted by the physical-psychological transformation section 110 into a tactile movement estimated tactile feature quantity vector $F'_H$, which is given to the tactile display section 103, thereby driving the actuator section 113 finally. As a result, the person 107 gets a feel corresponding to his or her hand movement.

As described above, by sensing the hand movement of the person 107 who is touching the tactile display section 103, the tactile processor 1000 measures the physical property value of the object under test 105, thereby reproducing the feel that the person 107 would get if he or she actually touched the object under test 105. Consequently, the feel to be gotten by actually putting a hand on the object under test 105 can be confirmed at a distant location even if it is not physically transported to that location.

Embodiment 6

Figure 49:
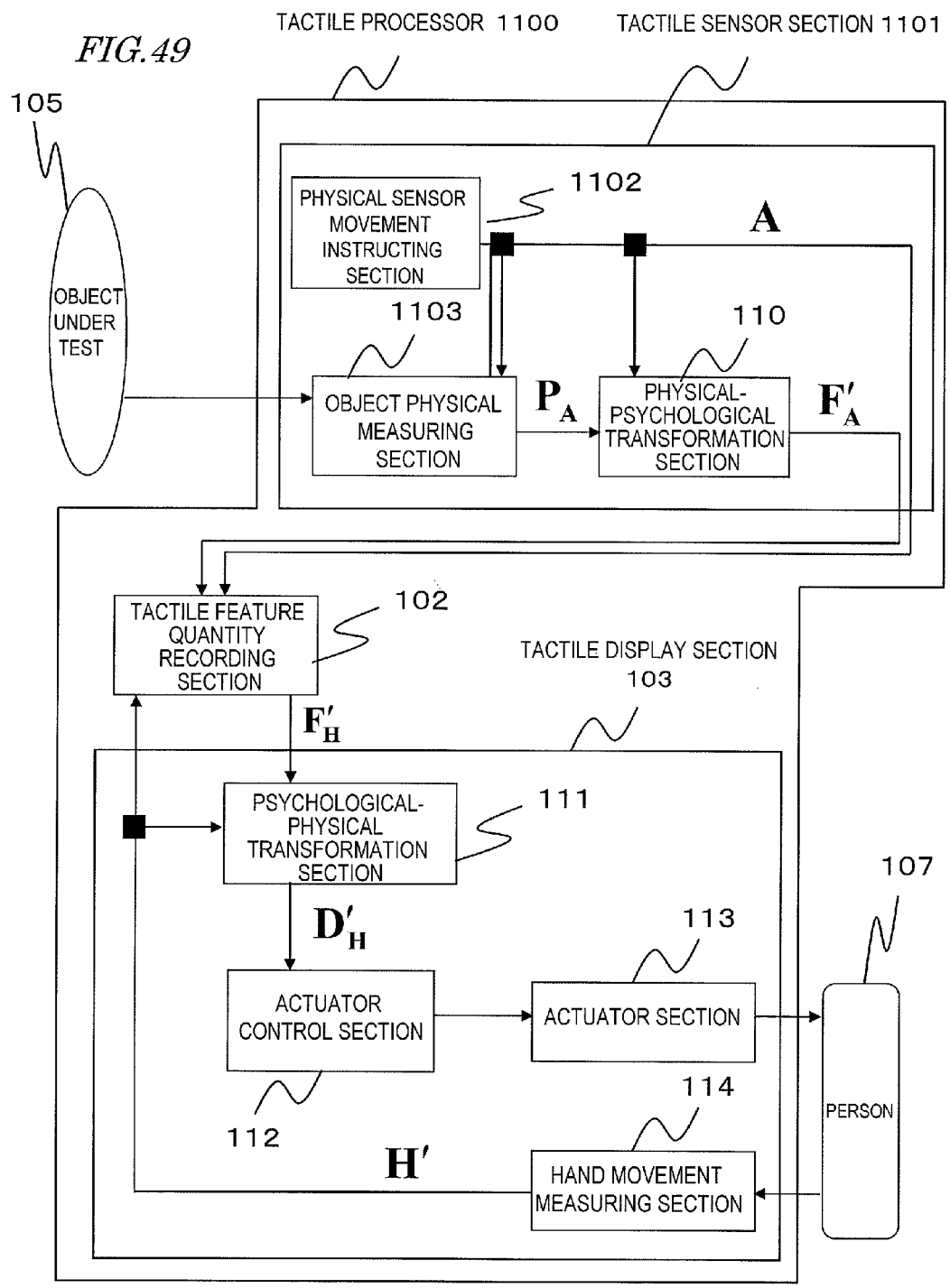
FIG. 49 is a block diagram illustrating a tactile processor 1100 as a sixth specific preferred embodiment of the present invention.

FIG. 49 is a block diagram illustrating a tactile processor 1100 as a sixth specific preferred embodiment of the present invention.

The sixth preferred embodiment of the present invention to be described below is a tactile processor, which measures and stores the physical property values of an object under test in advance and which retrieves the physical property values of the object according to the hand movement of a person who is touching the tactile display, thereby reproducing the feel that the person would get if he or she actually touched the object.

In FIG. 49, any component that is also included in the tactile processor 100 shown in FIG. 42 and that has the same function as its counterpart of the tactile processor 100 is identified by the same reference numeral and a detailed description thereof will be omitted herein.

Hereinafter, the tactile processor 1100 shown in FIG. 49 will be described in detail.

The tactile processor 1100 includes a tactile sensor section 1101, a tactile feature quantity recording section 102, and a tactile display section 103. The processor 1100 measures the physical property values of an object under test 105, records those values, along with the movement of the physical sensor at that time, in advance in the tactile feature quantity recording section 102, and then detects a movement of the physical sensor that is similar to the hand movement that the person 107 would have when touching the object under test 105, thereby retrieving the physical property values of the object under test 105.

The tactile sensor section 1101 includes a physical sensor movement instructing section 1102, an object physical measuring section 1103 and a physical-psychological transformation section 110. As per the instruction given by the physical sensor movement instructing section 1102, the physical sensor moves, measures the physical property values of the object under test 105 and outputs a tactile movement estimated tactile feature quantity vector $F'_H$ and a sensor movement feature quantity vector A.

Figure 50:
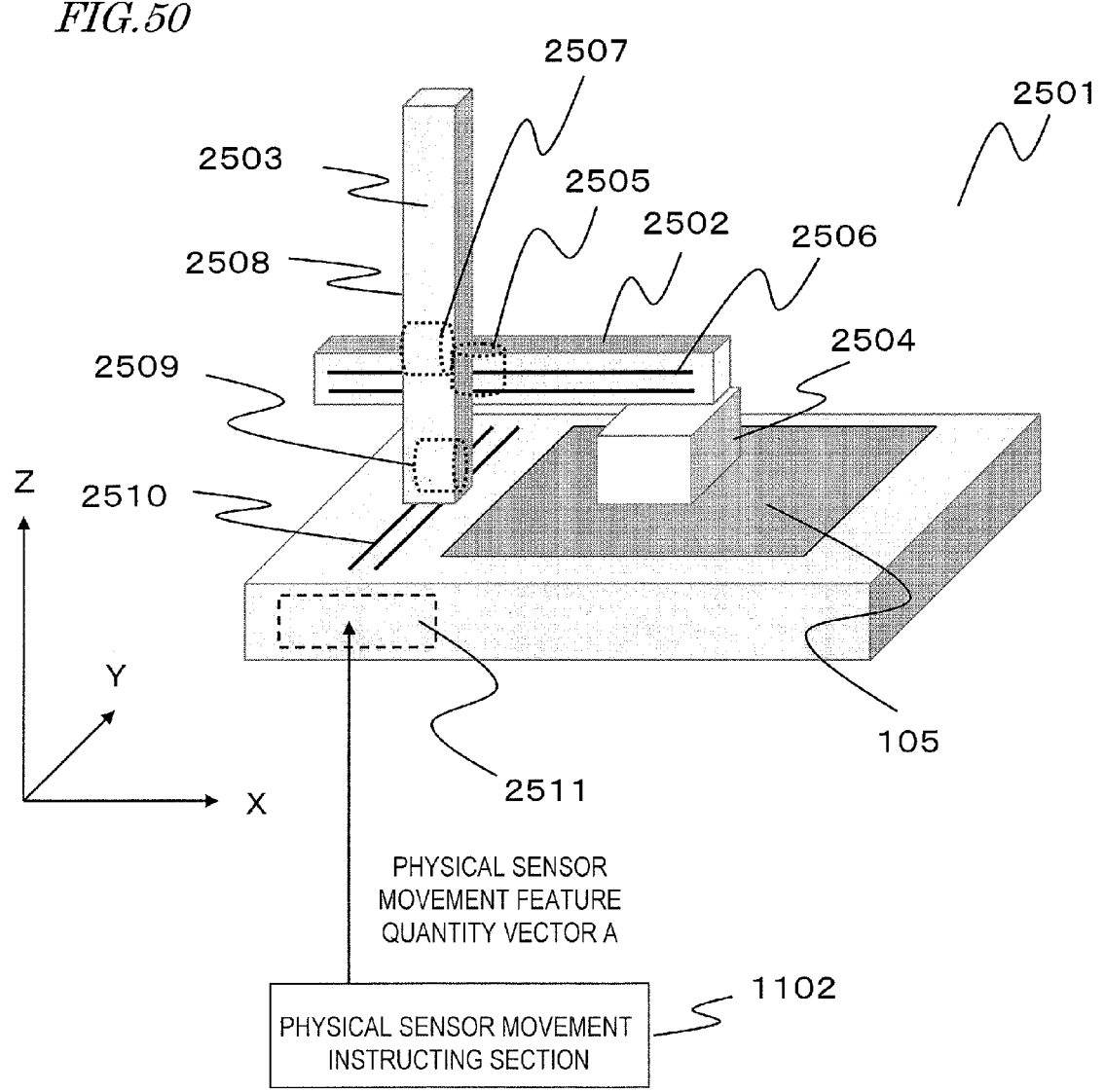
FIG. 50 illustrates an example of an XYZ stage 501.

As shown in FIG. 50, the physical sensor movement instructing section 1102 instructs the motor control section 511 of an XYZ stage 2501 how to move the physical sensor 2504. Specifically, the instructions cover a wide variety of a person's hand movements comprehensively and are preset (or programmed) in a memory (not shown) of the physical sensor movement instructing section 1102.

For example, the tactile movements performed by a number of persons may be measured in advance and every movement of theirs may be put into the instructions. Also, as shown in FIG. 51(a), a range 1302, which covers every group 1301 of vectors obtained in the tactile movement feature quantity vector space, may be defined. Next, a group of vectors that are distributed evenly over the range 1302 may be defined as shown in FIG. 51(b) and those vectors may be instructed as the movement of the physical sensor. The vector 1303 is one of the vectors that have been distributed evenly and is defined to pass not only a lattice point 1304 that has been set within the range 1302 but also the origin 1305 of the coordinate system. That group of vectors that are distributed evenly within the range 1302 is defined to pass all lattice points. However, only one of those vectors is illustrated in FIG. 51(b) because the drawing would get too much complicated if every one of those vectors were shown. Furthermore, every possible movement of the physical sensor 2504 is expected with the drivability of motors 2505, 2507 and 2509 and the movable ranges of supporting poles 2502 and 2503 taken into consideration and the measurement is done everywhere as far as the object under test 105 does not get damaged. Considering the number of kinds of all imaginable tactile movements that the person 107 could perform, the data thus collected could be excessive. However, the overlap between multiple feel ranges as shown in FIG. 46(a) can be secured without obliging the person to put his or her hand on the object, which is beneficial.

The object physical measuring section 1103 moves the physical sensor 2504 in accordance with the sensor movement feature quantity vector A that has been provided by the physical sensor movement instructing section 1102, measures the physical property values of the object under test 105 and outputs them as a tactile movement test physical property value vector $P_A$. The tactile processor 1100 once stores the measurement data thus collected in the tactile feature quantity recording section 102, and therefore, the tactile sensor section 1101 and the tactile display section 103 will perform their processing independently of each other. For that reason, the physical sensor 2504 to be attached to the XYZ stage 2501 could be a mono-function type and multiple sensors could be changed one after another.

As described above, by getting the physical sensor 2504 moved by the physical sensor movement instructing section 1102, the tactile processor 1100 measures the physical property values of the object under test 105 comprehensively and can cope with any arbitrary kind of tactile movement performed by the person 107. That is why in the tactile feature quantity space, the range of the feature quantity vectors that can be output by the tactile sensor section can include that of the feature quantity vectors that can be output by the tactile display section 103. As a result, a more realistic feel can be reproduced and the physical measurement can be done on the object under test 105 even without obliging any person to put his or her hand on it. In this manner, a feel that a person would get if he or she actually touched the object under test 105 can be confirmed at a distant location even without transporting it all the way to him or her.

Embodiment 7

Figure 52:
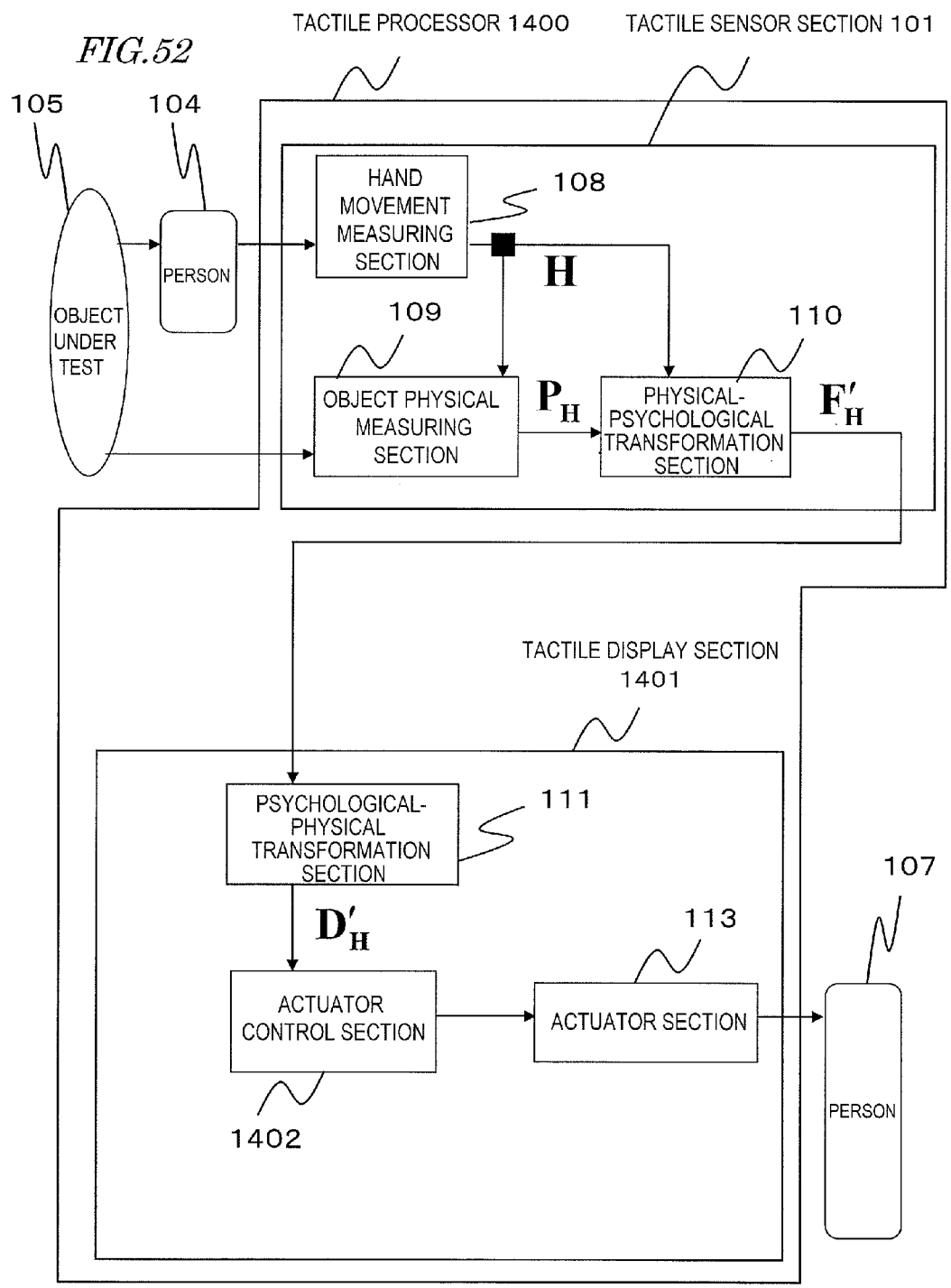
FIG. 52 is a block diagram illustrating a tactile processor 1400 as a seventh specific preferred embodiment of the present invention.

FIG. 52 is a block diagram illustrating a tactile processor 1400 as a seventh specific preferred embodiment of the present invention.

The seventh preferred embodiment of the present invention to be described below is a tactile processor that makes the person just put his or her hand's fingers on a tactile display without moving them at all and that reproduces a feel, which he or she would get when touching an object, on the tactile display passively. Since the user does not move his or her fingers at all, the tactile processor of this preferred embodiment does not include the hand movement measuring section 114 of the tactile processor 100 of the fourth preferred embodiment of the present invention described above. In FIG. 52, any component that is also included in the tactile processor 100 shown in FIG. 42 and that has the same function as its counterpart of the tactile processor 100 is identified by the same reference numeral and a detailed description thereof will be omitted herein.

Hereinafter, the tactile processor 1400 shown in FIG. 52 will be described in detail.

The tactile processor 1400 includes a tactile sensor section 101 and a tactile display section 1401 and enables a person 107 to experience the feel that the other person 104 has gotten by touching an object under test 105 just by making the person 107 put his or her hand on the tactile display section 1401. In this preferred embodiment however, the person 107 never moves his or her fingers on the tactile display section 1401 but is given the feel passively by the actuator section 113 driven. In the tactile processor 100 shown in FIG. 42, the person 107 who puts his or her hand on the tactile display section 103 can touch the actuator section 113 freely and the person's (104) tactile movement of a similar kind to the person's (107) tactile movement that has been measured by the hand movement measuring section 114 is detected, thereby determining a tactile movement estimated tactile feature quantity vector $F'_H$. That is why by changing the kinds of tactile movements, the person 107 can get his or her target feels actively one after another. On the other hand, in the tactile processor 1400 of this preferred embodiment, the tactile movement is sensed only when the feel gotten by the person 104 is estimated and there is no hand movement at all when the person 107 is getting a feel. Consequently, in this tactile processor 1400, the person 107 just experiences passively the feel gotten by the other person 104.

The tactile display section 1401 includes a psychological-physical transformation section 111, an actuator control section 1402, and an actuator section 113, and drives the actuator section 113 in response to a tactile movement estimated tactile feature quantity vector $F'_H$ received.

The actuator control section 1402 instructs the actuator section 113 to give a target feel to the person 107 who just puts his or her hand's fingers on the actuator section 113 without moving them at all. To get this done, the calculation represented by Equation (6) needs to be performed, and therefore, the matrix V should be defined in advance. This procedure is the same as in a situation where the input and output properties of the actuator section 2102 are modeled by Equation (5) in FIG. 6. According to this preferred embodiment, however, various actuator control signals D' are given to the actuator control section 2103 without making the person 107 move his or her fingers at all.

In FIG. 52, no means for recording the tactile movement estimated tactile feature quantity vector $F'_H$ or tactile movement feature quantity vector H such as the tactile feature quantity recording section 102 is shown. However, it is naturally possible to interpose data storage means into a series of flow leading to the actuator section 113 from the hand movement measuring section 108. For example, by recording and retrieving the tactile movement estimated tactile feature quantity vector $F'_H$ that is the output of the tactile sensor section 101, the target feel can also be reproduced on the tactile display section 1401.

As described above, the tactile processor 1400 enables one person 107 to just experience passively the feel that has been gotten by the other person 104, and therefore, can convey the feel to a distant location even without transporting the object to him or her.

INDUSTRIAL APPLICABILITY

As described above, the present invention pays special attention to a feel which is gotten by a person at a point in time but which is subject to change at any time, thereby providing material display means for displaying a similar feel to that of another person or means for enabling another person to experience electronically the feel of the object. By applying this invention to e-commerce or videoconferencing, the time and cost that would otherwise be spent to perform the process of confirming the actual feel or touch of a material by sending samples can be saved. In the field of e-commerce, among other things, products are returned day in and day out because a lot of consumers often find the feel or touch of a delivered product significantly different from the expected one. According to the present invention, however, consumers can experience the feel on the tactile display, thus greatly contributing to reducing the rate of such returns. And if the returns are reduced, the costs of distribution can be cut down and the environmental load produced by transporting products can be reduced eventually.

REFERENCE SIGNS LIST 1 material physical quantity measuring section
2 material tactile estimating section
3 material DB searching section
7 search result display section
10 movement physical quantity measuring section
11 movement feature quantity calculating section
12 tactile movement learning section
13 tactile movement DB
14 tactile intensity recording section
15 tactile weight calculating section
17 tactile movement estimating section
18 tactile weight DB
19 tactile weight vector searching section
20 feeler
22 reference material
23 material DB
24 candidate material
25 tactile weight extracting section
100 tactile processor
101 tactile sensor section
102 tactile feature quantity recording section
103 tactile display section
104 person
105 object under test
108 hand movement measuring section
109 object physical measuring section
110 physical-psychological transformation section
111 psychological-physical transformation section
112 actuator control section
113 actuator section
114 hand movement measuring section

The invention claimed is:

1. A tactile processor comprising:
a movement measuring section for determining a status of contact between a person and an object as represented by a feature quantity value;
a physical measuring section for measuring a physical property value of the object; and
a physical-psychological transformation section for generating a tactile feature quantity based on the physical property value measured by the physical measuring section and based on a weight of the physical property of the object,
wherein the weight is selected, based on the status of contact, from a group of weights, and each weight included in the group of weights is associated with a physical property value and feature quantity value.

2. The tactile processor of claim 1, further comprising an output section for outputting the tactile feature quantity that has been generated by the physical-psychological transformation section as the quantity of a feel that the person gets when touching the arbitrary object.

3. The tactile processor of claim 1, wherein the physical measuring section is able to measure physical property values representing multiple different types of physical properties of the object, and
wherein the physical measuring section changes the types of physical properties to measure according to the status of contact between the person and the object.

4. The tactile processor of claim 1, wherein the movement measuring section obtains a feature quantity representing a hand movement of the person who is feeling the object, and
wherein the feature quantity representing the hand movement includes at least one of the coordinates of a position on the hand, the coordinates of a point of contact between the hand and the object, the magnitudes of shift in these coordinates, the movement velocity of the hand, and the movement acceleration of the hand.

5. The tactile processor of claim 1, wherein the physical measuring section measures, as the physical property value of the object, at least one of the shape of the object and a stress applied to the object.

6. The tactile processor of claim 1, wherein the tactile feature quantity includes at least one of an uneven feel, a hard/soft feel, a frictional feel and a sticky feel that are defined as factors to be extracted from the sensory response of a subject under test.

7. The tactile processor of claim 4, wherein the physical-psychological transformation section collects in advance information about a correlation between a physical property value of the object and a feature quantity representing the feel that the person gets when touching the object, and
wherein the information has been collected in advance as either a table that correlates a feature quantity representing the hand movement, a physical property value of the object, and the tactile feature quantity with each other or a function that receives the feature quantity representing the hand movement and a physical property value of an object of learning and outputs the tactile feature quantity.

8. The tactile processor of claim 2, further comprising a tactile display section, which receives the tactile feature quantity from the output section and produces force based on the tactile feature quantity received, thereby making a feeler who touches the display get a feel,
wherein the tactile display section includes:
a psychological-physical transformation section for transforming the tactile feature quantity, which has been received from a recording section, into a control signal following a predefined transformation rule;
a drive section for applying the force to the feeler's hand in accordance with the control signal; and
a hand movement measuring section for measuring a feature quantity representing the hand movement of the feeler who touches the tactile display section,
wherein the psychological-physical transformation section receives the tactile feature quantity, which has been stored on the recording section and which is determined by the feature quantity representing the feeler's hand movement.

9. A tactile processor comprising:
a tactile display section for making a feeler who touches the display get a feel by producing force;
a physical measuring section for measuring a physical property value of a given object under test; and
a physical-psychological transformation section for transforming the physical property value of the object under test measured into a tactile feature quantity by reference to information that has been collected in advance to correlate with each other physical measured values of an object of learning and a feature quantity representing a feel that a person has gotten by touching the object of learning,
wherein the object under test is represented by a feature quantity value, and a tactile feature quantity is generated based on a weight of the physical property of the object under test and the weight is selected based on the status of contact, from a group of weights and each weight included in the group of weights is associated with a physical property value and feature quantity value, wherein the tactile display section includes:

a psychological-physical transformation section for transforming the tactile feature quantity into a control signal following a predefined transformation rule;

a drive section for applying the force to the feeler's hand in accordance with the control signal; and a hand movement measuring section for measuring a feature quantity representing the hand movement of the feeler who touches the tactile display section, and wherein the physical measuring section measures the physical property value of the object under test by the measured feature quantity representing the feeler's hand movement.

10. A tactile processor comprising:

a physical measuring section for measuring a physical property value of an object under test using a physical sensor;

a physical sensor movement instructing section for instructing how to move the physical sensor in measuring the physical property value of the object under test;

a physical-psychological transformation section for transforming the physical property value measured into a tactile feature quantity by reference to information that has been collected in advance to correlate with each other a physical property value of an object of learning, a feature quantity representing a hand movement of a subject under test who has touched the object of learning, and a feature quantity representing a feel that the subject has gotten by touching the object so that types and weights of the physical property value to refer to are changed according to the feature quantity representing the hand movement, wherein the weights are selected, based on the status of contact, from a group of weights, and each weight included in the group of weights is associated with a physical property value and feature quantity value; and an output section for outputting the tactile feature quantity determined as the quantity of a feel that the subject gets when touching the object under test.

11. The tactile processor of claim 10, further comprising a tactile display section, which receives the tactile feature quantity from the output section and produces force based on the tactile feature quantity received, thereby making a feeler who touches the display get a feel, wherein the tactile display section includes:

a psychological-physical transformation section for transforming the tactile feature quantity, which has been received from a recording section, into a control signal following a predefined transformation rule;

an actuator section for applying the force to the feeler's hand in accordance with the control signal and making the feeler get a feel; and a hand movement measuring section for measuring a feature quantity representing the hand movement of the feeler who has touched the actuator section, wherein the psychological-physical transformation section receives the tactile feature quantity, which has been stored on the recording section and which is determined by the feature quantity representing the feeler's hand movement.

12. The tactile processor of claim 1, wherein the status of contact includes at least one of trace movement, pressing movement, and grabbing movement.

* * * * *